United States Patent
Mirza et al.

(10) Patent No.: US 10,607,080 B1
(45) Date of Patent: Mar. 31, 2020

(54) FEEDBACK AND TRAINING FOR A MACHINE LEARNING ALGORITHM CONFIGURED TO DETERMINE CUSTOMER PURCHASES DURING A SHOPPING SESSION AT A PHYSICAL STORE

(71) Applicant: 7-ELEVEN, INC., Irving, TX (US)

(72) Inventors: Shahmeer Ali Mirza, Celina, TX (US); Sailesh Bharathwaaj Krishnamurthy, Irving, TX (US); Trong Nghia Nguyen, Dallas, TX (US); Sarath Vakacharla, Irving, TX (US)

(73) Assignee: 7-Eleven, Inc., Irving, TX (US)

( * ) Notice: Subject to any disclaimer, the term of this patent is extended or adjusted under 35 U.S.C. 154(b) by 0 days.

(21) Appl. No.: 16/663,564

(22) Filed: Oct. 25, 2019

(51) Int. Cl.
  *G06K 9/62* (2006.01)
  *G06K 9/00* (2006.01)
  *G06N 20/00* (2019.01)
  *G06Q 30/06* (2012.01)

(52) U.S. Cl.
  CPC ......... *G06K 9/00664* (2013.01); *G06N 20/00* (2019.01); *G06Q 30/0633* (2013.01)

(58) Field of Classification Search
  None
  See application file for complete search history.

(56) References Cited

U.S. PATENT DOCUMENTS

| | | | |
|---|---|---|---|
| 5,013,896 A | 5/1991 | Ono et al. | |
| 6,725,206 B1 | 4/2004 | Coveley | |
| 7,337,960 B2 * | 3/2008 | Ostrowski | A47F 11/10 235/383 |
| 7,672,876 B2 | 3/2010 | Bonner et al. | |
| 7,844,509 B2 | 11/2010 | Bodin et al. | |

(Continued)

FOREIGN PATENT DOCUMENTS

| | | |
|---|---|---|
| CA | 1290453 C | 10/1991 |
| CA | 2201423 C | 10/1998 |

(Continued)

OTHER PUBLICATIONS

Krishnamurthy, S. B. et al., "Scalable Position Tracking System for Tracking Position in Large Spaces," U.S. Appl. No. 16/663,633, filed Oct. 25, 2019, 117 pages.

(Continued)

*Primary Examiner* — Jayesh A Patel
(74) *Attorney, Agent, or Firm* — Baker Botts L.L.P.

(57) ABSTRACT

An apparatus includes a processor. The processor receives an algorithmic shopping cart that includes a first set of items determined by an algorithm to have been selected by a person during a shopping session in a physical store, based on a set of inputs received from sensors located within the physical store. The processor also receives a virtual shopping cart that includes a second set of items. Video of the shopping session was captured by a set of cameras located in the physical store and depicts the person selecting the second set of items. The processor compares the algorithmic cart to the virtual cart and determines that a discrepancy exists between the algorithmic cart and the virtual cart. The processor determines a subset of the set of inputs associated with the discrepancy and attaches metadata explaining the discrepancy to the subset. The processor uses the subset to train the algorithm.

20 Claims, 27 Drawing Sheets

(56) References Cited

U.S. PATENT DOCUMENTS

| | | | |
|---|---|---|---|
| 7,848,964 B2 | 12/2010 | Bonner et al. | |
| 8,295,597 B1* | 10/2012 | Sharma | G06K 9/00342 382/173 |
| 8,571,298 B2* | 10/2013 | McQueen | G06K 9/00 235/378 |
| 8,949,145 B2* | 2/2015 | Harper | G06Q 20/12 700/231 |
| 9,886,827 B2 | 2/2018 | Schoner | |
| 9,911,290 B1* | 3/2018 | Zalewski | G06Q 20/12 |
| 9,984,354 B1 | 5/2018 | Chinoy et al. | |
| 9,996,818 B1 | 6/2018 | Ren et al. | |
| 10,055,853 B1 | 8/2018 | Fisher et al. | |
| 10,064,502 B1 | 9/2018 | Gyori et al. | |
| 10,127,438 B1 | 11/2018 | Fisher et al. | |
| 10,133,933 B1 | 11/2018 | Fisher et al. | |
| 10,134,004 B1 | 11/2018 | Liberato, Jr. et al. | |
| 10,140,483 B1 | 11/2018 | Huebner et al. | |
| 10,140,820 B1* | 11/2018 | Zalewski | G07G 1/0072 |
| 10,157,452 B1 | 12/2018 | Tighe et al. | |
| 10,169,660 B1 | 1/2019 | Ren et al. | |
| 10,176,677 B2* | 1/2019 | Herring | G06Q 30/0635 |
| 10,181,113 B2 | 1/2019 | Rivalto et al. | |
| 10,192,408 B2* | 1/2019 | Schoner | G07G 1/0045 |
| 10,198,710 B1 | 2/2019 | Hahn et al. | |
| 10,244,363 B1 | 3/2019 | Niranjayan et al. | |
| 10,250,868 B1 | 4/2019 | Arnold et al. | |
| 10,262,293 B1 | 4/2019 | Prater et al. | |
| 10,268,983 B2 | 4/2019 | Kumar et al. | |
| 10,291,862 B1 | 5/2019 | Liberato et al. | |
| 10,296,814 B1 | 5/2019 | Kumar et al. | |
| 10,303,133 B1 | 5/2019 | Dhalla et al. | |
| 10,318,917 B1 | 6/2019 | Goldstein et al. | |
| 10,318,919 B2 | 6/2019 | Bermudez Rodriguez et al. | |
| 10,321,275 B1 | 6/2019 | Orlov et al. | |
| 10,332,066 B1 | 6/2019 | Palaniappan et al. | |
| 10,339,411 B1 | 7/2019 | Hua et al. | |
| 10,353,982 B1 | 7/2019 | Kumar et al. | |
| 10,366,306 B1 | 7/2019 | Raghavan et al. | |
| 10,366,442 B1* | 7/2019 | Oczkowski | G06Q 30/0631 |
| 10,368,057 B1 | 7/2019 | Saran et al. | |
| 10,384,869 B1 | 8/2019 | Shiee et al. | |
| 10,388,019 B1 | 8/2019 | Hua et al. | |
| 10,442,852 B2 | 9/2019 | Thiagarajan et al. | |
| 10,438,277 B1 | 10/2019 | Jiang et al. | |
| 10,445,694 B2 | 10/2019 | Fisher et al. | |
| 10,452,924 B2* | 10/2019 | Adato | G06K 9/325 |
| 10,459,103 B1 | 10/2019 | Shi et al. | |
| 10,466,095 B1 | 11/2019 | O'Neill et al. | |
| 10,474,991 B2 | 11/2019 | Fisher et al. | |
| 10,474,992 B2 | 11/2019 | Fisher et al. | |
| 10,475,185 B1 | 11/2019 | Raghavan et al. | |
| 10,510,219 B1* | 12/2019 | Zalewski | G06Q 30/0633 |
| 2006/0136303 A1* | 6/2006 | Bell | G06Q 30/0601 705/26.8 |
| 2007/0011099 A1 | 1/2007 | Sheehan | |
| 2010/0318440 A1 | 12/2010 | Coveley | |
| 2013/0011062 A1* | 1/2013 | Conwell | G06K 9/228 382/173 |
| 2013/0211953 A1* | 8/2013 | Abraham | G06Q 30/06 705/26.8 |
| 2014/0209687 A1* | 7/2014 | Cancro | G06Q 30/02 235/472.01 |
| 2014/0363059 A1* | 12/2014 | Hurewitz | G06Q 30/0201 382/118 |
| 2015/0019391 A1* | 1/2015 | Kumar | G07G 1/0036 705/28 |
| 2015/0029339 A1* | 1/2015 | Kobres | H04N 7/181 348/150 |
| 2015/0095189 A1* | 4/2015 | Dharssi | G07G 1/0063 705/26.8 |
| 2016/0005102 A1* | 1/2016 | He | G06Q 20/12 705/26.9 |
| 2016/0171516 A1* | 6/2016 | Brosnan | G06Q 30/0214 705/14.16 |
| 2016/0189286 A1* | 6/2016 | Zohar | G06K 9/00355 348/150 |
| 2016/0239867 A1* | 8/2016 | Sinha | G06Q 30/0255 |
| 2016/0371606 A1* | 12/2016 | Schmidt | G06Q 10/02 |
| 2016/0371766 A1* | 12/2016 | Schmidt | G06Q 30/0639 |
| 2017/0116667 A1* | 4/2017 | High | G06T 19/006 |
| 2017/0200215 A1* | 7/2017 | Buergi | G06Q 30/0261 |
| 2017/0200216 A1* | 7/2017 | Stedehouder | G06Q 30/0633 |
| 2017/0206669 A1* | 7/2017 | Saleemi | G06T 7/596 |
| 2017/0262926 A1* | 9/2017 | High | G06Q 30/0633 |
| 2017/0278172 A1* | 9/2017 | Dey | G06Q 30/0631 |
| 2017/0316656 A1* | 11/2017 | Chaubard | G07G 1/0045 |
| 2018/0032997 A1* | 2/2018 | Gordon | G06Q 20/3224 |
| 2018/0047093 A1* | 2/2018 | High | G06Q 30/0643 |
| 2019/0108561 A1* | 4/2019 | Shivashankar | G06Q 30/06 |
| 2019/0114488 A1* | 4/2019 | Glazer | G08B 13/196 |
| 2019/0114689 A1* | 4/2019 | Wang | G06Q 30/0631 |
| 2019/0138986 A1 | 5/2019 | Puerini et al. | |
| 2019/0147709 A1 | 5/2019 | Schoner | |
| 2019/0149725 A1* | 5/2019 | Adato | H04N 5/23206 348/158 |
| 2019/0156277 A1 | 5/2019 | Fisher et al. | |
| 2019/0156506 A1 | 5/2019 | Fisher et al. | |
| 2019/0205643 A1* | 7/2019 | Liu | G06K 9/628 |
| 2019/0213421 A1* | 7/2019 | Adato | G06K 9/00671 |
| 2019/0236531 A1* | 8/2019 | Adato | G06K 9/00664 |
| 2019/0244386 A1 | 8/2019 | Fisher et al. | |
| 2019/0244500 A1 | 8/2019 | Fisher et al. | |
| 2019/0251499 A1 | 8/2019 | Kumar et al. | |
| 2019/0266663 A1* | 8/2019 | Keeler | G06F 3/011 |
| 2019/0347611 A1 | 11/2019 | Fisher et al. | |
| 2019/0361917 A1* | 11/2019 | Tran | G06O 20/389 |

FOREIGN PATENT DOCUMENTS

| | | | |
|---|---|---|---|
| EP | 0348484 A1 | 1/1990 | |
| WO | WO-0002154 A1 * | 1/2000 | G06Q 20/20 |
| WO | 2019032304 A1 | 2/2019 | |

OTHER PUBLICATIONS

Boulio, C. A. et al., "Sensor Array for Scalable Position Tracking System," U.S. Appl. No. 16/663,415, filed Oct. 25, 2019, 113 pages.

Paul, D. et al. "Custom Rack for Scalable Position Tracking System," U.S. Appl. No. 16/633,669, filed Oct. 25, 2019, 110 pages.

Krishnamurthy, S. B. et al., "Tracking Positions Using a Scalable Position Tracking System," U.S. Appl. No. 16/633,432, filed Oct. 25, 2019, 122 pages.

Krishnamurthy, S. B. et al., "Topview Object Tracking Using a Sensor Array," U.S. Appl. No. 16/663,710, filed Oct. 25, 2019, 199 pages.

Krishnamurthy, S. B. et al., "Detecting Shelf Interactions Using a Sensor Array," U.S. Appl. No. 16/663,766, filed Oct. 25, 2019, 205 pages.

Vakacharla, S. et al., "Topview Item Tracking Using a Sensor Array," U.S. Appl. No. 16/663,451, filed Oct. 25, 2019, 204 pages.

Mirza, S. A. et al., "Detecting and Identifying Misplaced Items Using a Sensor Array," U.S. Appl. No. 16/663,794, filed Oct. 25, 2019, 200 pages.

Mirza, S. A. et al., "Sensor Mapping to a Global Coordinate System," U.S. Appl. No. 16/663,822, filed Oct. 25, 2019, 204 pages.

Mirza, S. A. et al., "Sensor Mapping to a Global Coordinate System Using a Marker Grid," U.S. Appl. No. 16/663,472, filed Oct. 25, 2019, 206 pages.

Mirza, S. A. et al., "Shelf Position Calibration in a Global Coordinate System Using a Sensor Array," U.S. Appl. No. 16/663,856, filed Oct. 25, 2019, 206 pages.

Magee, M. R. et al., "Customer-Based Video Feed," U.S. Appl. No. 16/664,470, filed Oct. 25, 2019, 103 pages.

Mirza, S. A. et al.,"System and Method for Presenting a Virtual Store Shelf That Emulates a Physical Store Shelf," U.S. Appl. No. 16/664,490, filed Oct. 25, 2019, 103 pages.

Nguyen, T. N. et al.,"Contour-Based Detection of Closely Spaced Objects," U.S. Appl. No. 16/664,160, filed Oct. 25, 2019, 199 pages.

(56) References Cited

OTHER PUBLICATIONS

Mirza, S. A. et al.,"Action Detection During Image Tracking," U.S. Appl. No. 16/663,500, filed Oct. 25, 2019, 198 pages.

Mirza, S. A. et al.,"Object Re-identification During Image Tracking," U.S. Appl. No. 16/664,219, dated Oct. 25, 2019, 201 pages.

Chinnam, M. M. et al.,"Vector-Based Object Re-Identification During Image Tracking," U.S. Appl. No. 16/664,269, filed Oct. 25, 2019, 199 pages.

Mirza, S. A. et al.,"Image-Based Action Detection Using Contour Dilation," U.S. Appl. No. 16/664,332, filed Oct. 25, 2019, 199 pages.

Mirza, S. A. et al.,"Determining Candidate Object Identities During Image Tracking," U.S. Appl. No. 16/664,363, filed Oct. 25, 2019, 201 pages.

Mirza, S. A. et al.,"Object Assignment During Image Tracking," U.S. Appl. No. 16/664,391, filed Oct. 25, 2019, 198 pages.

Krishnamurthy, S. B. et al.,"Auto-Exclusion Zone for Contour-Based Object Detection," U.S. Appl. No. 16/664,426, filed Oct. 25, 2019, 199 pages.

Mirza, S. A. et al.,"Multi-camera Image Tracking on a Global Plane ," U.S. Appl. No. 16/663,533, filed Oct. 25, 2019, 198 pages.

Mirza, S. A. et al.,"Identifying Non-Uniform Weight Objects Using a Sensor Array," U.S. Appl. No. 16/663,901, filed Oct. 25, 2019, 199 pages.

Magee, M. R. et al., "System and Method for Populating a Virtual Shopping Cart Based on Video of a Customer's Shopping Session at a Physical Store," U.S. Appl. No. 16/663,589, filed Oct. 25, 2019, 103 pages.

Magee, M. R. et al., "Tool for Generating a Virtual Store That Emulates a Physical Store ," U.S. Appl. No. 16/664,529, filed Oct. 25, 2019, 100 pages.

Mirza, S. A. et al.,"Sensor Mapping to a Global Coordinate System Using Homography," U.S. Appl. No. 16/663,948, filed Oct. 25, 2019, 197 pages.

* cited by examiner

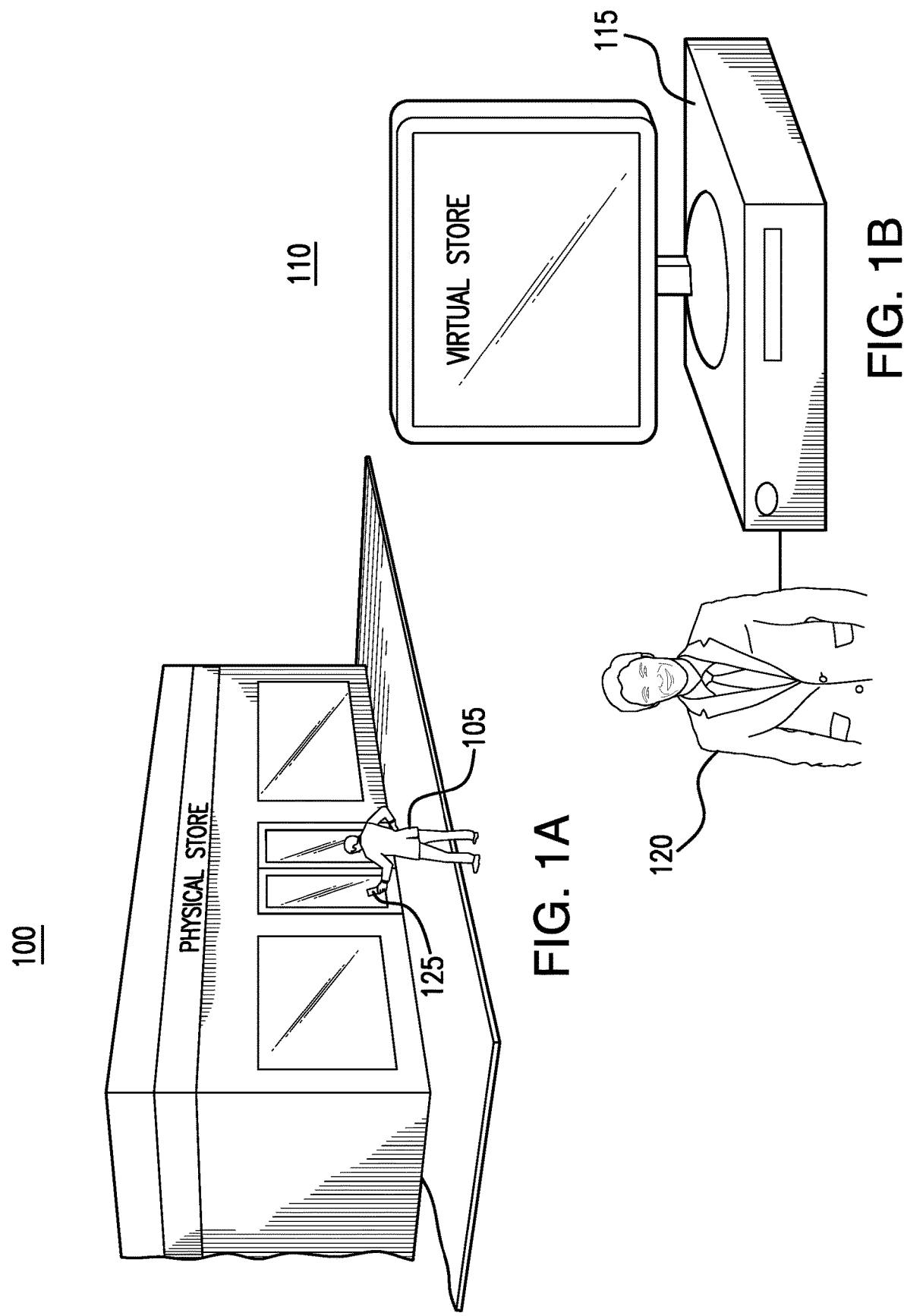

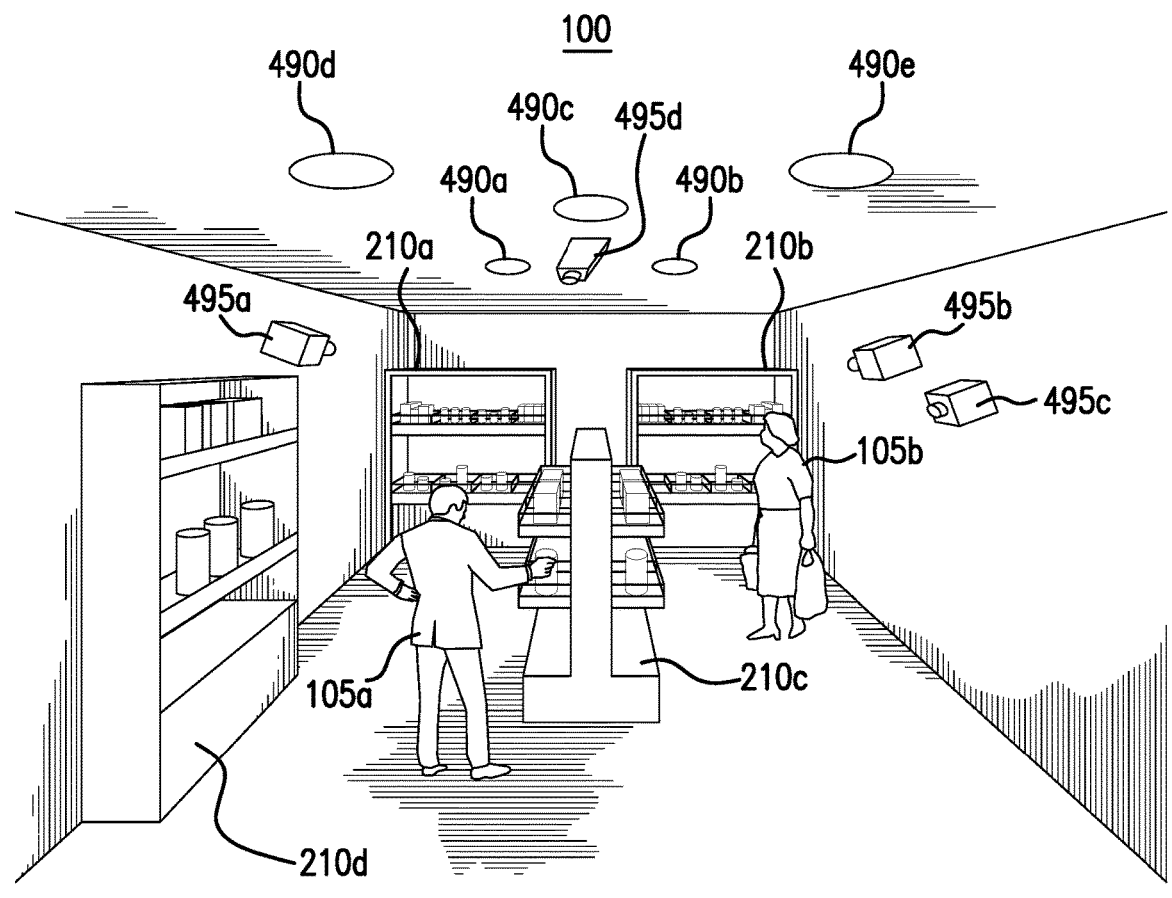
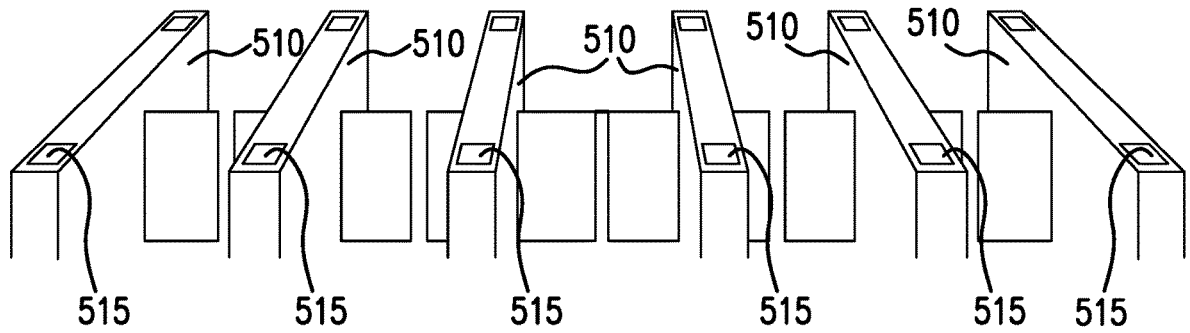
FIG. 5A

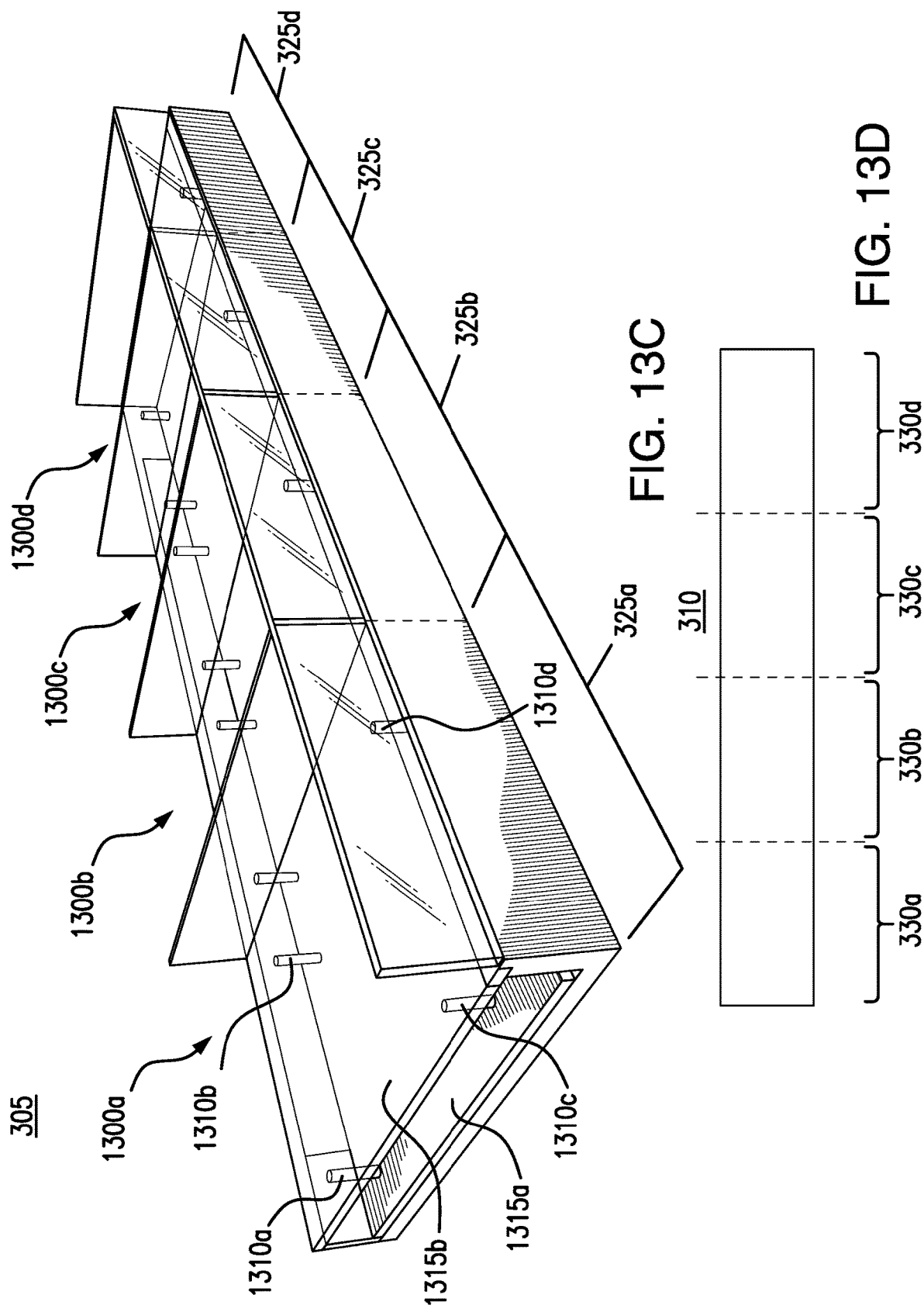

FEEDBACK AND TRAINING FOR A MACHINE LEARNING ALGORITHM CONFIGURED TO DETERMINE CUSTOMER PURCHASES DURING A SHOPPING SESSION AT A PHYSICAL STORE

TECHNICAL FIELD

This disclosure relates generally to remote monitoring techniques, and more particularly, to feedback and training for a machine learning algorithm configured to determine customer purchases during a shopping session at a physical store.

BACKGROUND

During a traditional shopping session in a physical store, a customer selects items from shelves located within the store and then presents those items to a cashier. The cashier generates a bill for the items and receives payment from the customer. Any cameras located within the store are typically present for security purposes.

SUMMARY

Shopping sessions in traditional stores may be associated with several inefficiencies for both the customers and the store owners. For example, during busy periods within a store, a customer may spend a considerable amount of time waiting in line to pay the cashier for the items he/she selected. The time spent waiting may even exceed the total amount of time that the customer spent selecting the items. This may lead to customer frustration and potentially to a loss of repeat customer business. As another example, traditional stores typically rely on the presence of one or more employees to act as cashiers within the stores. Even when the store is otherwise empty, such employees are nevertheless present, in case a customer happens to enter the store to make a purchase. As a result, outside of peak business hours, much of a cashier's time within a store may be spent idle.

This disclosure contemplates a virtual store tool that addresses one or more of the above technical problems. The tool generates a virtual store configured to emulate a physical store. The tool also generates a set of videos from camera feeds received from cameras located in the physical store, to track a customer during a shopping session in the physical store. In certain embodiments, the tool then uses the virtual store and the videos of the shopping session in the physical store to generate a virtual shopping cart, storing a set of items configured to emulate the items selected by the customer in the physical store. Accordingly, the tool may use the virtual shopping cart to charge the customer for his/her purchases. In some embodiments, the tool may also be used in conjunction with an algorithm trained to determine the items selected by a customer during a shopping session in a physical store, based on inputs received from sensors located in the physical store. In such embodiments, the tool uses the virtual store and the videos of the shopping session in the physical store to verify the determination made by the algorithm. Certain embodiments of the tool are described below.

According to one embodiment, an apparatus includes an interface, a display, a memory, and a hardware processor communicatively coupled to the memory and the display. The interface receives a first video feed. The first video feed includes a first camera feed corresponding to a first camera located in a physical store and a second camera feed corresponding to a second camera located in the physical store. The first camera is directed at a first location in the physical store. The second camera is directed at a second location in the physical store. The hardware processor stores a first video segment in the memory. The first video segment is assigned to a first person and captures a portion of a shopping session of the first person in the physical store occurring during a time interval between a starting timestamp and an ending timestamp. The first video segment includes a first camera feed segment corresponding to a recording of the first camera feed from the starting timestamp to the ending timestamp, and a second camera feed segment corresponding to a recording of the second camera feed from the starting timestamp to the ending timestamp. The processor also assigns a first slider bar to the first video segment.

Playback of the first camera feed segment and the second camera feed segment is synchronized and the first slider bar controls a playback progress of the first camera feed segment and the second camera feed segment. The processor additionally displays the first camera feed segment and a first copy of the first slider bar in a first region of the display. The processor further displays the second camera feed segment and a second copy of the first slider bar in a second region of the display. The processor also receives an instruction from at least one of the first copy of the first slider bar and the second copy of the first slider bar to adjust the playback progress of the first camera feed segment and the second camera feed segment. In response to receiving the instruction, the processor adjusts the playback progress of the first camera feed segment and the second camera feed segment.

According to another embodiment, an apparatus includes a display, an interface, and a hardware processor communicatively coupled to the display. The interface receives a rack camera feed from a rack camera located in a physical store. The rack camera is directed at a first physical rack of a set of physical racks located in the physical store. The hardware processor displays, in a first region of the display, a virtual layout of a virtual store. The virtual layout is configured to emulate a physical layout of the physical store. The virtual layout includes a first virtual rack assigned to a first physical rack and a second virtual rack assigned to a second physical rack. Here, an arrangement of the first virtual rack and the second virtual rack in the virtual layout is configured to emulate an arrangement of the first physical rack and the second physical rack in the physical layout.

The processor also receives an indication of an event associated with the first physical rack. The event includes a person located in the physical store interacting with the first physical rack. In response to receiving the indication of the event associated with the first physical rack, the processor displays, in a second region of the display, the first virtual rack. The first virtual rack includes a first virtual shelf and a second virtual shelf. The first virtual shelf includes a first virtual item and the second virtual shelf includes a second virtual item. The first virtual item includes a graphical representation of a first physical item located on a first physical shelf of the first physical rack and the second virtual item includes a graphical representation of a second physical item located on a second physical shelf of the first physical rack. The processor additionally displays, in a third region of the display, a rack video segment corresponding to a recording of the rack camera feed from a starting timestamp to an ending timestamp. The rack video segment depicts the event associated with the first physical rack.

According to another embodiment, an apparatus includes a display, an interface, and a hardware processor communicatively coupled to the display. The interface receives a rack video from a rack camera located in a physical store. The rack camera is directed at a first physical rack of a set of physical racks located in the physical store. The rack camera captures video of the first physical rack during a shopping session of a person in the physical store. The processor displays, in a first region of the display, a first virtual rack that emulates the first physical rack. The first virtual rack includes a first virtual shelf and a second virtual shelf. The first virtual shelf includes a first virtual item and the second virtual shelf includes a second virtual item. The first virtual item includes a graphical representation of a first physical item located on a first physical shelf of the first physical rack and the second virtual item includes a graphical representation of a second physical item located on a second physical shelf of the first physical rack.

The processor also displays, in a second region of the display, the rack video. The rack video depicts an event including the person interacting with the first physical rack. The processor additionally displays, in a third region of the display, a virtual shopping cart. The processor further receives information associated with the event. The information identifies the first virtual item, and the rack video depicts that the person selected the first physical item while interacting with the first physical rack. In response to receiving the information associated with the event, the processor stores the first virtual item in the virtual shopping cart.

According to another embodiment, an apparatus configured to create a virtual layout of a virtual store to emulate a physical layout of a physical store includes a memory and a hardware processor communicatively coupled to the memory. The hardware processor receives a first physical position and a first physical orientation associated with a first physical rack located in the physical store. In response to receiving the first physical position and the first physical orientation, the processor places a first virtual rack at a first virtual position and with a first virtual orientation on the virtual layout. The first virtual position of the first virtual rack on the virtual layout represents the first physical position of the first physical rack on the physical layout and the first virtual orientation of the first virtual rack on the virtual layout represents the first physical orientation of the first physical rack on the physical layout. The processor also receives a first virtual item associated with a first physical item located on a first physical shelf of the first physical rack. In response to receiving the first virtual item, the processor places the first virtual item on a first virtual shelf of the first virtual rack. The first virtual shelf of the first virtual rack represents the first physical shelf of the first physical rack.

The processor additionally receives a second virtual item associated with a second physical item located on a second physical shelf of the first physical rack. In response to receiving the second virtual item, the processor places the second virtual item on a second virtual shelf of the first virtual rack. The second virtual shelf of the first virtual rack represents the second physical shelf of the first physical rack. The processor further assigns a first rack camera located in the physical store to the first virtual rack. The first rack camera captures video that includes the first physical rack. The processor also stores the virtual layout in the memory.

According to another embodiment, an apparatus includes a hardware processor. The processor receives an algorithmic shopping cart that includes a first set of items. The first set of items is determined by an algorithm to have been selected by a first person during a shopping session in a physical store, based on a set of inputs received from sensors located within the physical store. The processor also receives a virtual shopping cart that includes a second set of items associated with the shopping session. Video of the shopping session was captured by a set of cameras located in the physical store. The video depicts the person selecting the second set of items. The processor additionally compares the algorithmic shopping cart to the virtual shopping cart. In response to comparing the algorithmic shopping cart to the virtual shopping cart, the processor determines that a discrepancy exists between the algorithmic shopping cart and the virtual shopping cart. The processor further determines a subset of the set of inputs associated with the discrepancy. The processor also attaches metadata to the subset. The metadata explains the discrepancy. The processor additionally uses the subset to train the algorithm.

Certain embodiments provide one or more technical advantages. For example, an embodiment reduces the processing resources spent when reviewing surveillance video of a customer in a store, by presenting multiple camera views of the store at once, synchronized with one another, and configured to capture the shopping session of the customer. As another example, an embodiment increases the efficiency of a shopping session through the use of automation and remote monitoring techniques. As a further example, an embodiment provides an independent verification of a machine learning tracking algorithm, configured to track a customer in a physical store. The system described in the present disclosure may particularly be integrated into a practical application of a remote monitoring system for a physical location, such as a store, where inputs from sensors located in the store may be used to monitor and track events occurring within the store.

Certain embodiments may include none, some, or all of the above technical advantages. One or more other technical advantages may be readily apparent to one skilled in the art form the figures, descriptions, and claims included herein.

BRIEF DESCRIPTION OF THE DRAWINGS

For a more complete understanding of the present disclosure, reference is now made to the following description, taken in conjunction with the accompanying drawings, in which:

FIGS. 1A and 1B present a comparison between a physical store and a virtual store;

FIG. 5A illustrates example locations in a physical store of cameras configured to capture regions of the store for use in the system illustrated in FIG. 4;

FIGS. 13C and 13D illustrate an example of the use of sensors coupled to a physical shelf in a physical store to define zones of the physical shelf and its corresponding virtual shelf;

DETAILED DESCRIPTION

Figure 2A:
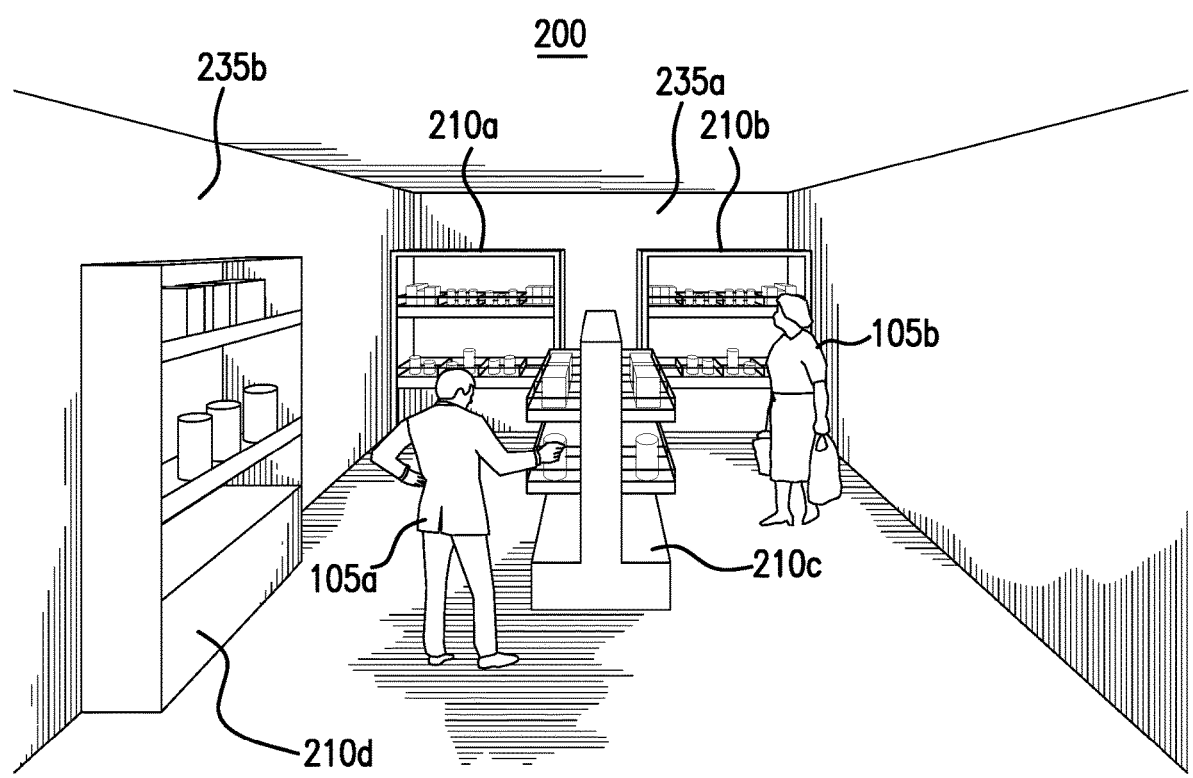
FIGS. 2A and 2B present a comparison between a physical layout of a physical store and a virtual layout of a virtual store.

Embodiments of the present disclosure and its advantages may be understood by referring to FIGS. 1 through 16 of the drawings, like numerals being used for like and corresponding parts of the various drawings. Additional information is disclosed in U.S. patent application Ser. No. 16/663,633 entitled, "Scalable Position Tracking System For Tracking Position In Large Spaces" and U.S. patent application Ser. No. 16/663,710 entitled, "Topview Object Tracking Using a Sensor Array" which are both hereby incorporated by reference herein as if reproduced in their entirety.

I. Introduction to Virtual Emulation

This disclosure is generally directed to generating a virtual store that is configured to emulate a physical store, and using the virtual store, along with videos of a shopping session occurring within the physical store, to virtually emulate the physical shopping session. Although this disclosure describes virtual emulation of a physical store, this disclosure contemplates that any type of physical space (e.g., a warehouse, a storage center, an amusement park, an airport, an office building, etc.) may be virtually emulated using the tool described in the present disclosure. For example, the physical store may be a convenience store or a grocery store. This disclosure also contemplates that the physical store may not be a physical building, but a physical space or environment in which shoppers may shop. For example, the physical store may be a grab and go pantry at an airport, a kiosk in an office building, or an outdoor market at a park, etc.

As illustrated in FIG. 1A, a physical store 100 is a brick and mortar store—i.e., a store that is located in a physical building. Customers 105 (who may carry mobile devices 125) enter physical store 100 to purchase items. On the other hand, a virtual store 110 is a computerized representation of a physical store, displayed on a computer or other device 115 belonging to a user 120, as illustrated in FIG. 1B. This disclosure contemplates that user 120 may use virtual store 110 to emulate a shopping session of customer 105 in physical store 100. Virtual store 110 may be generated locally on device 115 or generated remotely and transmitted over a network to device 115.

Figure 2B:
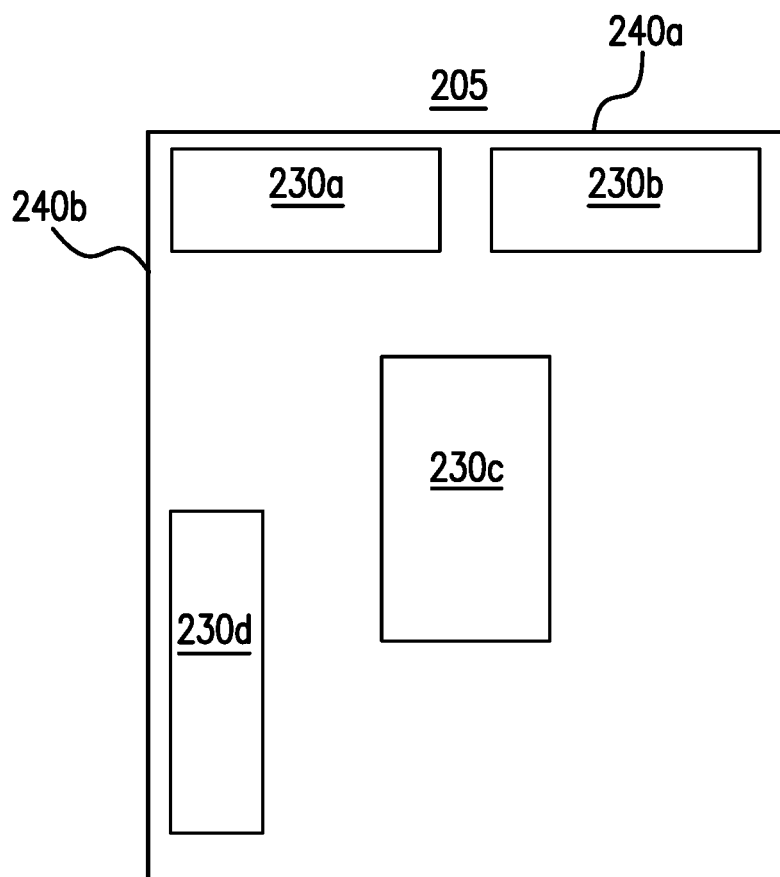

Virtual store 110 may be configured to emulate physical store 100 in several different ways. For example, in certain embodiments, and as illustrated in FIGS. 2A and 2B, the virtual layout 205 of virtual store 110 is configured to emulate the physical layout 200 of physical store 100. In particular, the shape, location, and orientation of virtual display racks 230a, 230b, 230c, and 230d are configured to emulate the shape, location, and orientation of physical display racks 210a, 210b, 210c, and 210d. For example, in the example illustrated in FIG. 2A, physical display racks 210a and 210b are located along back wall 235a of physical layout 200 of physical store 100. Accordingly, virtual display racks 230a and 230b are placed along back wall 240a of virtual layout 205 of virtual store 110, to emulate the location and orientation of physical display racks 210a and 210b. Similarly, virtual display rack 230d is placed along side wall 240b of virtual layout 205, to emulate the position and orientation of physical display rack 210d along side wall 235b, and virtual display rack 230c is placed in the center of virtual layout 205, to emulate the position and orientation of physical display rack 210c.

As another example, in some embodiments, the contents of virtual display racks 230a, 230b, 230c, and 230d are configured to emulate the contents of physical display racks 210a, 210b, 210c, and 210d. For example, in certain embodiments, virtual display racks 230a, 230b, 230c, and 230d are each assigned a list of items, wherein the list of items includes those items stored on physical rack 210a, 210b, 210c, and 210d, respectively. In other embodiments, each virtual display rack is assigned a set of virtual shelves, where the number and placement of the virtual shelves on the virtual display rack are configured to emulate the number and placement of the physical shelves on the corresponding physical display rack. Each virtual shelf of the set of virtual shelves then holds a set of virtual items that is configured to emulate the set of physical items stored on a corresponding physical shelf. Here the virtual items may be configured to emulate the physical items in terms of appearance and/or positioning on the virtual shelf.

Figure 3A:
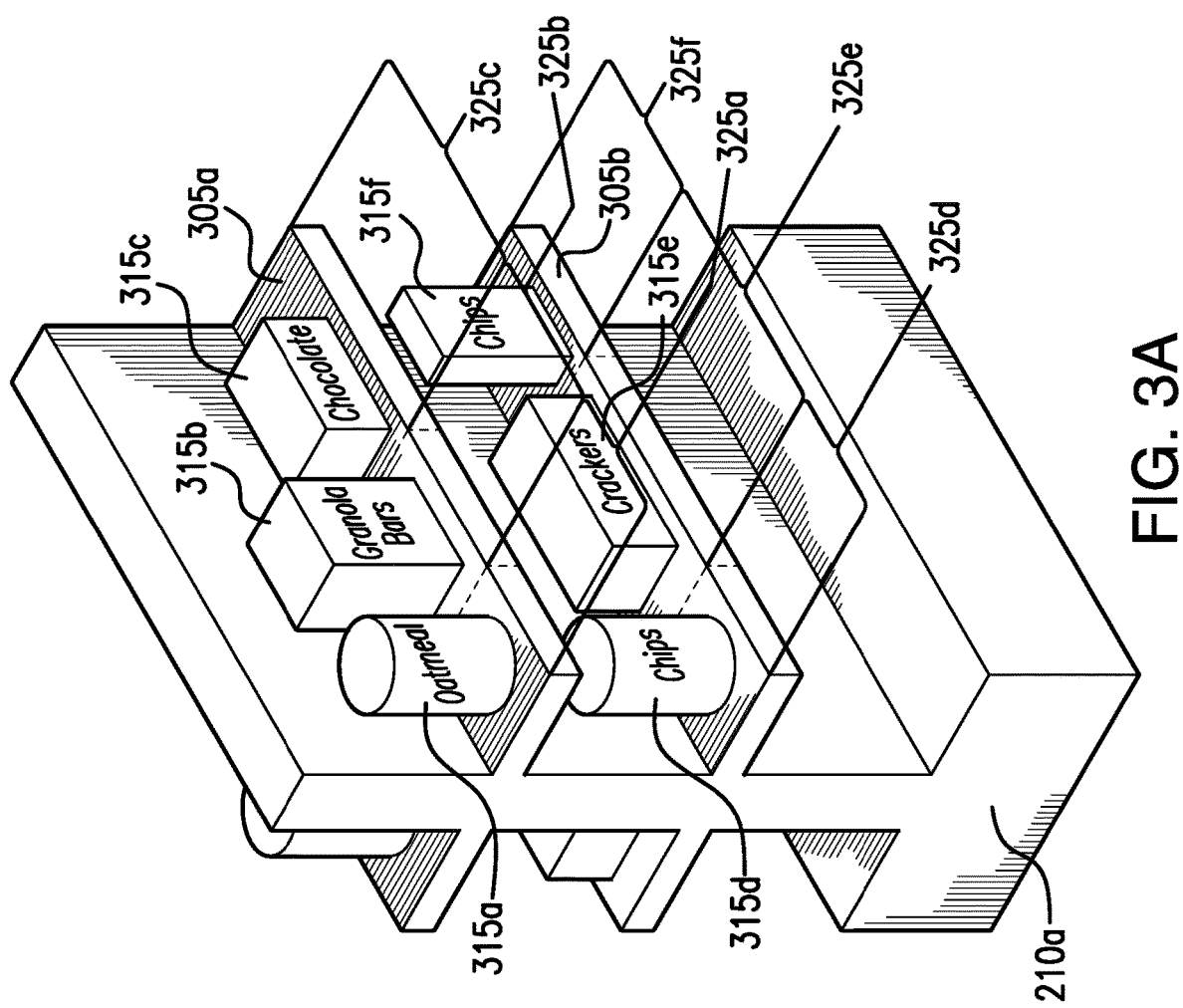
FIGS. 3A and 3B present a comparison between a physical rack in a physical store and a virtual rack in a virtual store.
Figure 3B:
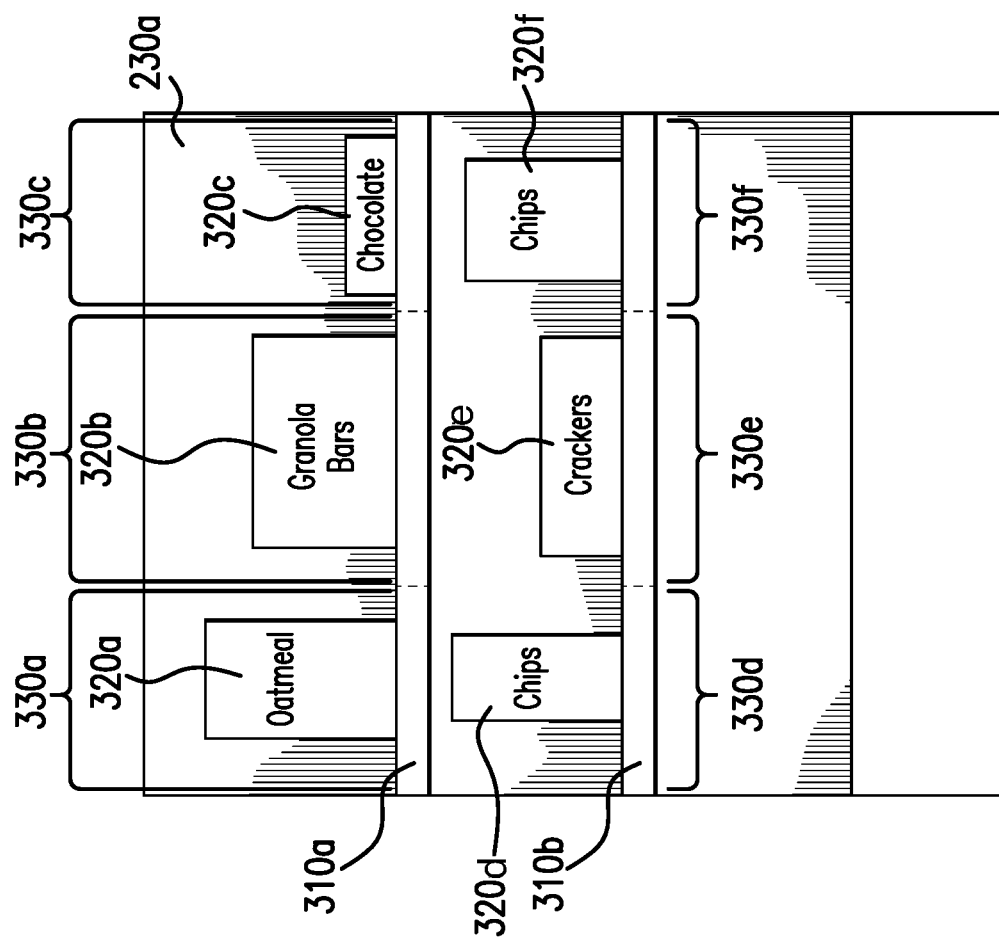

As a specific example, FIGS. 3A and 3B present a comparison between physical display rack 210a and virtual display rack 230a in one embodiment. As seen in FIG. 3A, physical display rack 210a includes two physical shelves—first physical shelf 305a and second physical shelf 305b. Accordingly, to emulate physical display rack 210a, virtual display rack 230a also includes two shelves—first virtual shelf 310a and second virtual shelf 310b. Additionally, each of virtual shelves 310a and 310b includes a set of virtual items configured to emulate the physical items stored on the corresponding physical shelf of physical shelves 305a and 305b. For example, virtual shelf 310a includes first virtual item 320a, located in first virtual zone 330a of virtual shelf 310a, second virtual item 320b, located in second virtual zone 330b of virtual shelf 310a, and third virtual item 320c, located in third virtual zone 330c of virtual shelf 310a, positioned to emulate the positioning of first physical item 315a in first physical zone 325a of physical shelf 305a, second physical item 315b in second physical zone 325b of physical shelf 305a, and third physical item 315c in third physical zone 325c of physical shelf 305a. Similarly, virtual shelf 310b includes fourth virtual item 320d, fifth virtual item 320e, and sixth virtual item 320f, positioned, respectively, in fourth virtual zone 330d, fifth virtual zone 330e, and sixth virtual zone 330f of virtual shelf 310b, to emulate the positioning of fourth physical item 315d, fifth physical item 315e, and sixth physical item 315f in fourth physical zone 325d, fifth physical zone 325e, and sixth physical zone 325f of physical shelf 305b. Additionally, each of virtual items 320a through 320f is configured to emulate the appearance of the corresponding physical item 315a, 315b, 315c, 315d, 315e, or 315f. For example, each virtual item may correspond to a two-dimensional, graphical representation of the corresponding physical item. In this manner, a virtual item may easily be identified based on the appearance of its real world, physical counterpart.

II. System Overview

Figure 4:
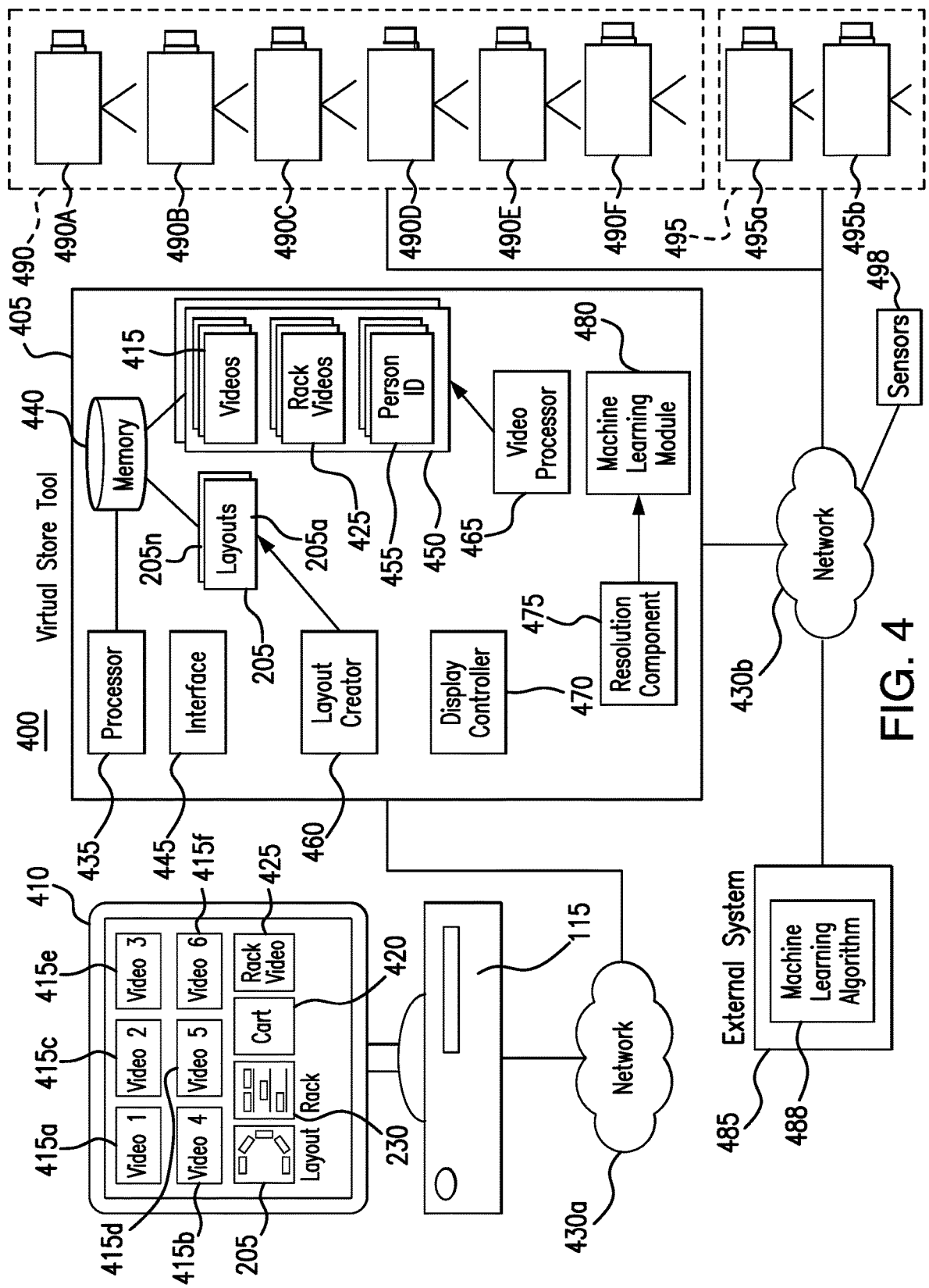
FIG. 4 illustrates an example system according to the present disclosure.

FIG. 4 illustrates an example system 400 that includes virtual store tool 405, device 115, display 410, network 430a, network 430b, layout cameras 490, and rack cameras 495. In certain embodiments, system 400 additionally includes external system 485 and sensors 498. Generally, virtual store tool 405 is configured to generate a virtual store 110 that emulates a physical store 100. In certain embodiments, virtual store tool 405 uses virtual store 110 to generate a receipt for a shopping session conducted by a person 105 in physical store 100, based in part on videos tracking the shopping session, received from layout cameras 490 and/or rack cameras 495 located in the physical store 100. In some embodiments, virtual store tool 405 uses virtual store 110 and videos received from layout cameras 490 and rack cameras 495 to validate a determination made by an algorithm 488 of the items selected by person 105 during the shopping session in physical store 100.

Device 115 includes any appropriate device for communicating with components of system 400 over network 430a. For example, device 115 may be a telephone, a mobile phone, a computer, a laptop, a wireless or cellular telephone, a tablet, a server, an IoT device, and/or an automated assistant, among others. This disclosure contemplates device 115 being any appropriate device for sending and receiving communications over network 430a. Device 115 may also include a user interface, such as a microphone, keypad, or other appropriate terminal equipment usable by user 120. In some embodiments, an application executed by a processor of device 115 may perform the functions described herein.

Device 115 may include or be coupled to display 410. Display 410 is a screen used by device 115 to display information received from virtual store tool 405. In certain embodiments, display 410 is a standard display used in a laptop computer. In certain other embodiments, display 410 is an external display device connected to a laptop or desktop computer. In further embodiments, display 410 is a standard touch-screen liquid crystal display found in a typical smartphone or tablet.

As illustrated in FIG. 4, in certain embodiments, display 410 may present camera feed segments 415a through 415f, virtual layout 205, virtual rack 230, virtual shopping cart 420, and/or rack camera feed segment 425. Camera feed segments 415a through 415f are video recordings of camera feeds received by virtual store tool 405 from layout cameras 490 located in physical store 100, and are assigned to a person 105 conducting a shopping session in physical store 100. The method by which virtual store tool 405 generates camera feed segments 415a through 415f and displays camera feed segments 415a through 415f on display 410 is described in further detail below, in the discussion of FIGS. 5 through 8.

Virtual layout 205 is assigned to the particular physical store 100 from which virtual store tool 405 received the camera feeds associated with camera feed segments 415a through 415f, and is configured to emulate the physical layout 200 of that physical store. The method by which virtual store tool 405 generates virtual layout 205 is described in further detail below, in the discussion of FIGS. 11 and 12.

Virtual rack 230 corresponds to one of the virtual racks included in virtual layout 205 and is configured to emulate a physical rack 210 of physical store 100. Accordingly, virtual rack 230 displays a set of virtual items 320, with each virtual item 320 representing a physical item 315 stored on the corresponding physical rack 210. Virtual shopping cart 420 is used to hold virtual items 320, each of which represents a physical item 315 selected by person 105 during the shopping session in physical store 100. Rack camera feed segment 425 is a recording of a camera feed received by virtual store tool 405 from a rack camera 495. Rack camera 495 is directed at the physical rack 210 of physical store 100 to which virtual rack 230 is assigned. Virtual shopping cart 420 may be populated by virtual items 320 stored on virtual rack 230, based in part on rack camera feed segment 425. The method by which virtual store tool 405 determines a virtual rack 230 to display on display 410 and then uses virtual rack 230 to populate virtual shopping cart 420 is described in further detail below, in the discussion of FIGS. 9 and 10.

Figure 11A:
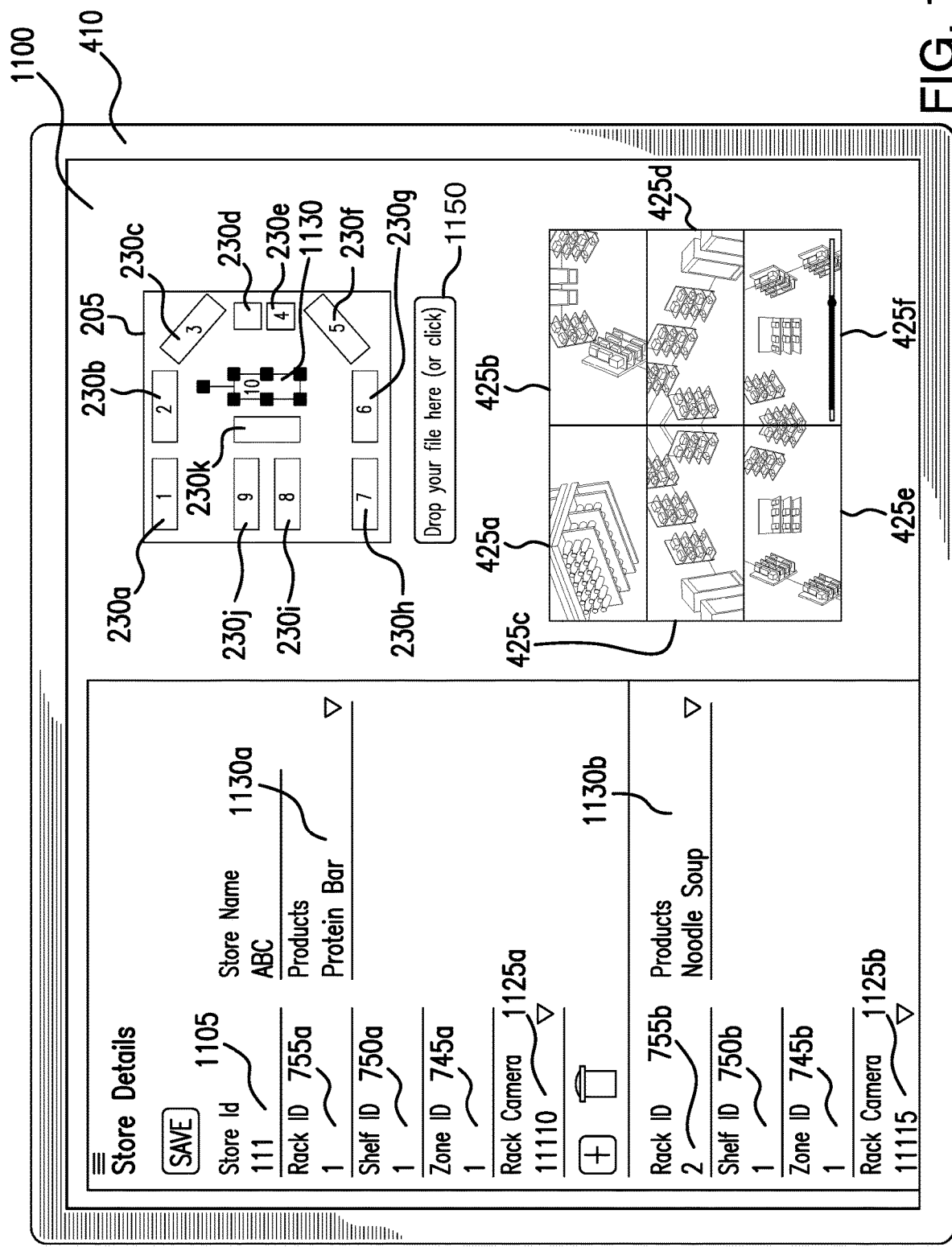
FIGS. 11A and 11B illustrate an example embodiment of a graphical user interface generated by the virtual store tool of the system illustrated in FIG. 4, which may be used to generate a virtual layout configured to emulate a physical layout of a physical store.
Figure 11B:
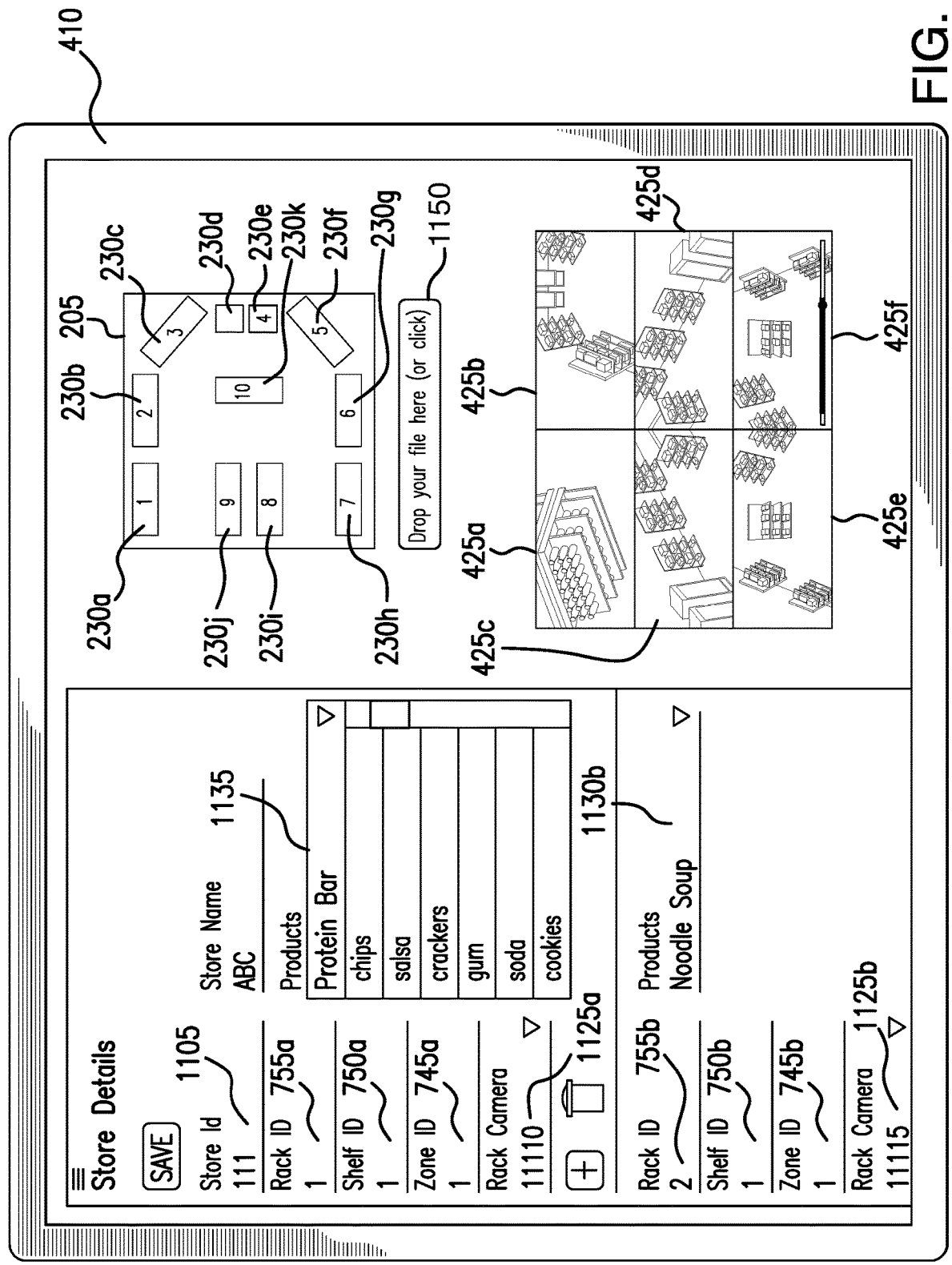

In some embodiments, and as described in further detail below, with respect to FIGS. 11A and 11B, display 410 displays a graphical user interface through which a user 120 may generate a virtual layout 205 configured to emulate a physical layout 200 of a physical store 100.

Network 430a facilitates communication between and amongst the various components of system 400 located outside of network 430b, connecting layout cameras 490, rack cameras 495, and external system 485 to virtual store tool 405. This disclosure contemplates network 430a being any suitable network that facilitates communication between such components of system 400. Network 430a may include any interconnecting system capable of transmitting audio, video, signals, data, messages, or any combination of the preceding. Network 430a may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Network 430b facilitates communication between and amongst the various components of virtual store tool 405 and layout cameras 490, rack cameras 495, and external system 485. This disclosure contemplates network 430b being any suitable network that facilitates communication between the components of virtual store tool 405 and layout cameras 490, rack cameras 495, and external system 485. Network 430*b* may include any interconnecting system capable of transmitting audio, video, signals, data, messages, or any combination of the preceding. Network 430*b* may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. This disclosure contemplates that network 430*b* may be the same network as network 430*a* or a separate network from network 430*a*.

As seen in FIG. 4, virtual store tool 405 includes a processor 435, a memory 440, and an interface 445. This disclosure contemplates processor 435, memory 440, and interface 445 being configured to perform any of the functions of virtual store tool 405 described herein. Generally, virtual store tool 405 implements layout creator 460, video processor 465, display controller 470, resolution component 475, and machine learning module 480. Virtual store tool 405 may use layout creator 460 to generate a virtual layout 205 configured to emulate a physical layout 200 of a physical store 100. This function of virtual store tool 405 is described in further detail below, in the discussion of FIGS. 11 and 12. Virtual store tool 405 may use video processor 465 to generate camera feed segments 415 and rack camera feed segments 425, assigned to a person 105 conducting a shopping session in physical store 100, based on camera feeds received from layout cameras 490 and rack cameras 495, respectively. This function of virtual store tool 405 is described in further detail below, in the discussion of FIGS. 5 through 8. Virtual store tool 405 may use display controller 470 to adjust the information displayed on display 410, based on input received from device 115. This function of virtual store tool 405 is described in further detail below, in the discussion of FIGS. 7 through 12. Virtual store tool 405 may use resolution component 475 to compare the contents of virtual cart 420 to an algorithmic shopping cart, determined by an algorithm 488 to contain items selected by customer 105 during a shopping session in physical store 100. Resolution component 475 may identify any discrepancies between virtual cart 420 and the algorithmic cart, resolve such discrepancies, and generate a receipt to send to customer 105. Resolution component 475 will be described in further detail below, in the discussion of FIG. 14. Finally, virtual store tool 405 may use machine learning module 480 to identify discrepancies between virtual shopping cart 420 and the algorithmic cart and assign metadata to the algorithmic inputs associated with the discrepancies. This metadata may then be used to retrain the algorithm. Machine learning module 480 will be described in further detail below, in the discussion of FIGS. 15 and 16.

Processor 435 is any electronic circuitry, including, but not limited to microprocessors, application specific integrated circuits (ASIC), application specific instruction set processor (ASIP), and/or state machines, that communicatively couples to memory 440 and controls the operation of virtual store tool 405. Processor 435 may be 8-bit, 16-bit, 32-bit, 64-bit or of any other suitable architecture. Processor 435 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 435 may include other hardware and software that operates to control and process information. Processor 435 executes software stored on memory to perform any of the functions described herein. Processor 435 controls the operation and administration of virtual store tool 405 by processing information received from network 430*a*, network 430*b*, memory 440, device(s) 115, layout cameras 490, rack cameras 495, and external system 485. Processor 435 may be a programmable logic device, a microcontroller, a microprocessor, any suitable processing device, or any suitable combination of the preceding. Processor 435 is not limited to a single processing device and may encompass multiple processing devices.

Memory 440 may store, either permanently or temporarily, data, operational software, or other information for processor 435. Memory 440 may include any one or a combination of volatile or non-volatile local or remote devices suitable for storing information. For example, memory 440 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 440, a disk, a CD, or a flash drive. In particular embodiments, the software may include an application executable by processor 435 to perform one or more of the functions described herein.

Additionally, in certain embodiments, memory 440 may store virtual layouts 205 and sets of videos 450. Each of virtual layouts 205*a* through 205*n* corresponds to a different physical store 100 and is configured to emulate the physical layout 200 of physical store 100. Virtual layouts 205 may be stored in memory 440 according to a store identification number. In this manner, a given virtual layout 205*a* may be retrieved from memory 440 using the store identification number. This disclosure contemplates that set of videos 450 includes the camera feed segments 415 and rack camera feed segments 425 assigned to a given person 105, for example, through identification number 455. Such segments are video recordings of camera feeds received by virtual store tool 405 from layout cameras 490 and rack cameras 495, respectively. For example, set of videos 450 may include camera feed segments 415*a* through 415*f* and rack camera feed segments 425, assigned to a person 105. The manner in which virtual store tool 405 generates sets of videos 450 is described in further detail below, in the discussion of FIG. 6.

Interface 445 represents any suitable device operable to receive information from networks 430*a* and 430*b*, transmit information through networks 430*a* and 430*b*, perform suitable processing of the information, communicate to other devices, or any combination of the preceding. For example, interface 445 receives camera feeds from layout cameras 490 and rack cameras 495. As another example, interface 445 receives input from device 115. Interface 445 represents any port or connection, real or virtual, including any suitable hardware and/or software, including protocol conversion and data processing capabilities, to communicate through a LAN, WAN, or other communication systems that allows virtual store tool 405 to exchange information with device 115, layout cameras 490, rack cameras 495, and/or other components of system 400 via networks 430*a* and 430*b*.

External system 485 represents any system operable to receive input from sensors 498 located in physical store 100 and to apply an algorithm 488 to this input to track customers 105 in physical store 100 and/or to determine physical items 315 selected by such customers during shopping sessions in physical store 100. Embodiments of external system 485 are described in U.S. patent application Ser. No. 16/663,710 entitled, "Topview Object Tracking Using a Sensor Array", the contents of which are incorporated by reference herein. This disclosure contemplates that sensors 498 may include any type of suitable sensors, located in physical store 100, and operable to detect customers 105 in physical store 100. For example, physical store 100 may include cameras, light detection and range sensors, millimeter wave sensors, weight sensors, and/or any other appropriate sensors, operable to track a customer 105 in physical store 100 and detect information associated with customer 105 selecting one or more items 315 from physical store 100. This disclosure also contemplates that algorithm(s) 488 may be any suitable algorithm(s) for tracking customers 105 in physical store 100 and determining items 315 selected by customers 105. For example, in certain embodiments, algorithm(s) 488 may be a machine learning algorithm(s).

Layout cameras 490 and rack cameras 495 are located in physical store 100. Each of layout cameras 490a through 490f is directed at a location in physical store 100 and captures video and/or images of a region in space around the location. Each of rack cameras 495 is directed at a physical display rack 210 located in physical store 100 and captures video and/or images of the physical display rack 210 and the region in space around the physical display rack 210. This disclosure contemplates that any number of layout cameras 490 may be installed in physical store 100 and connected to virtual store tool 405 through network 430b. Similarly, any number of rack cameras 495 may be installed in physical store 100 and connected to virtual store tool 405 through network 430b. For example, in some embodiments, physical store 100 contains the same number of rack cameras 495 as physical shelves 210. In other embodiments, physical store 100 contains more rack cameras 495 than physical shelves 210. In certain embodiments, rack cameras 495 are the same as layout cameras 490. In other embodiments, rack cameras 495 are distinct from layout cameras 490. The operation of layout cameras 490 and rack cameras 495 is described in further detail below, in the discussion of FIGS. 5 and 6.

Modifications, additions, or omissions may be made to the systems described herein without departing from the scope of the invention. For example, system 400 may include any number of users 120, devices 115, displays 410, networks 430a and 430b, layout cameras 490, rack cameras 495, and external systems 485. The components may be integrated or separated. Moreover, the operations may be performed by more, fewer, or other components. Additionally, the operations may be performed using any suitable logic comprising software, hardware, and/or other logic.

III. Customer-Based Video Tracking

As described above, virtual store tool 405 may use virtual layout 205 to emulate a shopping session of a customer 105 in a physical store 100 captured by cameras feed segments 415 and/or 425. FIGS. 5 through 8 are used to describe the method by which virtual store tool 405 generates and displays camera feed segments 415 and/or 425.

a. Cameras Used for Customer-Based Video Tracking

FIG. 5A illustrates example locations of layout cameras 490 and rack cameras 495 in a physical store 100. The numbers of layout cameras 490 and rack cameras 495 chosen for a physical store 100 may depend on the size and/or layout of physical store 100. As seen in the example of FIG. 5A, physical store 100 may include five layout cameras 490a through 490e. While illustrated as located on the ceiling of physical store 100, this disclosure contemplates that layout cameras 490 may be mounted anywhere in physical store 100. Additionally, in the example of FIG. 5A, physical store 100 may include four rack cameras 495a through 495d. While illustrated as located both on the ceiling and sidewalls of physical store 100, this disclosure contemplates that rack cameras 495 may be mounted anywhere in physical store 100. Rack cameras 495 may be separate from layout cameras 490 or the same as layout cameras 490.

Each of rack cameras 495 is directed at a rack 210 located in physical store 100. For example, as illustrated in FIG. 5A, rack camera 495a is directed at physical display rack 210a, rack camera 495b is directed at physical display rack 210b, rack camera 495c is directed at physical display rack 210c, and rack camera 495d is directed at physical display rack 210d. While FIG. 5A illustrates a set of five layout cameras 490 and a set of four rack cameras 495 in physical store 100, this disclosure contemplates that any suitable number of layout cameras 490 and rack cameras 495 may be used in physical store 100, depending on the size and/or layout of physical store 100. FIG. 5A additionally illustrates a set of turnstiles 510 located in physical store 100. Turnstiles 510 may be used to control the entry and exit of customers 105 into or out of physical store 100, as described in further detail below, in the discussion of FIG. 6.

Figure 5B:
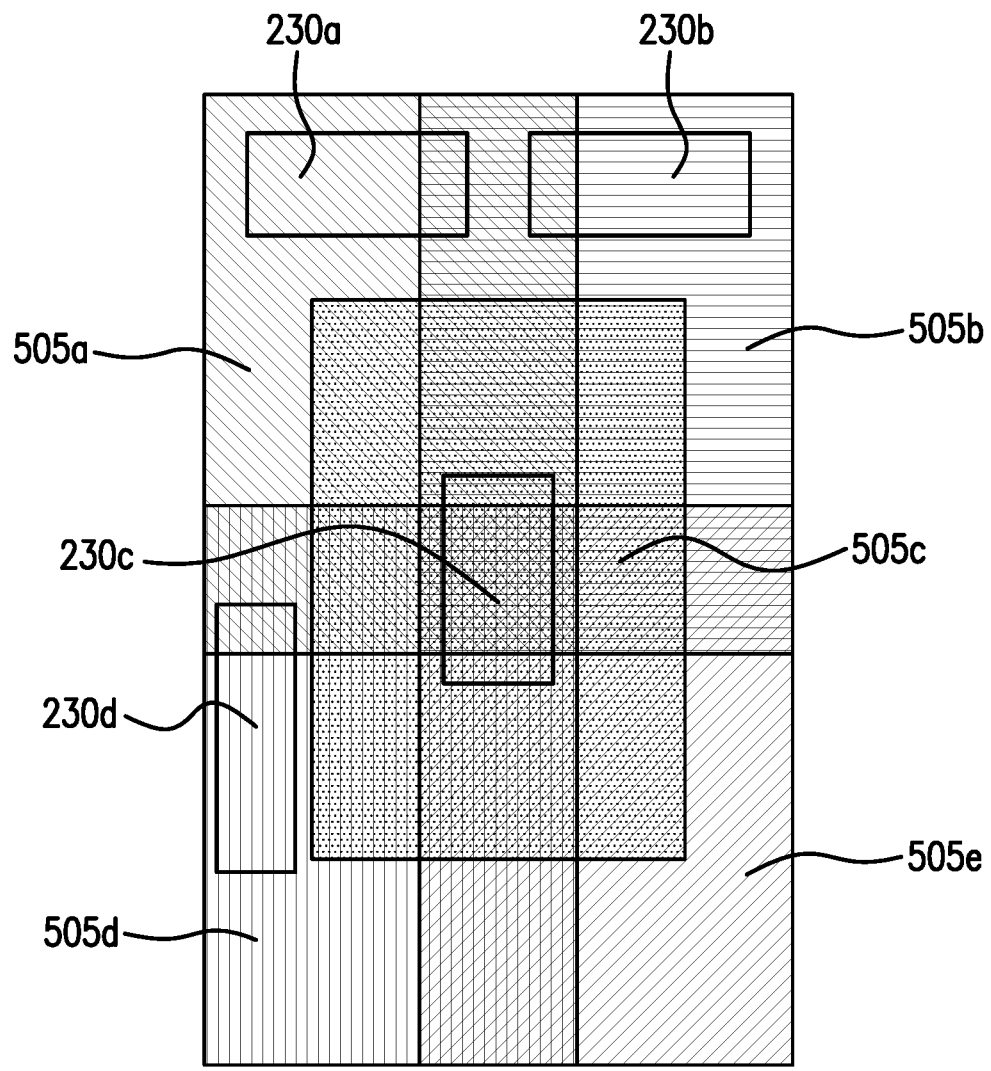
FIG. 5B illustrates an example of the regions of a physical store captured by the layout cameras of the system illustrated in FIG. 4.

As illustrated in FIG. 5B, each of layout cameras 490 is directed at a particular location in physical store 100 and captures a region 505 of the layout 200 of physical store 100, surrounding the location. For example, first layout camera 490a is directed at a first location and captures video and/or images of a first region 505a of physical store 100; second layout camera 490b is directed at a second location and captures video and/or images of a second region 505b of physical store 100; third layout camera 490c is directed at a third location and captures video and/or images of a third region 505c of physical store 100; fourth layout camera 490d is directed at a fourth location and captures video and/or images of a fourth region 505d of physical store 100; and fifth layout camera 490e is directed at a fifth location and captures video and/or images of a fifth region 505e of physical store 100. In certain embodiments, layout cameras 490 may capture overlapping regions of physical store 100. For example, as illustrated in FIG. 5B, all of third region 505c is overlapped by portions of first region 505a, second region 505b, fourth region 505d, and fifth region 505e. The overlapping regions of physical store 100 may be a result of the proximity of layout cameras 490 to one another. Generally, by capturing overlapping regions of physical store 100, certain portions of physical layout 200 can be captured by multiple layout cameras 490. This may be desirable, to provide sufficient camera coverage of physical layout 200 in the event that certain of layout cameras 490 malfunction or go offline.

While illustrated in FIG. 5B as rectangular in shape, this disclosure contemplates that regions 505 may be of any shape or size. For example, in certain embodiments, regions 505 are elliptical in shape. In some embodiments, regions 505 are of uniform size and shape. For example, as illustrated in FIG. 5B, regions 505a through 505e are all the same shape and size. In other embodiments, regions 505 may include regions 505 of different sizes and shapes.

b. Camera Feed Processing

Figure 6:
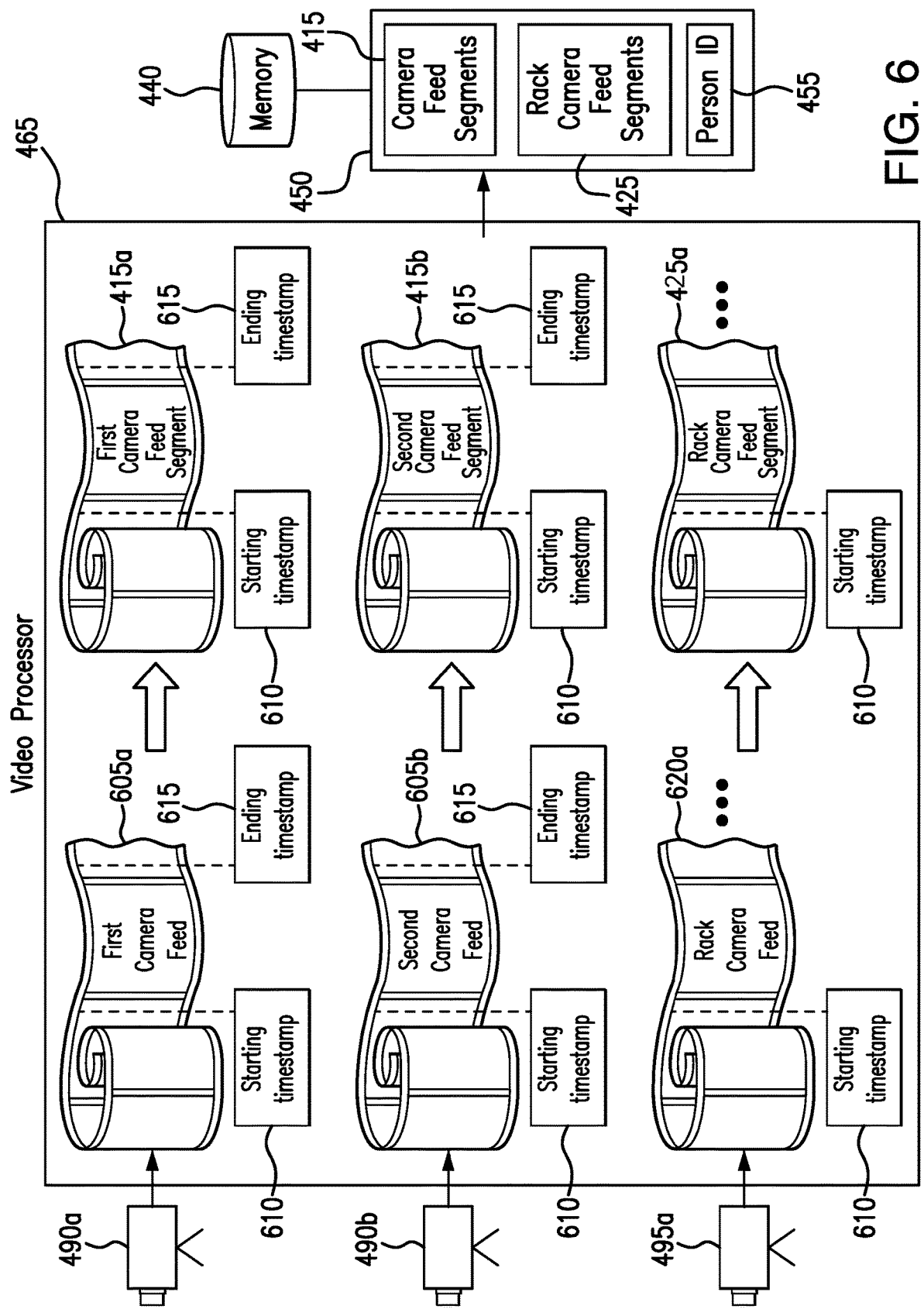
FIG. 6 illustrates the video processor component of the virtual store tool of the system illustrated in FIG. 4.

The videos and/or images of physical store 100 captured by layout cameras 490 and/or rack cameras 495 are transmitted to virtual store tool 405 in the form of camera feeds. Virtual store tool 405 then uses video processor 465 to generate camera feed segments 415 and rack camera feed segments 425, assigned to a person 105 conducting a shopping session in physical store 100, based on these camera feeds. FIG. 6 illustrates the operation of video processor 465 of virtual store tool 405.

FIG. 6 presents an example of the operation of video processor 465 of virtual store tool 405, in an embodiment that includes a first layout camera 490a, a second layout camera 490b, and a rack camera 495a. As illustrated in FIG. 6, video processor 465 receives first camera feed 605a from first layout camera 490a, second camera feed 605b from second layout camera 490b, and rack camera feed 620a from rack camera 495a. In certain embodiments, video processor 465 receives first camera feed 605a, second camera feed 605b, and rack camera feed 620a directly from layout cameras 490a, 490b, and rack camera 495a. In some embodiments, video processor 465 receives first camera feed 605a, second camera feed 605b, and rack camera feed 620a from interface 445.

Prior to processing camera feeds 605a, 605b, and 620a, video processor 465 first determines that a person 105, associated with an identification number 455, entered physical store 100. This disclosure contemplates that video processor 465 may determine that person 105 entered physical store 100 in any suitable manner. For example, in certain embodiments, physical store 100 includes turnstiles 510, which control the entry of persons 105 into the store. A turnstile 510 may open upon person 105 scanning a QR code, located on a physical card or a mobile device 125 belonging to person 105, using a scanner 515 attached to the turnstile 510. Accordingly, the scanning of the QR code may generate a notification, sent to virtual store tool 405, indicating that person 105 entered physical store 100. As another example, in some embodiments, an algorithm 488 may be used to determine that person 105 entered physical store 100, based on information received from sensors 498 located in physical store 100. An example of such an algorithm 488 will be described in further detail below, in the discussion of FIGS. 13 through 16.

This disclosure contemplates that camera feeds 605 and 620 are synchronized in terms of timestamps, such that video associated with a given timestamp from each of camera feeds 605a, 605b, and 620a corresponds to the same real time within physical store 100. Such synchronization may be achieved in any suitable manner. For example, in certain embodiments, layout cameras 490 and rack cameras 495 are plugged into the same ethernet switch. Determining that person 105 entered physical store 100 may then include receiving a starting timestamp 610 corresponding to the timestamp at which person 105 entered physical store 100.

Given that data packets associated with first camera feed 605a, second camera feed 605b, and rack camera feed 620a may arrive at virtual store tool 405 over network 430b at different times, this disclosure contemplates that rather than virtual store tool 405 streaming first camera feed 605a, second camera feed 605b, and rack camera feed 620a from starting timestamp 610 onwards, video processor 465 of virtual layout tool 405 stores recordings of first camera feed 605a, second camera feed 605b, and rack camera feed 620a, lasting a predefined amount of time, in memory 440. Such recordings may then be replayed, each synchronized with the others according to timestamps. Accordingly, once video processor 465 determines starting timestamp 610, corresponding to the timestamp at which person 105 entered physical store 100, video processor 465 next prepares segments of each camera feed, starting at starting timestamp 610 and ending at ending timestamp 615. Video processor 465 then stores these segments in memory 440. For example, video processor 465 prepares first camera feed segment 415a, corresponding to a recording of first camera feed 605a from starting timestamp 610 to ending timestamp 615, second camera feed segment 415b, corresponding to a recording of second camera feed 605b from starting timestamp 610 to ending timestamp 615, and rack camera feed segment 425a, corresponding to a recording of rack camera feed 620a from starting timestamp 610 to ending timestamp 615. Video processor 465 then stores each of segments 415a, 415b, and 425a in memory 450.

This disclosure contemplates that the time interval between starting timestamp 610 and ending timestamp 615 may be any predetermined amount of time. For example, in certain embodiments, the time interval is five minutes. In order to capture video of a shopping session lasting more than this predetermined amount of time, once camera feeds 605a, 605b, and 620a reach ending timestamp 615, video processor 465 may store additional recordings of camera feeds 605a, 605b, and 620a, starting at ending timestamp 615 and ending at a new ending timestamp, the new ending timestamp occurring at the predetermined amount of time after ending timestamp 615. Video processor 465 may store any number of additional camera feed segments in memory 440, each corresponding to an additional predetermined interval of time. In certain embodiments, video processor 465 continues to record such additional camera feed segments until it receives an indication that person 105 has left physical store 100.

Video processor 465 may store camera feed segments 415 and 425 for any number of persons 105. Accordingly, video processor 465 may store a collection of camera feed segments 415 and 425 assigned to a person 105 as set of videos 450, where set of videos 450 is assigned identification number 455 associated with person 105. As an example, a first person 105a may enter physical store 100 at a first starting timestamp 610a and a second person 105b may enter physical store 100 at a second starting timestamp 610b after the first starting timestamp 610a, wherein the second starting timestamp 610b is within the predefined time interval after first starting timestamp 610a, such that the camera feed segments recorded for first person 105a will contain video that overlaps with the camera feed segments recorded for second person 105b. Accordingly, video processor 465 may store the camera feed segments recorded for first person 105a, along with an identification number 455a, assigned to first person 105a, in memory 440, as set of videos 450a. Similarly, video processor 465 may store the camera feed segments recorded for second person 105b, along with an identification number 455b, assigned to second person 105b, in memory 440, as set of videos 450b. Virtual store tool 405 may then retrieve from memory 440 the camera feed segments associated with a given person 105, using the identification number 455 assigned to that person.

Video processor 465 may be a software module stored in memory 440 and executed by processor 435. An example of the operation of video processor 465 is as follows: (1) receive camera feeds 605 and 620 from cameras 490 and 495, respectively; (2) determine that a person 105 entered physical store 100; (3) determine the timestamp 610 corresponding to the time at which person 105 entered physical store 100; (4) record camera feed segments 415 and 425 from camera feeds 605 and 620, respectively, where the camera feed segments correspond to recordings of camera feeds 605 and 620 from timestamp 610, corresponding to the time at which person 105 entered physical store 100, and lasting a predetermined amount of time to ending timestamp 615; and (5) store camera feed segments 415 and 425 in memory 440 according to an identification number 455 of person 105, as set of videos 450.

c. Displaying Camera Feed Segments

Figure 7A:
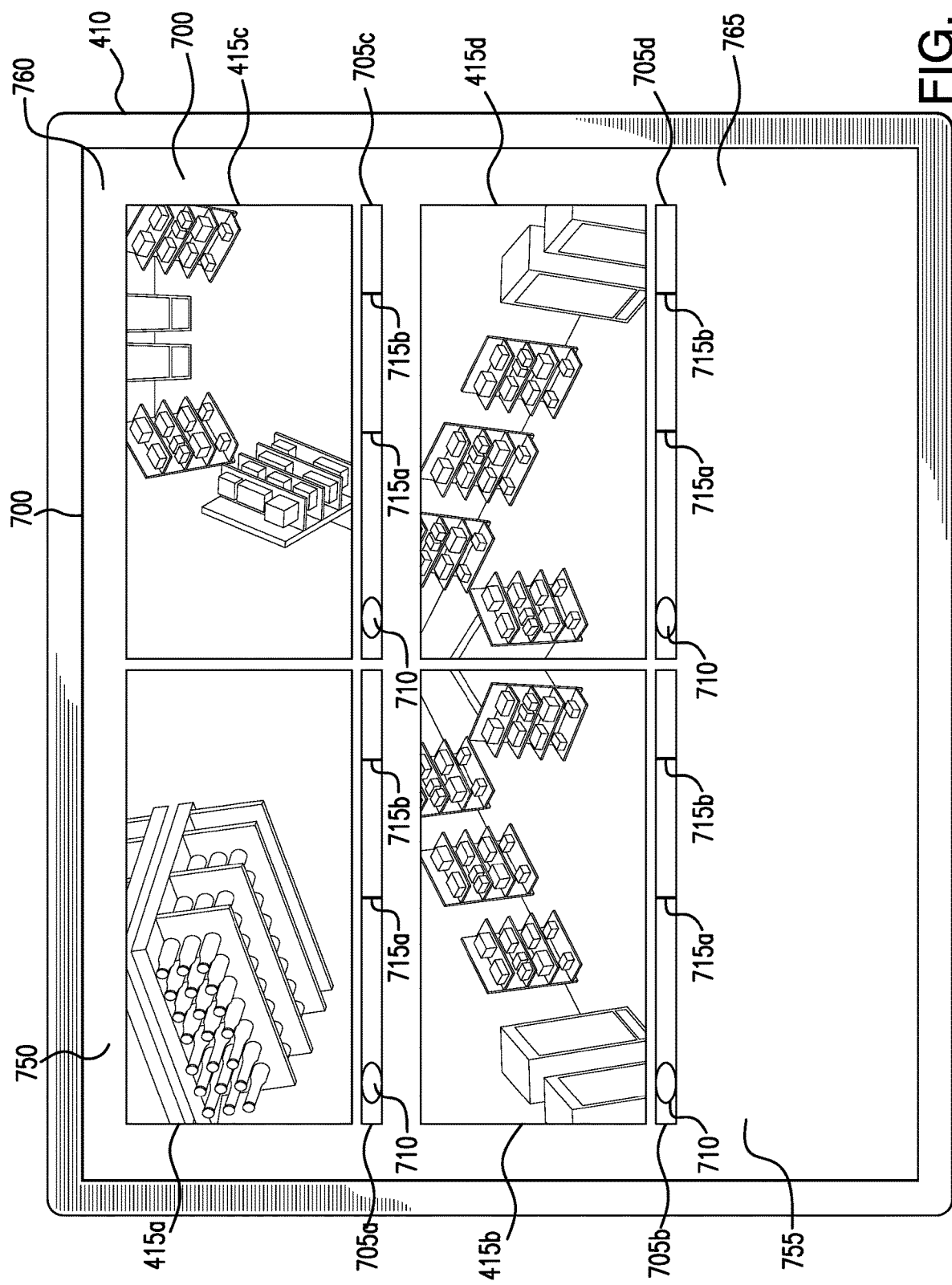
FIGS. 7A through 7C present an example illustrating the manner in which the virtual store tool of the system illustrated in FIG. 4 displays camera feed segments associated with the layout cameras and the rack cameras of the system illustrated in FIG. 4.
Figure 7B:
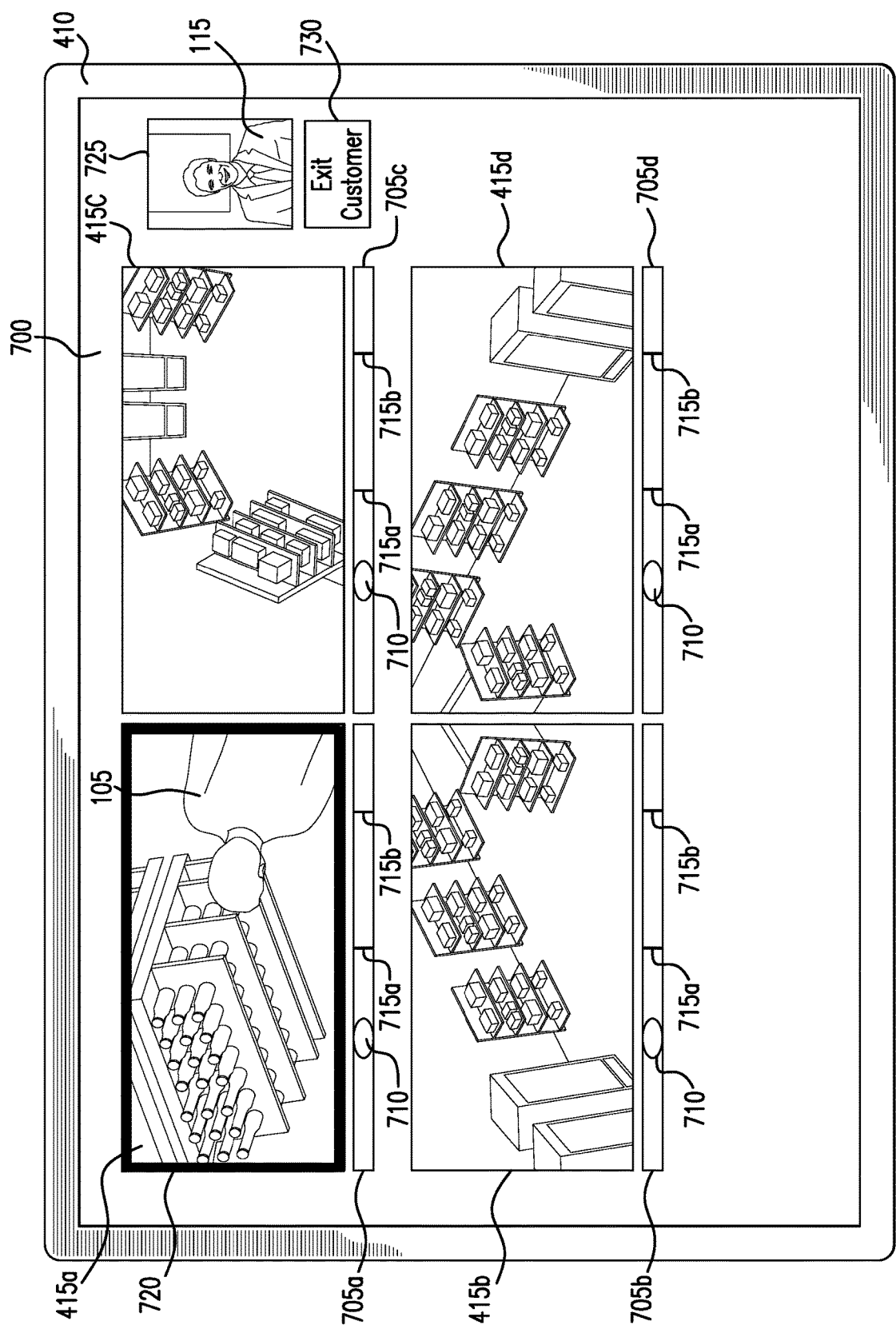
Figure 7C:
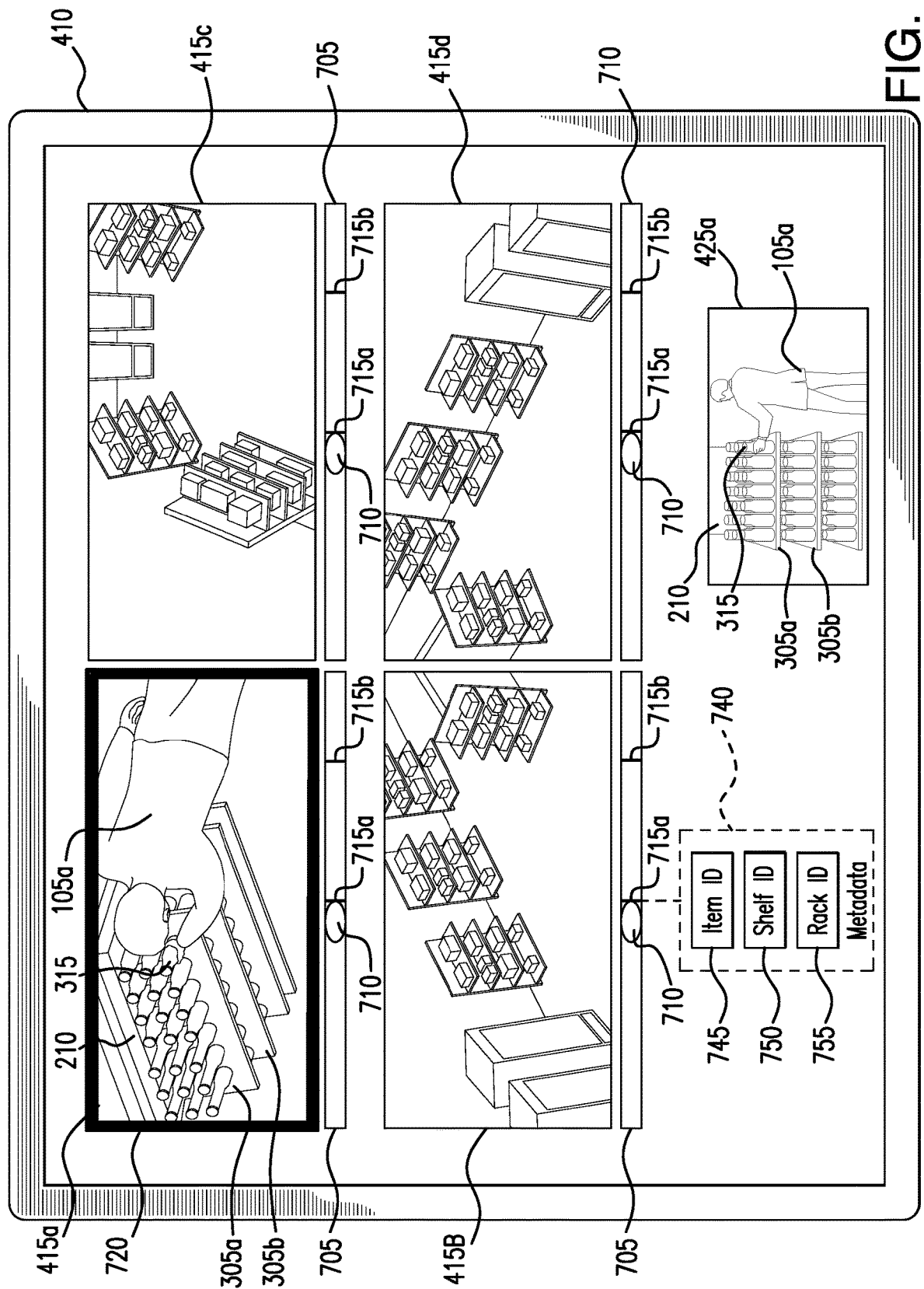

Once video processor 465 has recorded set of videos 450 from camera feeds 605 and 620, virtual store tool 405 may then use display controller 470 to display set of videos 450 on display 410 of device 115. In certain embodiments, virtual store tool 405 may display set of videos 450 on display 410 of device 115 in the form of a graphical user interface 700. FIGS. 7A through 7C present an example illustrating the manner in which virtual store tool 405 displays set of videos 450 on display 410.

FIG. 7A illustrates an embodiment in which virtual store tool 405 instructs display 410 to display four camera feed segments 415a through 415d. Virtual store tool 405 displays first camera feed segment 415a in a first region 750 of display 410, second camera feed segment 415b in a second region 755 of display 410, third camera feed segment 415c in a third region 760 of display 410, and fourth camera feed segment 415d in a fourth region 765 of display 410. Virtual store tool 405 may instruct display 410 to display any number of camera feed segments 415. For example, in certain embodiments, virtual display tool 405 may instruct display 410 to display the same number of camera feed segments 415 as stored in set of videos 450. In some embodiments, virtual display tool 405 may instruct display 410 to display fewer camera feed segments 415 than stored in set of videos 450. This may be desirable in embodiments in which physical store 100 is a large store that includes a large number of layout cameras 490. In such embodiments, displaying all of camera feed segments 415 on display 410 may make it difficult for a user 120 to view specific features of physical store 100 in any one of the displayed camera feed segments 415. Accordingly, virtual store tool 405 may display a subset of camera feed segments 415 on display 410. Virtual store tool 405 may select a subset of camera feed segments 415 to display on display 410 in any suitable manner. As an example, in certain embodiments, virtual store tool 405 may display a subset of camera feed segments 415 that includes, at any given time, those camera feed segments 415 capturing regions of physical store 100 closest to the location of person 105, to whom set of videos 450 is assigned. In such embodiments, when set of videos 450 depicts person 105 moving to a new location in physical store 100, virtual store tool 405 may replace the subset of camera feed segments 415 currently displayed on display 410 with a new subset of camera feed segments 415, which includes those camera feed segments 415 that capture regions of physical store 100 closest to the new location of person 105. Virtual store tool 405 may determine the subset of camera feed segments 415 that capture regions of physical store 100 closest to the location or person 105 in any suitable manner. For example, in certain embodiments, virtual store tool 405 may receive an indication of the location of person 105 from a machine-learning algorithm 488 configured to track the locations of a person 105 in physical store 100, based on inputs received from a set of sensors 498 located in physical store 100.

As illustrated in FIG. 7A, in addition to displaying camera feed segments 415, virtual store tool 405 also assigns a slider bar 705 to set of videos 450 and displays copies of slider bar 705 along with each camera feed segment 415. For example, virtual store tool 405 displays a first copy 705a of slider bar 705 along with first camera feed segment 415a, a second copy 705b of slider bar 705 along with second camera feed segment 415b, a third copy 705c of slider bar 705 along with third camera feed segment 415c, and a fourth copy 705d of slider bar 705 along with fourth camera feed segment 415d. Each copy of slider bar 705 may contain a slider 710 configured to control the playback progress of the associated camera feed segment 415. For example, the position of slider 710 on slider bar 705 indicates the current playback progress of the associated camera feed segment 415. The position of slider 710 may be manually adjusted (e.g., by a user 120) to a new position corresponding to a new playback time. Such adjustment may result in the playback of the associated camera feed segment adjusting to the new playback time.

In certain embodiments, the playback of each camera feed segment 415 is synchronized with that of the other camera feed segments 415, such that an adjustment of the slider 710 on any of the copies of slider bar 705 leads to a corresponding adjustment of the playback progress of all of the displayed camera feed segments 415. For example, if slider 710 is adjusted on first copy 705a of slider bar 705 from a first playback time to a second playback time, slider 710 on second copy 705b of slider bar 705, slider 710 on third copy 705c of slider bar 705, and slider 710 on fourth copy 705d of slider bar 705 will all similarly adjust from the first playback time to the second playback time. This may be desirable for a user 120 using camera feed segments 415 to observe a shopping session of a customer 105 in physical store 100. User 120 may adjust the playback progress of camera feed segments 415 until user 120 determines that camera feed segments 415 have reached a point of interest to user 120, rather than viewing the entire, uninterrupted playback of camera feed segments 415.

In certain embodiments, slider bar 705 may include one or more markers 715. For example, as illustrated in FIG. 7A, slider bar 705 may include a first marker 715a, located at a first marker position on slider bar 705 and corresponding to a first marker playback time, as well as a second marker 715b, located at a second marker position on slider bar 705 and corresponding to a second marker playback time. First marker 715a is associated with a first event occurring at the first marker playback time and second marker 715b is associated with a second event occurring at the second marker playback time. The first event and the second event may include any type of events occurring within physical store 100. For example, the first event may be associated with a person 105a selecting a physical item 315a from a physical shelf 305a located in a physical rack 210a in physical store 100. Similarly, the second event may be associated with person 105a selecting a second physical item 315b from a second physical shelf 305b located in a second physical rack 210b in physical store 100.

The locations for first marker 715a and second marker 715b on slider bar 705 may be determined in any suitable manner. As an example, in certain embodiments, the first event, associated with first marker 715a, and the second event, associated with second marker 715b, may be determined by an algorithm 488, based on a set of inputs received from sensors 498 located within physical store 100. For example, algorithm 488 may determine that the first event takes place at a first time, corresponding to a first timestamp, and that the second event takes place at a second time, corresponding to a second timestamp. Virtual store tool 405 may then use the first and second timestamps to place first marker 715a and second marker 715b on slider bar 705, at positions corresponding to the timestamps. An example algorithm 488, used to determine the timing of the first and second events, is described in further detail below, in the discussion of FIGS. 13 through 16. The use of markers 715 may be desirable for a user 120 using camera feed segments 415 to observe a shopping session of customer 105 in physical store 100. Rather than viewing the entire, uninterrupted playback of camera feed segments 415, user 120 may adjust the playback progress of camera feed segments 415 until slider 710 reaches one of the events associated with first marker 715a or second marker 715b, to, for example, observe customer 105 selecting a physical item 315 from a physical rack 210 in physical store 100.

As described above, in the discussion of FIG. 6, each of camera feed segments 415 is of a predetermined time interval, lasting from a starting timestamp 610 to an ending timestamp 615. Accordingly, in certain embodiments in which customer 105 remains within physical store 100 for longer than the predetermined time interval, multiple camera feed segments may exist, from each of layout cameras 490. For example, virtual store tool 405 may store in memory 440 camera feed segments 415 for a first time interval, a second time interval, a third time interval, and a fourth time interval. Memory 440 stores any number of camera feed segments 415 for any number of time intervals. In such embodiments, when slider 710 reaches the end of slider bar 705, virtual store tool 405 may replace those camera feed segments 415 currently displayed on display 410, with the next set of camera feed segments 415, corresponding to the time interval immediately following the time interval captured by the currently displayed set of camera feed segments 415. This process of replacing the currently displayed camera feed segments 415 with a new set of camera feed segments 415, corresponding to the time interval immediately following the time interval captured by the currently displayed set of camera feed segments 415 may continue until virtual store tool 405 determines that customer 105 has left physical store 100.

Virtual store tool 405 may determine that customer 105 has left physical store 100 in any suitable manner. As an example, in certain embodiments, virtual store tool 405 may determine that customer 105 has left physical store 100 based on input received from user 120. For example, in embodiments in which set of videos 450 are displayed on display 410 in the form of a graphical user interface 700, the graphical user interface 700 may include an interactive button 730 (e.g., an exit customer button) through which user 120 may indicate that he/she observed customer 105 exiting physical store 100, on camera feed segments 415, as illustrated in FIG. 7B. As another example, virtual store tool 405 may determine that customer 105 has left physical store 100 based on information received from an algorithm 488 configured to track customers 105 within physical store 100. Such as algorithm 488 is described in further detail below, in the discussion of FIGS. 13 through 16. As a further example, virtual store tool 405 may determine that customer 105 has left physical store 100 based on information received from physical store 100. For example, physical store 100 may include a set of turnstiles 510 near the exit of physical store 100. In order to open a turnstile 510 and leave physical store 100, a customer 105 may be asked to scan the same QR code that he/she used to enter physical store 100. Scanning the QR code may then send a signal to virtual store tool 405, indicating that customer 105 has exited physical store 100.

In certain embodiments, in order to assist a user 120 in determining which of camera feed segments 415 may include information of interest, virtual store tool 405 is configured to highlight certain camera feed segments 415, at certain times, based on events depicted in those camera feed segments 415, at those certain times. For example, as illustrated in FIG. 7B, virtual store tool 405 may be configured to determine that a given camera feed segment 415a depicts customer 105 at a first time. Accordingly, virtual store tool 405 may highlight camera feed segment 415a in response to determining that slider 710 on slider bar 705 reached that first time. Here, highlighting camera feed segment 415a may include any manner by which virtual store tool 405 may draw attention toward camera feed segment 415a. For example, as illustrated in FIG. 7B, highlighting camera feed segment 415a may include placing a frame 720 around camera feed segment 415a. As another example, highlighting camera feed segment 415a may include increasing the size of camera feed segment 415a, depicted on display 410, relative to the other camera feed segments 415.

In certain embodiments, the graphical user interface 700 displayed on display 410 may be used by a user 120 to monitor a shopping session of a customer 105a in physical store 100. To aid such a user 120 in monitoring a particular customer 105a in a physical store that includes several other customers 105, virtual store tool 405 may additionally display an image 725 of customer 105a, captured when customer 105a entered physical store 100. For example, in certain embodiments in which physical store 100 includes turnstiles 510 to control the entry of persons 105 into the store, physical store 100 may include a camera configured to take an image 725 of customer 105a as customer 105a passes through a turnstile 510.

In certain embodiments in which slider bar 705 includes one or more markers 715, each marker 715 may include metadata 740 describing the event associated with the marker 715. An example of one such embodiment is illustrated in FIG. 7C. As described above, in the discussion of FIG. 7A, each marker 715a and 715b may be associated with an event consisting of customer 105a selecting a physical item 315 from a physical shelf 305 of a physical rack 210 located in physical store 100. Accordingly, each marker may include metadata 740 indicating an identification number 745 assigned to the physical item 315 selected by customer 105a, an identification number 750 assigned to the physical shelf 305 from which customer 105a selected the physical item 315, and/or an identification number 755 assigned to the physical rack 210 that includes the physical shelf 305 from which customer 105a selected the physical item 315. In certain embodiments, item identification number 745 may correspond to a zone identification number 745, identifying a zone of physical shelf 305 from which customer 105a selected the physical item 315. The use of shelf zones will be described in further detail below, in the discussion of FIGS. 13C and 13D.

Virtual store tool 405 may use metadata 740 in any suitable manner. For example, in certain embodiments, when slider 710 on slider bar 705 reaches first marker 715a, virtual store tool 405 may use metadata 740 to determine that customer 105 selected a physical item 315 from physical rack 210. Accordingly, virtual store tool 405 may display rack camera segment 425a on display 410, where rack camera segment 425a depicts video of physical rack 210. Rack camera segment 425a may be synchronized with camera feed segments 415a through 415d, such that an adjustment of the slider 710 on any of the copies of slider bar 705 leads to a corresponding adjustment of the playback progress of rack camera segment 425a. Automatically displaying rack camera segment 425a, in response to slider 710 reaching marker 715 on slider bar 705 may be desirable, to provide a user 120 with a view of physical rack 210 through which user 120 is able to observe customer 105 selecting a physical item 315 from physical rack 210. In certain embodiments, user 120 may be able to use a second graphical user interface to choose a rack camera 495 from among several potential rack cameras 495 to assign to physical rack 210, to provide user 120 with a rack camera segment 425a that displays the best view of physical rack 210, as determined by user 120. This aspect of virtual store tool 405 will be described in further detail below, in the discussion of FIGS. 11 and 12.

Figure 8:
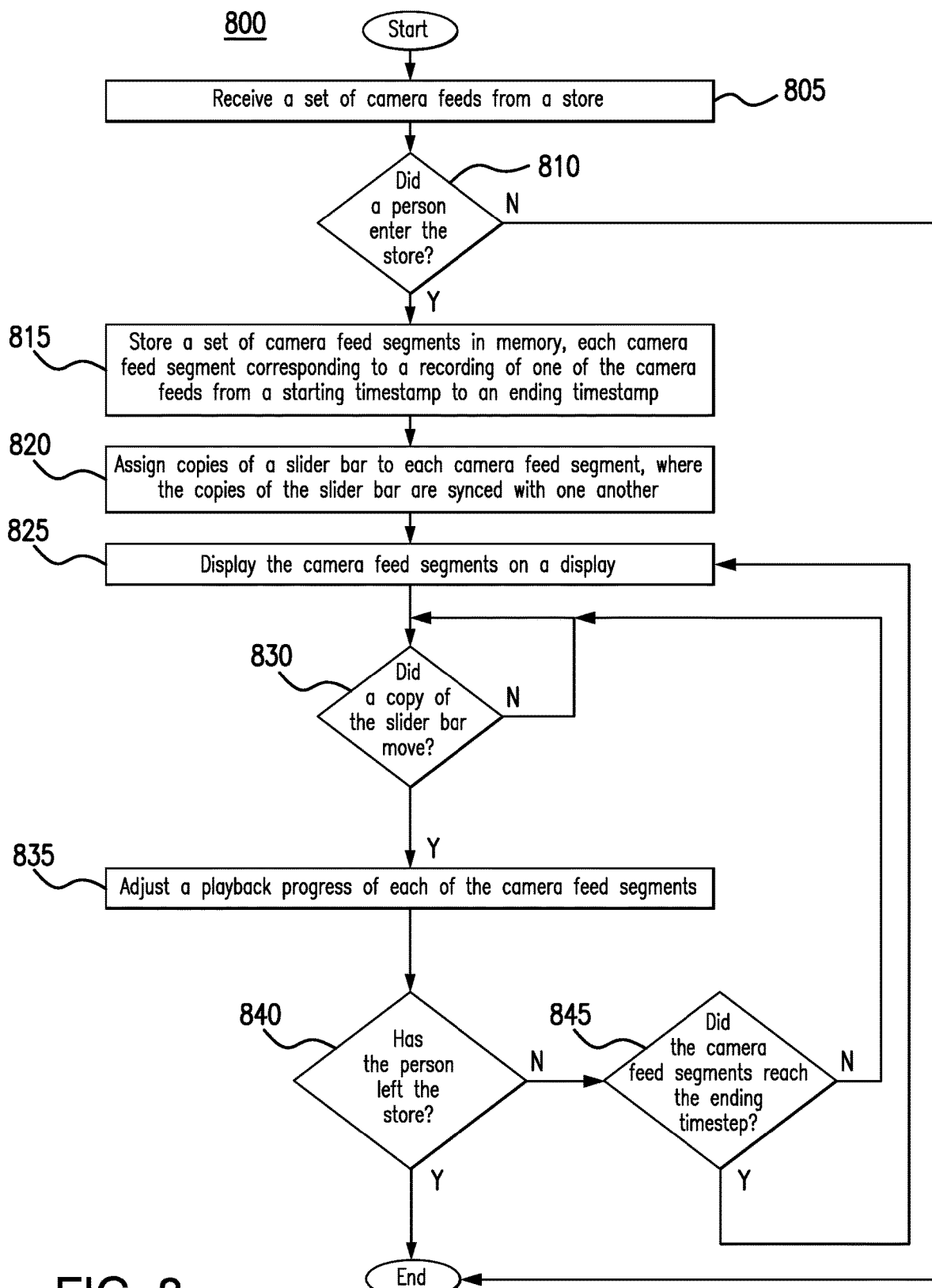
FIG. 8 presents a flowchart illustrating the process by which the virtual store tool of the system illustrated in FIG. 4 generates and displays camera feed segments associated with the layout cameras and the rack cameras of the system illustrated in FIG. 4.

FIG. 8 presents a flowchart illustrating the process by which virtual store tool 405 generates camera feed segments 415 and 425 and displays such segments on display 410. In step 805, virtual store tool 405 receives a set of layout camera feeds 605 from a set of layout cameras 490 and a set of and rack camera feeds 620 from a set of rack cameras 495 located in physical store 100. In step 810, virtual store tool 405 determines whether a person 105 entered physical store 100. This disclosure contemplates that virtual store tool 405 may determine that person 105 entered physical store 100 in any suitable manner. For example, in certain embodiments, physical store 100 includes turnstiles 510, which control the entry of persons 105 into the store. A turnstile 510 may be opened upon person 105 scanning a QR code, located on a physical card or a mobile device 125 belonging to person 105. Accordingly, the scanning of the QR code may generate a notification, sent to virtual store tool 405, to indicate that person 105 entered physical store 100. As another example, in some embodiments, an algorithm 488 may be used to determine that person 105 entered physical store 100, based on information received from sensors 498 located in physical store 100.

If, in step 810, virtual store tool 405 determines that person 105 entered physical store 100, in step 815, virtual store tool 405 stores a set of camera feed segments 415 and 425 in memory 440. Each camera feed segment of camera feed segments 415 corresponds to a recording of one of the camera feeds 605 from a starting timestamp 610 to an ending timestamp 615. Similarly, each rack camera feed segment of rack camera feed segments 425 corresponds to a recording of one of the rack camera feeds 620 from starting timestamp 610 to ending timestamp 615. Starting timestamp 610 corresponds to the time at which person 105 entered physical store 100. Ending timestamp 615 corresponds to a predetermined time interval after starting timestamp 610.

In step 820, virtual store tool 405 assigns copies of a slider bar 705 to each camera feed segment 415 and 425. Slider 710 on each copy of slider bar 705 moves forward as the corresponding camera feed segment 415 and/or 425 progresses. In certain embodiments, the copies of slider bar 705 are synchronized with one another such that all of camera feed segments 415 and 425 progress together, at the same pace. Additionally, in such embodiments, an adjustment of the slider 710 on any of the copies of slider bar 705 leads to a corresponding adjustment of the playback progress of all of camera feed segments 415 and 425. This may be desirable for a user 120 using camera feed segments 415 to observe a shopping session of a customer 105 in physical store 100. User 120 may adjust the playback progress of camera feed segments 415 until user 120 determines that camera feed segments 415 have reached a point of interest to user 120, rather than viewing the entire, uninterrupted playback of camera feed segments 415.

In step 825, virtual store tool 405 presents one or more camera feed segments 415 and/or 425 on display 410, along with corresponding copies of slider bar 705. For example, virtual store tool 405 may display first camera feed segment 415a, along with first copy 705a of slider bar 705 in a first region of display 410, second camera feed segment 415b, along with second copy 705b of slider bar 705 in a second region of display 410, third camera feed segment 415c, along with third copy 705c of slider bar 705 in a third region of display 410, and fourth camera feed segment 415d, along with fourth copy 705d of slider bar 705 in a fourth region of display 410. Virtual store tool 405 additionally plays camera feed segments 415 and/or 425, such that slider 710 on each copy of slider bar 705 progresses.

In step 830, virtual store tool 405 next determines whether an adjustment occurred for any slider 710 in a copy of slider bar 705, from a first position on slider bar 705 to a second position on slider bar 705, where the first position corresponds to a first playback time and the second position corresponds to a second playback time. If, in step 830, virtual store tool 405 determines that an adjustment occurred, virtual store tool 405 next adjusts the playback progress of each of camera feed segments 415 and 425 from the first playback time to the second playback time.

In step 840, virtual store tool 405 determines whether person 105 has left physical store 100. Virtual store tool 405 may determine that customer 105 has left physical store 100 in any suitable manner. As an example, in certain embodiments, virtual store tool 405 may determine that customer 105 has left physical store 100 based on input received from user 120. For example, in embodiments in which camera feed segments 415 and/or 425 are displayed on display 410 in the form of a graphical user interface 700, the graphical user interface 700 may include an interactive button 730 (e.g., an exit customer button) through which user 120 may indicate that he/she observed customer 105 exiting physical store 100 on one or more camera feed segments 415. As another example, virtual store tool 405 may determine that customer 105 has left physical store 100 based on information received from an algorithm 488 configured to track customers 105 within physical store 100. Such as algorithm 488 is described in further detail below, in the discussion of FIGS. 13 through 16. As a further example, virtual store tool 405 may determine that customer 105 has left physical store 100 based on information received from physical store 100. For example, physical store 100 may include a set of turnstiles 510 near the exit of physical store 100. In order to open a turnstile 510 and leave physical store 100, a customer 105 may be asked to scan the same QR code that he/she used to enter physical store 100. Scanning the QR code may then send a signal to virtual store tool 405, indicating that customer 105 has exited physical store 100.

If, in step 840, virtual store tool 405 determines that person 105 has not left physical store 100, in step 845, virtual store tool 405 determines whether camera feed segments 415 and 425 have reached ending timestamp 615. If, in step 845, virtual store tool 405 determines that camera feed segments 415 and 425 have not reached ending timestamp 615, virtual store tool returns to step 830, to determine whether an adjustment occurred for any slider 710 in a copy of slider bar 705, from a first position on slider bar 705 to a second position on slider bar 705. On the other hand, if, in step 845, virtual store tool 405 determines that camera feed segments 415 and 425 have reached ending timestamp 615, virtual store tool 405 returns to step 825 and displays a new set of camera feed segments 415 and/or 425 on display 410, where the new set of camera feed segments corresponds to recordings of camera feeds 605 and/or 620 over a time interval immediately following the previous time interval associated with the previous set of camera feed segments 415 and/or 425.

Modifications, additions, or omissions may be made to method 800 depicted in FIG. 8. Method 800 may include more, fewer, or other steps. For example, steps may be performed in parallel or in any suitable order. While discussed as virtual store tool 405 (or components thereof) performing the steps, any suitable component of system 400, such as device(s) 115 for example, may perform one or more steps of the method.

IV. Virtual Emulation of a Shopping Session

As described above, camera feed segments 415 and 425 may be used in conjunction with virtual layout 205 in order to virtually emulate a shopping session occurring in physical store 100 and captured by camera feed segments 415 and/or 425. For example, in certain embodiments, camera feed segments 415 and 425, along with virtual layout 205, may be presented to a user 120, in the form of a graphical user interface 700. Here, camera feed segments 415 and 425 may be assigned to a customer 105 and capture a shopping session of customer 105 in physical store 100. User 120 may monitor camera feed segments 415 and 425 to view customer 120 selecting physical items 315 from physical racks 210. Accordingly, user 120 may populate a virtual shopping cart 420 with virtual items 320 that represent the physical items 315 selected by customer 105, such that at the end of customer 105's shopping session, virtual shopping cart 420 may include a virtual item 320 for each physical item 315 selected by customer 105.

Figure 9A:
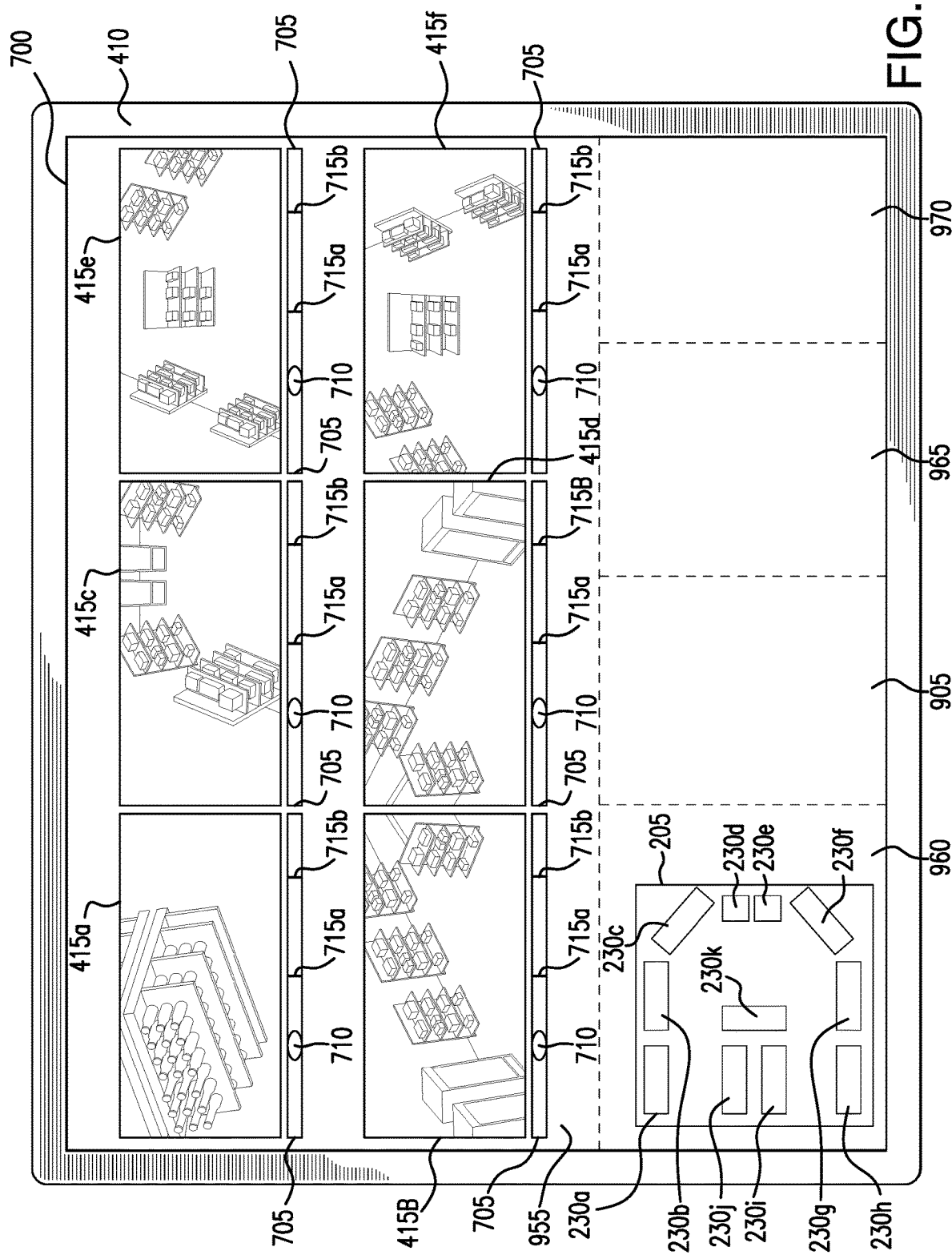
FIGS. 9A through 9D present examples illustrating the manner in which the virtual store tool of the system illustrated in FIG. 4 may virtually emulate a shopping session occurring in a physical store.

FIGS. 9A through 9D present further examples of a graphical user interface 700, displayed on display 410, that may be used to virtually emulate a shopping session occurring in physical store 100 and captured by camera feed segments 415 and 425. As illustrated in FIG. 9A, virtual store tool 405 may display camera feed segments 415 in a first region 955 of display 410, as described above in the discussion of FIGS. 7A through 7C. Virtual store tool 405 may additionally display virtual layout 205 in a second region 960 of display 410. Virtual layout 205 is configured to emulate the physical layout 200 of physical store 100. As illustrated in FIG. 9A, virtual layout 205 includes a set of virtual racks 230. This disclosure contemplates that virtual layout 205 may include any number of virtual racks 230, where the number of virtual racks 230 displayed on virtual layout 205 corresponds to the number of physical racks 210 in physical store 100. The layout of virtual racks 230 in virtual layout 205 is configured to emulate the arrangement of the corresponding physical racks 210 in physical store 100.

a. Receiving an Indication of an Event

Figure 9B:
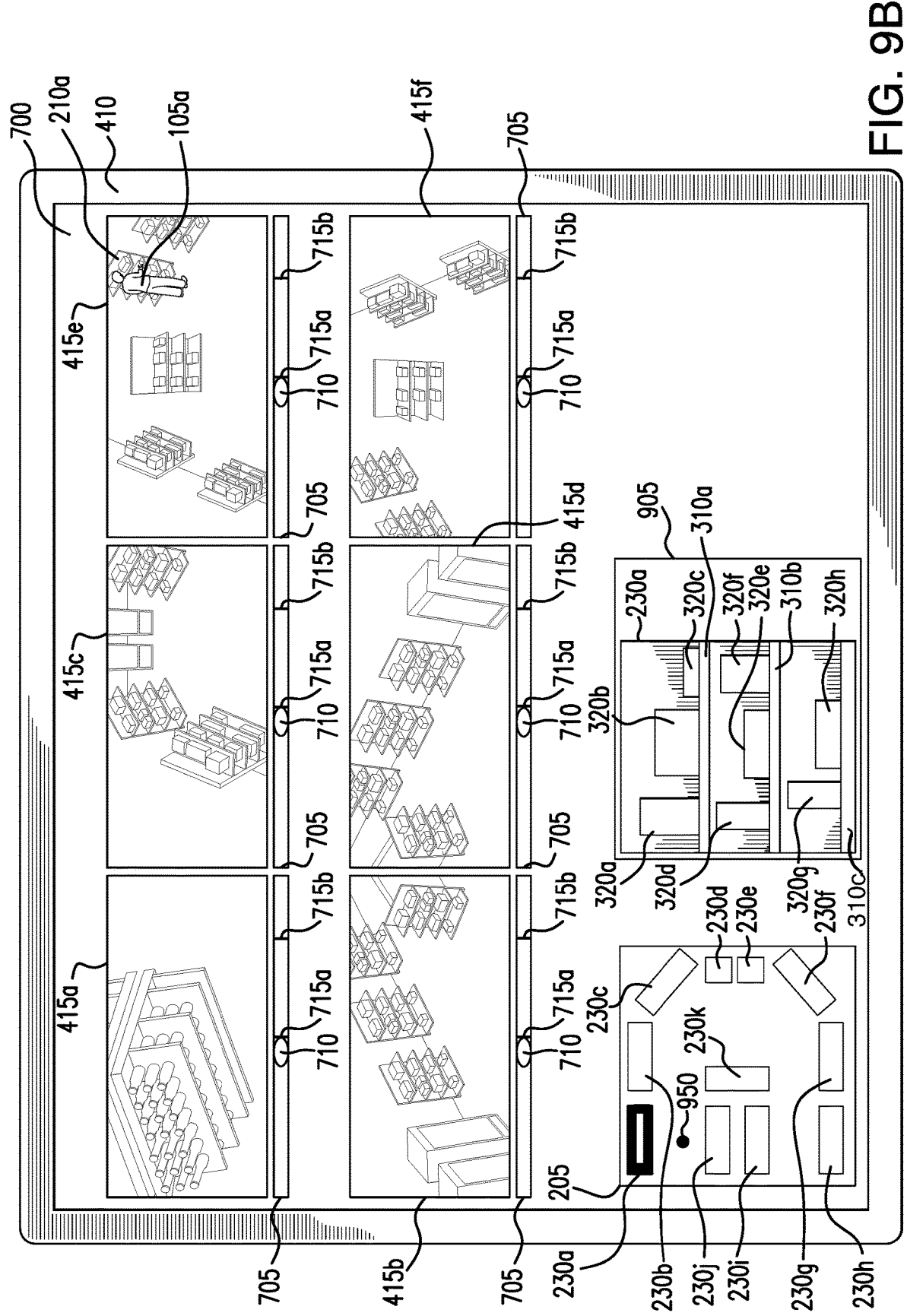

As illustrated in FIG. 9B, virtual store tool 405 may receive an indication of an event associated with a physical rack 210a located in physical store 100. In certain embodiments, the event associated with physical rack 210a may include customer 105 interacting with physical rack 210a. For example, the event associated with physical rack 210a may include customer 105a approaching physical rack 210a, and/or selecting a physical item 315f from physical rack 210a. The indication of the event may include any suitable indication received by virtual store tool 405. For example, in certain embodiments, the indication of the event may include user 120 selecting virtual shelf 230a in virtual layout 205, in response to viewing customer 105 approaching and/or interacting with physical rack 210a. As another example, the indication of the event may include slider 710 on slider bar 705 reaching a marker 715, where the marker 715 indicates the physical rack 210 associated with the event, through metadata 740. As a further example, in certain embodiments, the indication of the event may include receiving information from an algorithm 488 configured to determine that customer 105 approached and/or selected an item 315 from physical rack 210a, based on inputs received from sensors 498 located in physical store 100.

In certain embodiments, in which the graphical user interface 700 displayed on display 410 may be used by a user 120 to monitor a shopping session of a customer 105 in physical store 100, virtual store tool 405 may display a predicted location 950 of customer 105 on virtual layout 205, based on the current playback progress of camera feed segments 415 and/or 425. Predicted location 950 may correspond to the probable location of customer 105 in physical layout 200, as determined by an algorithm 488 configured to track customers 105 in physical store 100, based on inputs received from sensors 498 located in physical store 100, at a physical time corresponding to the current playback progress of camera feed segments 415 and/or 425. This may aid a user 120 in monitoring a particular customer 105a in a physical store that includes several other customers 105. While illustrated in FIG. 9B as dot 950 on virtual layout 205, the predicted location of customer 105 may be presented on virtual layout 205 in any suitable manner. For example, the predicted location may be a line, including the predicted path of customer 105. In such embodiments, the indication of the event may include user 120 selecting virtual shelf 230a in virtual layout 205, in response to viewing customer 105 approaching and/or interacting with physical rack 210a and/or viewing predicted location 950 of customer 105 on virtual layout 205 indicating customer 105's proximity to physical rack 210a.

In response to receiving the indication of the event, virtual store tool 405 may display the virtual rack 230a corresponding to the physical rack 210a associated with the event, in a third region 905 of display 410, where virtual rack 230a is configured to emulate physical rack 210a. In certain embodiments, third region 905 of display 410 may be located to the right of virtual layout 205. In certain embodiments, virtual store tool 405 may additionally highlight virtual rack 230a, in virtual layout 205, in response to receiving the indication of the event associated with physical rack 210a. Highlighting virtual rack 230a may include any method of distinguishing virtual rack 230a from the other virtual racks 230b through 230k. For example, as illustrated in FIG. 9B, highlighting virtual rack 230a may include placing a frame around virtual rack 230a. Highlighting virtual rack 230a may additionally include applying a color to virtual rack 230a, and/or any other suitable method of distinguishing virtual rack 230a from the remaining virtual racks 230b through 230k.

As illustrated in FIG. 9B, virtual rack 230a, displayed in third region 905 of display 410 includes a set of virtual items 320a through 320h. Virtual items 320a through 320h are configured to emulate the physical items stored on physical rack 210a. In certain embodiments, virtual items 320a through 320h are displayed in third region 905 as a list of items, where the names of the items in the list correspond to the names of the physical items 315a through 315h stored on physical rack 210a. In other embodiments, the appearance of virtual rack 230a, displayed in third region 905, is configured to emulate the appearance of physical rack 210a. For example, first virtual shelf 310a is configured to emulate first physical shelf 305a, second virtual shelf 310b is configured to emulate second physical shelf 305b, and third virtual shelf 310c is configured to emulate third physical shelf 305c. In particular, first virtual item 320a is located in a first zone 330a of first virtual shelf 310a to emulate the location of first physical item 315a in a first zone 325a of first physical shelf 305a. Similarly, second virtual item 320b is located in a second zone 330b of first virtual shelf 310a, to the right of first virtual item 320a, to emulate the location of second physical item 315b in a second zone 325b of first physical shelf 305a, and third virtual item 320c is located in a third zone 330c of first virtual shelf 310a, to the right of second virtual item 320b, to emulate the location of third physical item 315c in a third zone 325c of first physical shelf 305a. Virtual items 320d through 320f are similarly located on second virtual shelf 310b to emulate the locations of the physical items 315d through 315f, located on second physical shelf 305b, and virtual items 320g and 320h are located on third virtual shelf 310c to emulate the locations of physical items 315g and 315h located on third physical shelf 305c. To further emulate physical items 315, each of virtual items 320 may include a graphical representation of the corresponding physical item 315.

Figure 9C:
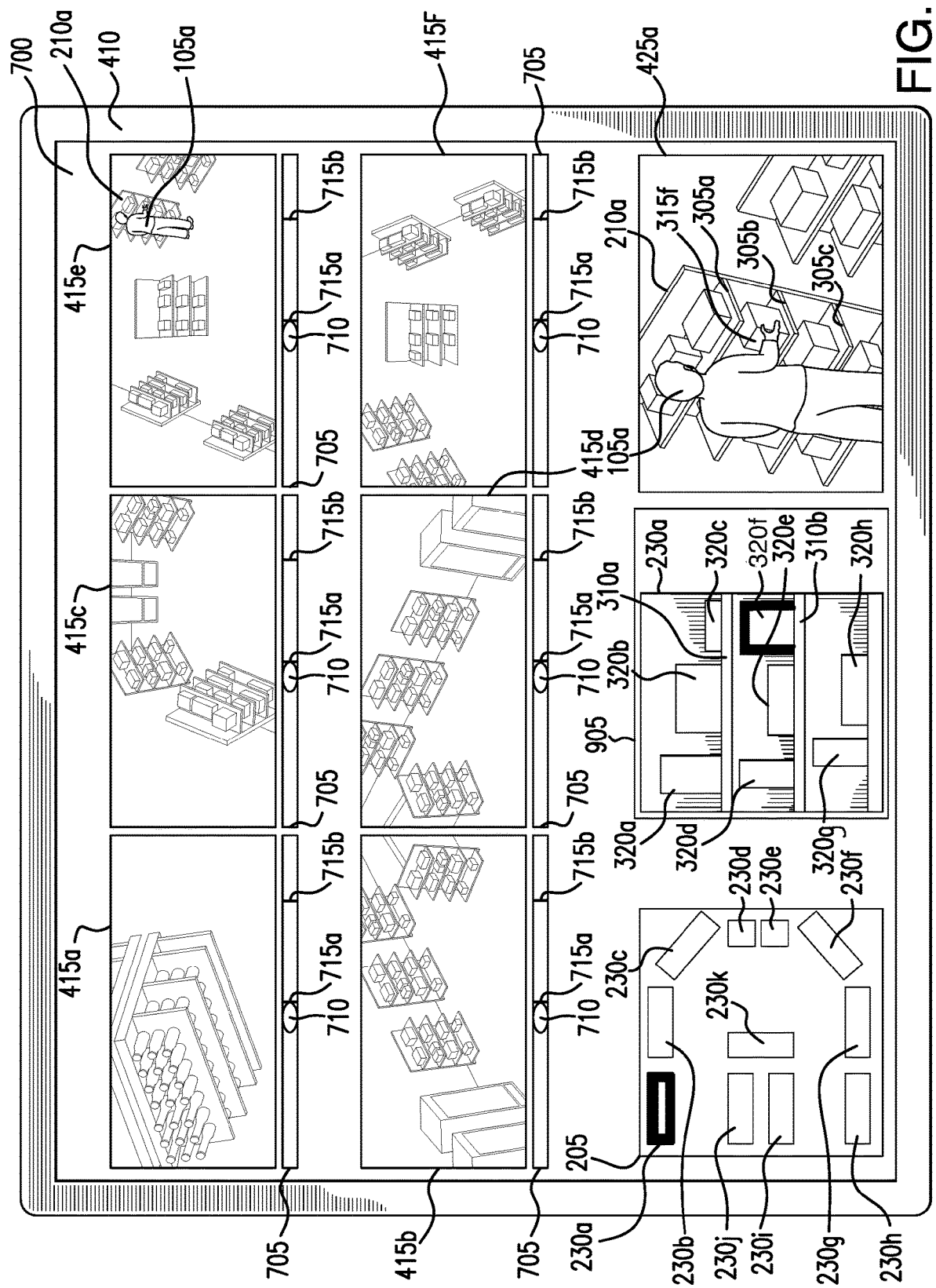

In addition to displaying virtual rack 230a in region 905 of display 410, in response to receiving the indication of the event associated with physical rack 210a, virtual store tool 405 may also display rack camera segment 425a in a fourth region 970 of display 410, as illustrated in FIG. 9C. In certain embodiments, the fourth region 970 of display 410 is to the right of third region 905. Rack camera segment 425a depicts physical rack 210a, during the time interval in which the event occurs. For example, in embodiments in which the event includes customer 105 approaching physical rack 210a, rack camera segment 425a depicts customer 105 approaching physical rack 210a. As another example, in embodiments in which the event includes customer 105 selecting an item 315f from physical rack 210a, rack camera segment 425a depicts customer 105 selecting item 315f from physical rack 210a.

Rack camera segment 425a may be synchronized with camera feed segments 415a through 415f, such that an adjustment of the slider 710 on any of the copies of slider bar 705 leads to a corresponding adjustment of the playback progress of rack camera segment 425a. Displaying rack camera segment 425a, in response to receiving the indication of the event may be desirable, to provide a user 120 with a view of physical rack 210a through which user 120 is able to observer customer 105 approaching and/or interacting with physical rack 210a. For example, rack camera segment 425a may help user 120 to see if customer 105 selected an item 315 from physical rack 210a. User 120 may then use this information to populate virtual cart 420, as described in further detail below, in the discussion of FIG. 9D. In certain embodiments, user 120 may be able to select a rack camera 495 to assign to physical rack 210 to provide user 120 with a rack camera segment 425a that displays the best view of physical rack 210a, as determined by user 120. This aspect of virtual store tool 405 will be described in further detail below, in the discussion of FIGS. 11 and 12.

b. Receiving Information Identifying a Selected Item

In certain embodiments in which the event includes person 105 selecting an item from physical shelf 210a, the indication of the event may include information identifying the item selected by person 105. For example, if the event includes person 105 selecting physical item 315f from physical rack 210a, the indication of the event received by virtual store tool 405 may include information identifying physical item 315f and/or virtual item 320f. As an example, in certain embodiments, each physical shelf 305 of physical rack 210a includes a set of weight sensors 1300, coupled to zones 325 of the physical shelf 305, as described below, in the discussion of FIGS. 13B through 13D. When person 105 removes an item 315 from physical shelf 305, the weight sensor 1300 coupled to the zone 325 of physical shelf 305 on which the item 315 is located may send information to virtual store tool 405 (either directly, or through other components of system 400, such as external system 485), indicating that the item 315 has been selected from physical shelf 305 of physical rack 210a. Virtual store tool 405 may use this information to highlight the corresponding virtual item 320 on virtual rack 230a, displayed in third region 905 of display 410. For example, a weight sensor coupled to a third zone of second physical shelf 305b of physical rack 210a may send information to virtual store tool 405 indicating that item 315f has been removed from the third zone of second physical shelf 305b of physical rack 210a.

As another example, in certain embodiments, the indication of the event may include slider 710 on slider bar 705 reaching a marker 715. Markers 715 may include metadata 740, as described above, in the discussion of FIG. 7C. Metadata 740 may include information indicating an identification number 745 assigned to the physical item 315 selected by customer 105, an identification number 750 assigned to the physical shelf 305 from which customer 105 selected the physical item 315, and/or an identification number 755 assigned to the physical rack 210 that includes the physical shelf 305 from which customer 105 selected the physical item 315. When, for example, slider 710 on slider bar 705 reaches marker 715a, virtual store tool 405 may read metadata 740 assigned to marker 715a, to identify that person 105 selected physical item 315f from second physical shelf 305b of physical rack 210a. Markers 715 may be added to slider bar 705 in any suitable manner. For example, in certain embodiments, virtual display tool 405 adds markers 715 to slider bar 705 based on information received from an algorithm 488 configured to track customers 105 in physical store 100 and to determine the physical items 315 selected by each customer 105, based on inputs received from sensors 498 located in physical store 100.

In response to receiving information identifying physical item 315f as being the physical item selected by person 105 from physical rack 210a, virtual store tool 405 may highlight sixth virtual item 320f, located on second virtual shelf 310b of virtual rack 230a. Highlighting sixth virtual item 320f may include any method of distinguishing sixth virtual item 320f from the remaining virtual items 320. For example, highlighting sixth virtual item 320f may include placing a frame around sixth virtual item 320f, as illustrated in FIG. 9C, enlarging sixth virtual item 320f compared to the other virtual items 320, and/or any other suitable method of distinguishing sixth virtual item 320f from the remaining virtual items 320.

c. Populating a Virtual Cart

Figure 9D:
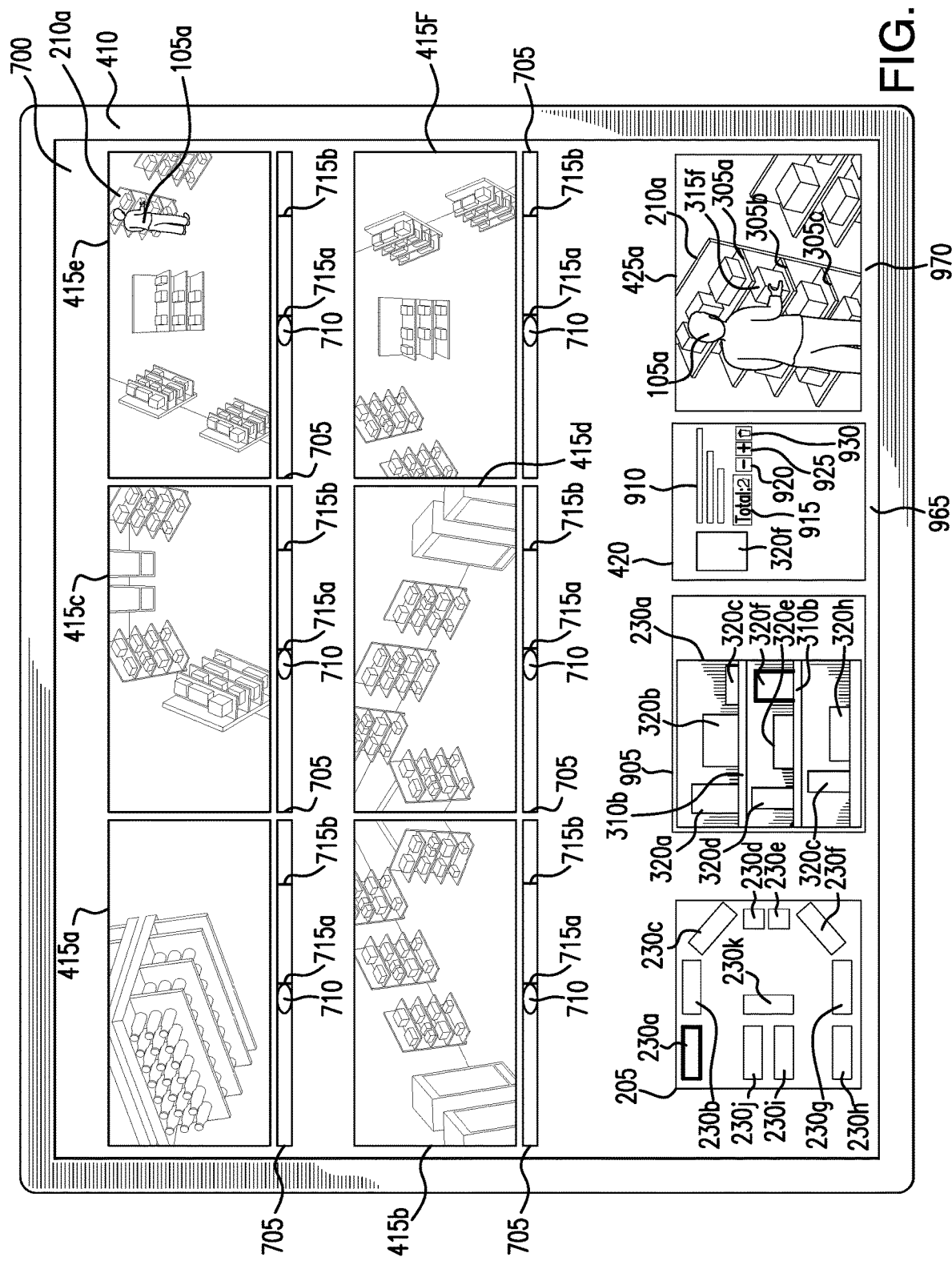

In certain embodiments, the graphical user interface 700 displayed by virtual store tool 405 on display 410 may additionally include a virtual shopping cart 420, as illustrated in FIG. 9D. Virtual shopping cart 420 may be used to further emulate a shopping session of a customer 105 in physical store 100, by storing virtual items 320 corresponding to the physical items 315 selected by person 105 during his/her shopping session. Virtual store tool 405 may display virtual shopping cart 420 in a fifth region 965 of display 410.

In certain embodiments, the fifth region 965 of display 410 is located between virtual rack 230b, displayed in third region 905 of display 410, and rack camera segment 425a.

In certain such embodiments, receiving information identifying physical item 315f as being the physical item selected by person 105 from physical rack 210a, may include receiving information associated with dragging and dropping virtual item 320f, corresponding to physical item 315f, from virtual rack 230a, displayed in region 905, to virtual shopping cart 420. For example, a user 120 may observe customer 105 selecting physical item 315f on camera feeds segments 415a through 415f and/or rack camera feed segment 425a. Accordingly, user 120 may select virtual item 320f from virtual rack 230a, where virtual item 320f corresponds to physical item 315f and is configured to emulate physical item 315f. User 120 may then drag virtual item 320f to virtual shopping cart 420 and drop virtual item 320f in virtual shopping cart 420. In order to help aid user 120 in observing customer 105 selecting a physical item 315 on camera feed segments 415a through 415f and/or rack camera feed segment 425a, in certain embodiments, user 120 can make any of the displayed camera feed segments 415a through 415f and/or rack camera feed segment 425a larger than the others, by selecting the camera feed segments 415a through 415f and/or rack camera feed segment 425a. For example, user 120 can click on a given camera feed segment 415 or 425, to instruct virtual store tool 405 to increase the size of the segment presented on display 410.

In response to receiving information identifying physical item 315f as the physical item selected by person 105 from physical rack 210a—either from metadata 740, weight sensors 1300 coupled to physical shelf 305b, a dragging and dropping of virtual item 320f into virtual shopping cart 420, and/or any other suitable method of receiving information identifying physical item 315f—virtual store tool 405 may store virtual item 320f, corresponding to physical item 315f, in virtual shopping cart 420. Virtual shopping cart 420 may store any number of virtual items 320. For example, as the playback of camera feed segments 415 and 425 progresses, virtual store tool 405 may receive further information identifying an additional, different physical item 315 as having been selected by person 105 from a physical rack 210. Physical rack 210 may be the same as physical rack 210a or different from physical rack 210a. In response to receiving the information identifying the additional physical item 315, virtual store tool 405 may store an additional virtual item 320, corresponding to the additional physical item 315, in virtual shopping cart 420. This process may repeat any number of times, such as a number of times corresponding to the number of times the camera feed segments 415 and 425 indicate that a person 105 selected a physical item 315 from a physical rack 210.

As illustrated in FIG. 9D, in certain embodiments, virtual shopping cart 420 may display each virtual item 320 as a graphical representation of the corresponding physical item 315 and/or a textual description 910 of the corresponding physical item 315. Virtual shopping cart 420 may also indicate a quantity 915 of each virtual item 320f contained in the virtual shopping cart 420. For example, virtual shopping cart 420 may indicate a quantity 915 of two virtual items 320f, to emulate the fact that customer 105 selected two physical items 315f from physical rack 210a. Quantity 915 of each virtual item 320 may be increased in any suitable manner. For example, in certain embodiments, quantity 915 of virtual item 320f may be increased by dragging and dropping virtual item 320f, corresponding to physical item 315f, from virtual rack 230a, displayed in region 905, to virtual shopping cart 420 multiple times. As another example, in some embodiments, quantity 915 of virtual item 320f may be increased by a user 120 interacting with graphical user interface 700 through an addition button 925. Similarly, quantity 915 of virtual item 320f may be decreased by user 120 interacting with graphical user interface 700 through a subtraction button 925. User 120 may also remove virtual item 320f from virtual shopping cart 420 by interacting with graphical user interface 700 through a trash button 930.

At the end of the shopping session of customer 105 in physical store 100 (i.e., when virtual store tool 405 determines that customer 105 has exited physical store 100), virtual shopping cart 420 may be used to charge customer 105 for physical items 315 selected by customer 105 during his/her shopping session, and to send a receipt to customer 105. Additionally, virtual shopping cart 420 may be used to validate a determination made by an algorithm 488, based on inputs received from sensors 498 located in physical store 100, of the physical items 315 selected by customer 105 during his/her shopping session. These aspects of virtual store tool 405 will be described in further detail below, in the discussion of FIGS. 13 through 16.

d. Method for Virtually Emulating a Physical Shopping Session

Figure 10:
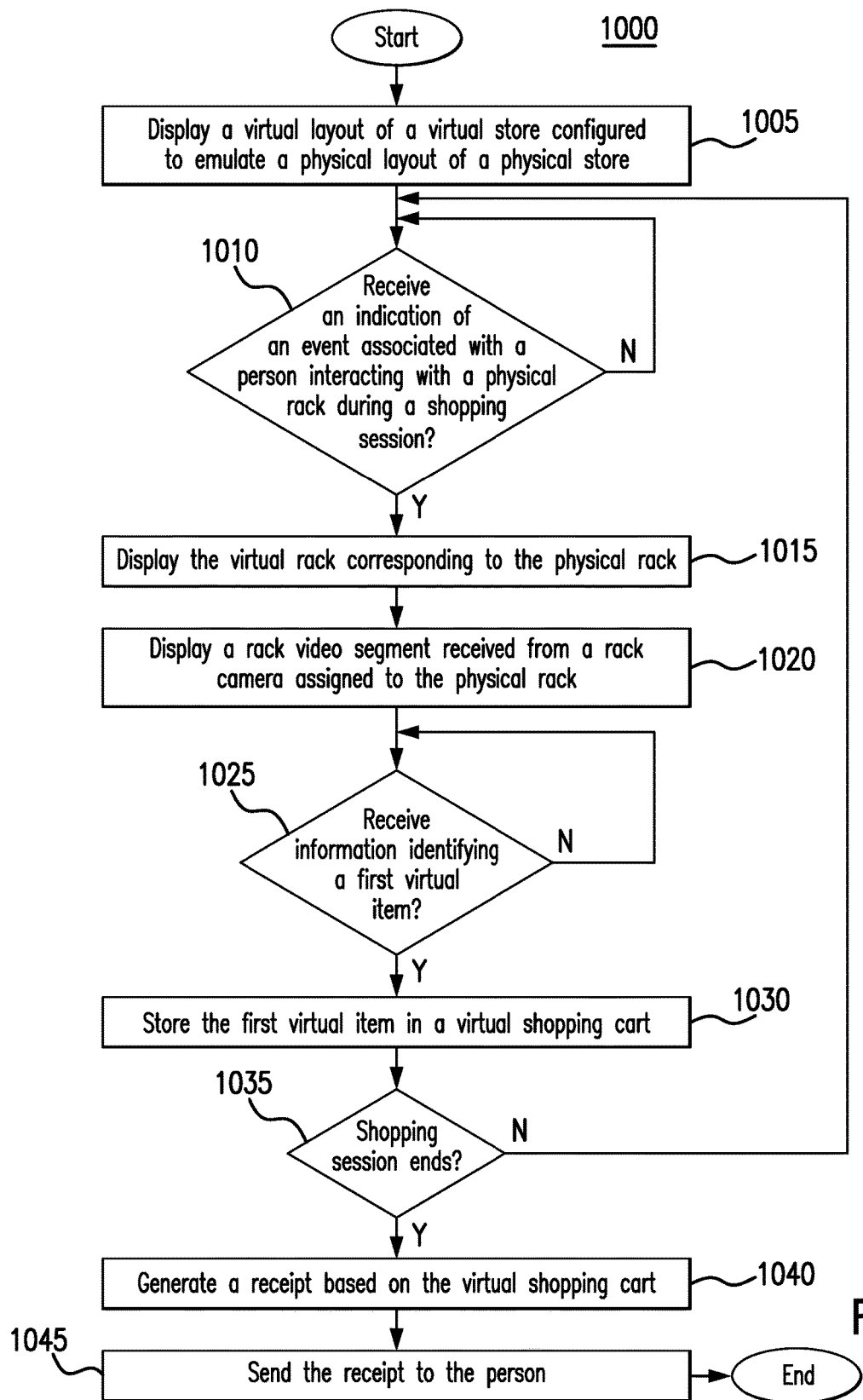
FIG. 10 presents a flowchart illustrating the manner in which the virtual store tool of the system illustrated in FIG. 4 may virtually emulate a shopping session occurring in a physical store.

FIG. 10 presents a flowchart illustrating the manner in which virtual store tool 405 emulates a shopping session of a customer 105 in a physical store 100, using virtual layout 205 and camera feed segments 415 and/or 425 received from physical store 100, and capturing the shopping session. In step 1005, virtual store tool 405 displays virtual layout 205 of virtual store 110. Virtual layout 205 is configured to emulate a physical layout 200 of physical store 100. In particular, the arrangement of virtual racks 230 on virtual layout 205 is configured to emulate the physical layout 200 of physical racks 210 in physical store 100.

In step 1010, virtual store tool 405 determines whether the tool has received an indication of an event associated with a person 105 interacting with a physical rack 210 of physical store 100, during a shopping session in physical store 100. This event may include customer 105 approaching a physical rack 210 and/or selecting a physical item 315 from physical rack 210. The indication of the event may include any suitable information that indicates that customer 105 interacted with physical rack 210. For example, in certain embodiments, the indication of the event may include user 120 selecting virtual shelf 230 in virtual layout 205, in response to viewing customer 105 approaching and/or selecting physical item 315 from physical rack 210 on a set of camera feed segments 415, generated from camera feeds 605 received from layout cameras 490, located in physical store 100 and capturing the shopping session of customer 105. As another example, in certain embodiments, the indication of the event may include slider 710 on slider bar 705, assigned to camera feed segments 415, reaching a marker 715. Marker 715 may include metadata 740 indicating the physical rack 210 associated with the event. As a further example, the indication of the event may include receiving information from an algorithm 488 configured to determine that customer 105 approached and/or selected an item 315 from physical rack 210, based on inputs received from sensors 498 located in physical store 100.

If, in step 1010, virtual store tool 405 receives an indication of an event associated with person 105 interacting with physical rack 210, in step 1015, virtual store tool 405 displays the virtual rack 230 corresponding to physical rack 210 (i.e., configured to emulate physical rack 210), in region

905 of display 410. Additionally, in step 1015, virtual store tool 405 displays a rack camera segment 425 generated from a rack camera feed 620 received from a rack camera 495 assigned to physical rack 210. Rack camera segment 425 depicts physical rack 210 during the time interval in which the event occurs.

In step 1020, virtual store tool 405 determines whether the tool has received information identifying a first virtual item 320. As an example, in certain embodiments, each physical shelf 305 of physical rack 210 includes a set of weight sensors 1300, coupled to zones of the physical shelf 305, as described below, in the discussion of FIGS. 13B through 13D. When person 105 removes an item 315 from physical shelf 305, the weight sensor 1300 coupled to the zone of physical shelf 305 on which the item 315 is located may send information to virtual store tool 405 (either directly, or through other components of system 400, such as external system 485), indicating that the item 315 has been selected from physical shelf 305 of physical rack 210*a*. As another example, in certain embodiments, the indication of the event may include slider 710 on slider bar 705 reaching marker 715*a* or 715*b*. Markers 715*a* and 715*b* may include metadata 740, as described above, in the discussion of FIG. 7C. Metadata 740 may include information indicating an identification number 745 assigned to the physical item 315 selected by customer 105, an identification number 750 assigned to the physical shelf 305 from which customer 105 selected the physical item 315, and/or an identification number 755 assigned to the physical rack 210 that includes the physical shelf 305 from which customer 105 selected the physical item 315. Accordingly, when slider 710 on slider bar 705 reaches a marker 715, virtual store tool 405 may receive information identifying physical item 315, by reading metadata 740 assigned to marker 715, to identify that person 105 selected physical item 315 from physical shelf 305 of physical rack 210. Markers 715 may be added to slider bar 705 in any suitable manner. For example, in certain embodiments, virtual display tool 405 adds markers 715 to slider bar 705 based on information received from an algorithm 488 configured to track customers 105 in physical store 100 and to determine the physical items 315 selected by each customer 105, based on inputs received from sensors 498 located in physical store 100. As a further example, receiving information identifying physical item 315/virtual item 320 may include receiving information associated with dragging and dropping virtual item 320, configured to emulate physical item 315, from virtual rack 230, displayed in region 905 of display 410, to virtual shopping cart 420.

If, in step 1025, virtual store tool 405 determines that the tool has received information identifying first virtual item 320/physical item 315, in step 1030, virtual store tool 405 stores first virtual item 320 in virtual shopping cart 420. In step 1035, virtual store tool 405 determines whether the shopping session of customer 105 has ended (i.e., whether customer 105 has left physical store 100). Virtual store tool 405 may determine that customer 105 has left physical store 100 in any suitable manner. As an example, in certain embodiments, virtual store tool 405 may determine that customer 105 has left physical store 100 based on input received from user 120. For example, in embodiments in which camera feed segments 415 and/or 425 are displayed on a graphical user interface 700 on display 410, graphical user interface 700 may additionally include an interactive button 730 (e.g., an exit customer button) through which user 120 may indicate that he/she observed customer 105 exiting physical store 100, on one or more of camera feed segments 415 and/or 425. As another example, virtual store tool 405 may determine that customer 105 has left physical store 100 based on information received from an algorithm 488 configured to track customers 105 within physical store 100. As a further example, virtual store tool 405 may determine that customer 105 has left physical store 100 based on information received from physical store 100. For example, physical store 100 may include a set of turnstiles 510 located near the exit of physical store 100. In order to open a turnstile 510 and leave physical store 100, a customer 105 may be asked to scan the same QR code that he/she used to enter physical store 100. Scanning the QR code may then send a signal to virtual store tool 405, indicating that customer 105 has exited physical store 100. In certain embodiments, in response to determining that customer 105 has left physical store 100, virtual store tool 105 sends a notification to a device 125 of customer 105, indicating that customer 105 should expect to receive a receipt for his/her shopping session in physical store 105 within a set time period.

If, in step 1035, virtual store tool 405 determines that the shopping session of customer 105 in physical store 100 has not ended, virtual store tool 405 returns to step 1010, to determine whether customer 105 has selected any additional items 315 from physical racks 210. Specifically, virtual store tool 405 determines whether the tool has received an indication of an event associated with customer 105 interacting with another physical rack 210. Physical rack 210 may be the same or a different physical rack from the physical rack with which virtual store tool 405 previously determined that customer 105 interacted. In this manner, virtual store tool 405 may populate virtual cart 420 with any number of virtual items 320.

On the other hand, if, in step 1035, virtual store tool 405 determines that the shopping session has ended, then, in step 1040, virtual store tool 405 charges customer 105 for the items 315 selected by customer 105 during the shopping session, based on the virtual items 320 stored in virtual cart 420, and generates a receipt. The manner in which virtual store tool 405 generates the receipt is described in further detail below, in the discussion of FIG. 14. In order to charge customer 105, this disclosure contemplates that virtual store tool 405 may store payment information for customer 105, according to an identification number 455 assigned to customer 105, in memory 440. Next, in step 1045, virtual store tool 405 sends the receipt to customer 105.

Modifications, additions, or omissions may be made to method 1000 depicted in FIG. 10. Method 1000 may include more, fewer, or other steps. For example, steps may be performed in parallel or in any suitable order. While discussed as virtual store tool 405 (or components thereof) performing the steps, any suitable component of system 400, such as device(s) 115 for example, may perform one or more steps of the method.

V. Virtual Layout Creation

In certain embodiments, layout creator 460 of virtual store tool 405 is configured to display a second graphical user interface 1100 through which a user 120 may generate a virtual layout 205 configured to emulate a physical layout 200 of a physical store 100. FIGS. 11A and 11B illustrate an example embodiment of such a graphical user interface 1100.

a. Placing Virtual Racks on Virtual Layout to Emulate the Physical Layout of Physical Racks Layout creator 460 of virtual store tool 405 may generate a virtual layout 205 configured to emulate a physical layout 200 of a physical store, in response to receiving a set of positions and orientations associated with physical racks 210 located in physical store 100. Layout creator 460 may receive the set of positions and orientations in any suitable manner. For example, virtual store tool 405 may receive the positions and orientations from user 120, through graphical interface 1100, by user 120 creating virtual racks 230 on graphical interface 1100 and then dragging and dropping the virtual racks 230 to given positions on virtual layout 205 and/or rotating virtual racks 230 to given orientations on virtual layout 205. As another example, layout creator 460 may receive the positions and orientations from a file uploaded to virtual store tool 405. For example, user 120 may upload a file including the positions and orientations using the "drop your file here" button 1150 on graphical user interface 1100. The file may include a list including pairs of positions and angles. In certain embodiments, each position may specify the center of mass position of a physical shelf 210 in physical store 100. In some embodiments, each position may specify the position of a given corner of a physical shelf 210 in physical store 100. The positions may be specified in terms of any coordinate system superimposed on physical layout 200. For example, each position may be specified as an (x,y) coordinate of a Cartesian coordinate system with an origin located in the middle of physical store 100. In certain embodiments, each orientation may specify the angle of a physical shelf 210 relative to a given direction. For example, each orientation may specify the angle of a physical shelf 210 relative to the x-axis of the Cartesian coordinate system of the previous example. In certain embodiments, for each physical shelf 210, the file may additionally include a length and width of the physical shelf 210.

In response to receiving the positions and orientations, layout creator 460 places each virtual rack 230 at a virtual position and with a virtual orientation on virtual layout 205. Here, the virtual position and the virtual orientation for a given virtual rack 230 on virtual layout 205 represents the physical location and the physical orientation of the corresponding physical rack 210 in physical layout 200. While FIG. 11A illustrates an example including eleven virtual racks 230, this disclosure contemplates that virtual layout 205 may include any number of virtual racks 230. In certain embodiments, virtual store tool 405 stores the resulting virtual layout 205 in memory 440, according to a store identification number 1105. Additionally, layout creator 460 may store each virtual rack 230 of virtual layout 205 in memory 440 according to a rack identification number 755.

Virtual layout tool 405 may also modify a given virtual layout 205, in response to receiving a new position and/or orientation for any of virtual shelves 230 on virtual layout 205. Modifying virtual layout 205 may be desirable in situations in which the physical layout 200 emulated by virtual layout 205 has changed. Layout creator 460 may receive new positions and/or new orientations for virtual shelves 230 in any suitable manner. For example, layout creator 460 may read the new positions and/or orientations from a file. The file may specify a new position and/or orientation for a virtual rack 230a using the identification number 755a assigned to virtual rack 230a. For example, for each virtual rack 230, the file may include the identification number 755 assigned to the virtual rack 230, Cartesian coordinates (x,y) of the new position for the rack, and an angle measured relative to the x-axis, specifying the new orientation for the rack. As another example, layout creator 460 may receive a new positions and/or orientation for a virtual rack 230, based on input received from graphical user interface 1100. For example, as illustrated in FIG. 11A, layout creator 460 may receive input representing a dragging of virtual rack 230k from a first position on virtual layout 205 to a new position 1130 on virtual layout 205. In response to receiving such input, layout creator 460 may place virtual rack 230k at the new virtual position 1130, as illustrated in FIG. 11B. As another example, virtual store tool 205 may receive input representing a rotation of virtual rack 230 from a first orientation to a new orientation. In response to receiving such input, layout creator 460 may place virtual rack 230 on virtual layout 205 with this new orientation.

b. Placing Virtual Items on Virtual Racks to Emulate the Physical Items Located on Physical Racks In addition to placing virtual racks 230 on virtual layout 205, layout creator 460 is operable to populate virtual racks 230 with virtual items 320. For example, layout creator 460 may receive a planogram specifying the physical items 315 to be placed on each physical rack 210 in physical store 100. For example, for each physical rack 210, the planogram may include a list of physical items 315 to be placed on the physical rack 210. For each physical item 315, the list may specify the shelf 305 of physical rack 210 on which the physical item 315 is to be placed, as well as the zone 325 of each shelf 305 on which the physical item 315 is to be placed. In response to receiving the planogram, layout creator 460 may place corresponding virtual items 320 on virtual racks 230. As another example, layout creator 460 may receive a list of virtual items 320 for each virtual rack 230, with each virtual item 320 in the list associated with a physical item 315. Such a list may specify a store identification number 1105, a rack identification number 755, a shelf identification number 750, and/or a zone identification number 745 for each virtual item 320 emulating a physical item 315. Here, store identification number 1105 identifies a physical store 100 storing physical item 315, rack identification number 755 identifies a physical rack 210 in physical store 100 holding physical item 315, shelf identification number 750 identifies a physical shelf 305 of physical rack 210, on which physical item 315 is placed, and zone identification number 745 identifies a zone of physical shelf 305 housing physical item 315. In certain embodiments, zone identification number 745 may correspond to a sensor identification number of a sensor 498 coupled to the zone of physical shelf 305 housing physical item 315. Layout creator 460 may then store the virtual item 320 in memory 440 according to store identification number 1105, rack identification number 755, shelf identification number 750, and zone identification number 745, where layout creator 460 has assigned store identification number 1105 to virtual layout 205, rack identification number 755 to virtual rack 230, shelf identification number 750 to virtual shelf 310, and zone identification number 745 to a virtual zone of virtual 310 configured to emulate the physical zone of physical shelf 305 housing physical item 315. The division of physical shelves 305 and virtual shelves 310 into zones is described in further detail below, in the discussion of FIGS. 13C and 13D.

As another example, layout creator 460 may receive virtual items 320 to store on a given virtual rack 230 from a drop-down-menu that includes a scrollable list of items. An example of such a drop-down-menu 1135 is illustrated in FIG. 11B. As illustrated in FIGS. 11A and 11B, user 120 may select a physical item name 1130 from drop-down-menu 1135 for a given virtual shelf 230. In response, layout creator 460 may store the virtual item 320 associated with the physical item 315 having physical item name 1130 in virtual shelf 230.

Second graphical user interface 1100 may also be used to assign rack cameras 495 to each of virtual racks 230 in virtual layout 205. As illustrated in FIGS. 11A and 11B, layout creator 460 may present a set of rack camera feed segments 425*a* through 425*f* to user 120, through second graphical user interface 1100. Each rack camera feed segment 425 is generated from a rack camera feed 620 received from a rack camera 495 located in physical store 100. In certain embodiments, a user 120 may select a rack camera 495 to assign to a virtual rack 230. User 120 may select a given rack camera 495 based on which of rack camera feed segments 425*a* through 425*f* provides user 120 with the best view of physical rack 210 (emulated by virtual rack 230), as determined by user 120. User 120 may select rack camera 495 in any suitable manner. As an example, in certain embodiments, user 120 may assign a given rack camera 495 to virtual rack 230 by clicking on the rack camera segment 425 generated by rack camera 495 and displayed on second graphical user interface 1100. For example, user 120 may click on rack camera segment 425*a* to assign rack camera 495*a*, which generated rack camera segment 425*a*, to virtual rack 230*a*. In response to user 120 clicking on rack camera segment 425*a*, layout creator 460 may associate a rack camera identification number 1125*a*, assigned to rack camera 495*a*, with virtual rack 230*a*.

Second graphical user interface 1100 may be used to generate any number of virtual layouts 205, which layout creator 460 may store in memory 440 according to store identification numbers 1105. Virtual store tool 405 may later retrieve a given virtual layout 205 using the associated store identification number 1105 and display the virtual layout 205 on display 410.

Layout creator 460 may be a software module stored in memory 440 and executed by processor 435. An example of the operation of layout creator 460 is as follows: (1) receive a set of positions and orientations associated with physical racks 210 located in physical store 100; (2) for each received position and orientation, place a virtual rack 230 on virtual layout 205, at a virtual position and with a virtual orientation representing the physical position and physical orientation of the corresponding physical rack 210 in physical layout 200; (3) if input is received, associated with a new position for a virtual rack 230, place virtual rack 230 at the new position on virtual layout 205; (4) if input is received, associated with a new orientation for a virtual rack 230, place virtual rack 230 on virtual layout 205, with the new orientation; (5) for each virtual rack 230, receive a set of virtual items 320, and place the set of virtual items 320 on virtual rack 230; (6) for each virtual rack 230, assign a rack camera 495 to the virtual rack.

c. Method for Generating a Virtual Layout

Figure 12:
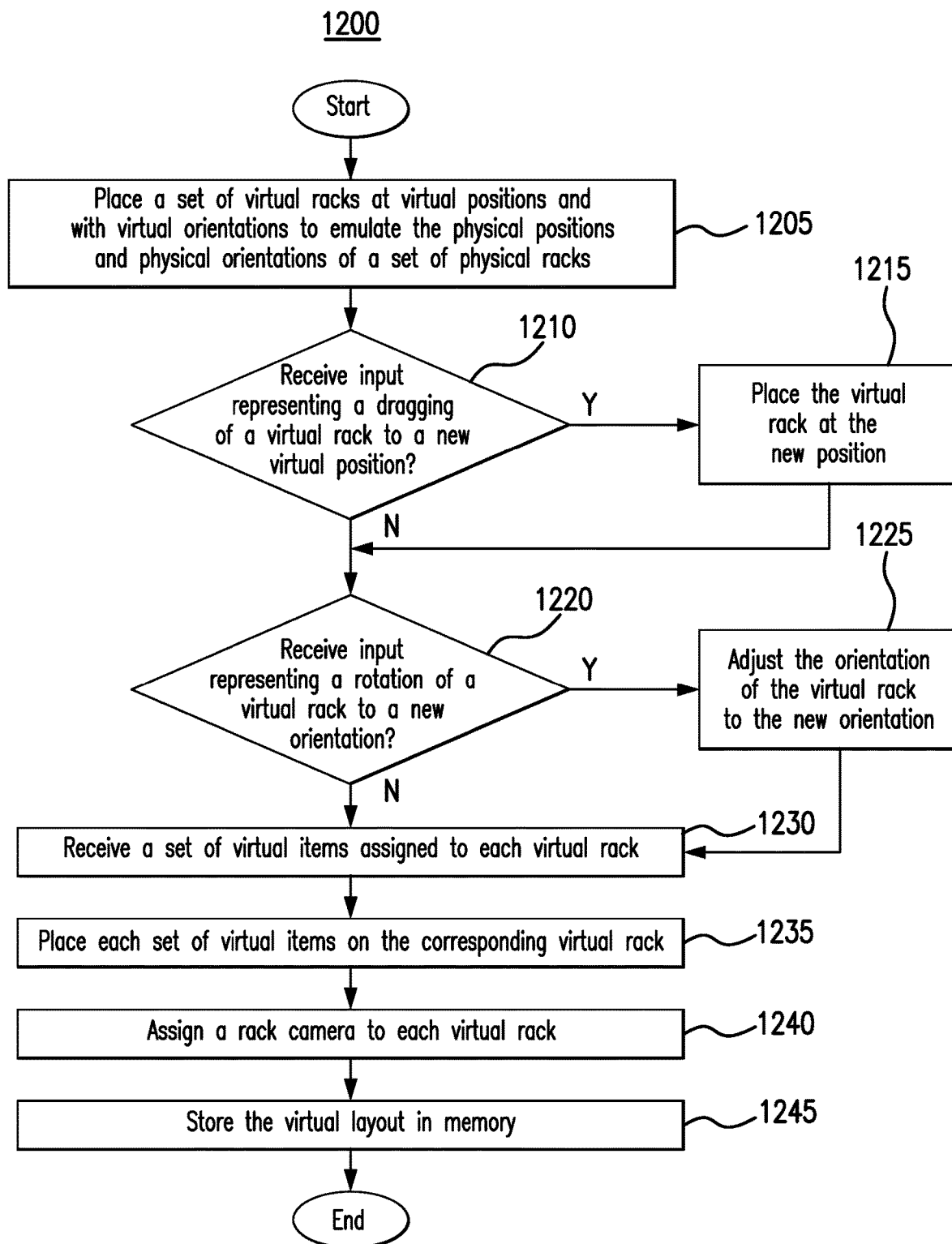
FIG. 12 presents a flowchart illustrating the manner in which the virtual store tool of the system illustrated in FIG. 4 may generate a virtual layout configured to emulate a physical layout of a physical store.

FIG. 12 presents a flowchart illustrating the manner in which virtual store tool 405 may generate a virtual layout 205 configured to emulate a physical layout 200 of a physical store 100. In step 1205, virtual store tool 405 places a set of virtual racks 230 at virtual positions and with virtual orientations on virtual layout 205, where the virtual positions and the virtual orientations of virtual racks 230 are chosen to emulate the physical positions and physical orientations of physical racks 210 in physical store 100. Virtual store tool 405 may receive the virtual positions and virtual orientations in any suitable manner. For example, virtual store tool 405 may receive the positions and orientation from user 120 through graphical user interface 1100. As another example, virtual store tool 405 may receive the positions and orientations from a file uploaded to virtual store tool 405.

In step 1210, virtual store tool 405 determines whether input representing a dragging of a virtual rack 230 to a new virtual position was received. If, in step 1210, virtual store tool 405 determines that input representing a dragging of a virtual rack 230 to a new virtual position was received, in step 1215, virtual store tool 405 places virtual rack 230 at the new virtual position and proceeds to step 1220. On the other hand, if, in step 1210, virtual store tool 405 does not determine that input representing a dragging of a virtual rack 230 to a new virtual position was received, virtual store tool 405 simply proceeds to step 1220.

In step 1220, virtual store tool 405 determines whether input representing a rotation of a virtual rack 230 from an initial orientation to a new orientation was received. If, in step 1220, virtual store tool 405 determines that input representing a rotation of a virtual rack 230 from an initial orientation to a new orientation was received, virtual store tool 405 adjusts the orientation of the virtual rack 230 from the initial orientation to the new orientation, in step 1225, and proceeds to step 1230. On the other hand, if, in step 1220, virtual store tool 405 determines that input representing a rotation of a virtual rack 230 from an initial orientation to a new orientation was not received, virtual store tool 405 proceeds to step 1230.

In step 1230, virtual store tool 405 receives, for each virtual rack 230, a set of virtual items 320 assigned to the virtual rack 230. Virtual store tool 405 may receive the sets of virtual items 320 in any suitable manner. For example, virtual store tool 405 may receive a planogram, specifying the physical items 315 to be placed on each physical rack 210 in physical store 100. For example, for each physical rack 210, the planogram may include a list of physical items 315 to be placed on the physical rack. For each physical item 315, the list may specify the shelf 305 of physical rack 210 on which the physical item 315 is to be placed, as well as the zone 325 of each shelf 305 on which the physical item 315 is to be placed. As another example, virtual store tool 405 may receive virtual items 320 from a drop-down-menu 1135 displayed on display 410. The drop-down-menu 1135 may include a list of physical items 315 from which a user 120 may select one or more items to be placed on each virtual rack 230. Drop-down-menu 1135 may include a scrollable list of any number of physical items 315. In response to receiving a selection of a physical item 315 from drop-down-menu 1135, virtual store tool 405 may identify the corresponding virtual item 320. After virtual store tool 405 has received the sets of virtual items 320, in step 1235, virtual store tool 405 places each set of virtual items 320 on the corresponding virtual rack 230.

In step 1240, virtual store tool 405 assigns a rack camera 495 to each virtual rack 230. Virtual store tool 405 may assign a rack camera 495 to each virtual rack 230 in any suitable manner. For example, in certain embodiments, a user 120 may select rack cameras 495 to assign to virtual racks 230. User 120 may select a given rack camera 495 for a virtual rack 230 based on which of rack camera feed segments 425*a* through 425*f* provides user 120 with the best view of the corresponding physical rack 210, as determined by user 120. In step 1245, virtual store tool 405 stores virtual layout 205 in memory 440. In certain embodiments, virtual store tool 405 may store virtual layout 205 in memory 440 according to a store identification number 1105.

Modifications, additions, or omissions may be made to method 1200 depicted in FIG. 12. Method 1200 may include more, fewer, or other steps. For example, steps may be performed in parallel or in any suitable order. While discussed as virtual store tool 405 (or components thereof)

performing the steps, any suitable component of system 400, such as device(s) 115 for example, may perform one or more steps of the method.

VI. Use in Conjunction with an External Algorithm Configured to Track Customers in the Physical Store Virtual store tool 405 may be used in conjunction with an algorithm 488, generated by external system 485, and configured to track customers 105 and to determine items 315 selected by a given customer 105*a* during a shopping session of customer 105*a* in physical store 100, based on inputs received from sensors 498 located in physical store 100. For example, virtual store tool 405 may be used to validate the determinations made by algorithm 488 and/or to help improve the accuracy of algorithm 488. FIGS. 13 through 16 are used to describe this aspect of virtual store tool 405.

a. Algorithm Input Sensors

As described above, external algorithm 488 is configured to track customers 105 and to determine items selected by a customer 105 during a shopping session in physical store 100, based on inputs received from sensors 498 located in physical store 100. This disclosure contemplates that physical store 100 may include any type of suitable sensors 498. For example, physical store 100 may include cameras, light detection and range sensors, millimeter wave sensors, weight sensors, and/or any other appropriate sensors, operable to track a customer 105 in physical store 100 and detect information associated with customer 105 selecting one or more items from physical store 100.

FIGS. 13A through 13D present examples of an embodiment in which physical store 100 includes both cameras 1305 and weight sensors 1300 for sensors 498. This disclosure contemplates that external system 485 may process position information received from the cameras 1305, and weight information received from the weight sensors 1300, using an algorithm 488, to determine which customers 105 removed which items from physical display racks 210 located in physical store 100. In this manner, external system 485 may generate an algorithmic shopping cart of items determined by the algorithm 488 to have been selected by a customer 105, during a shopping session in physical store 100.

Figure 13A:
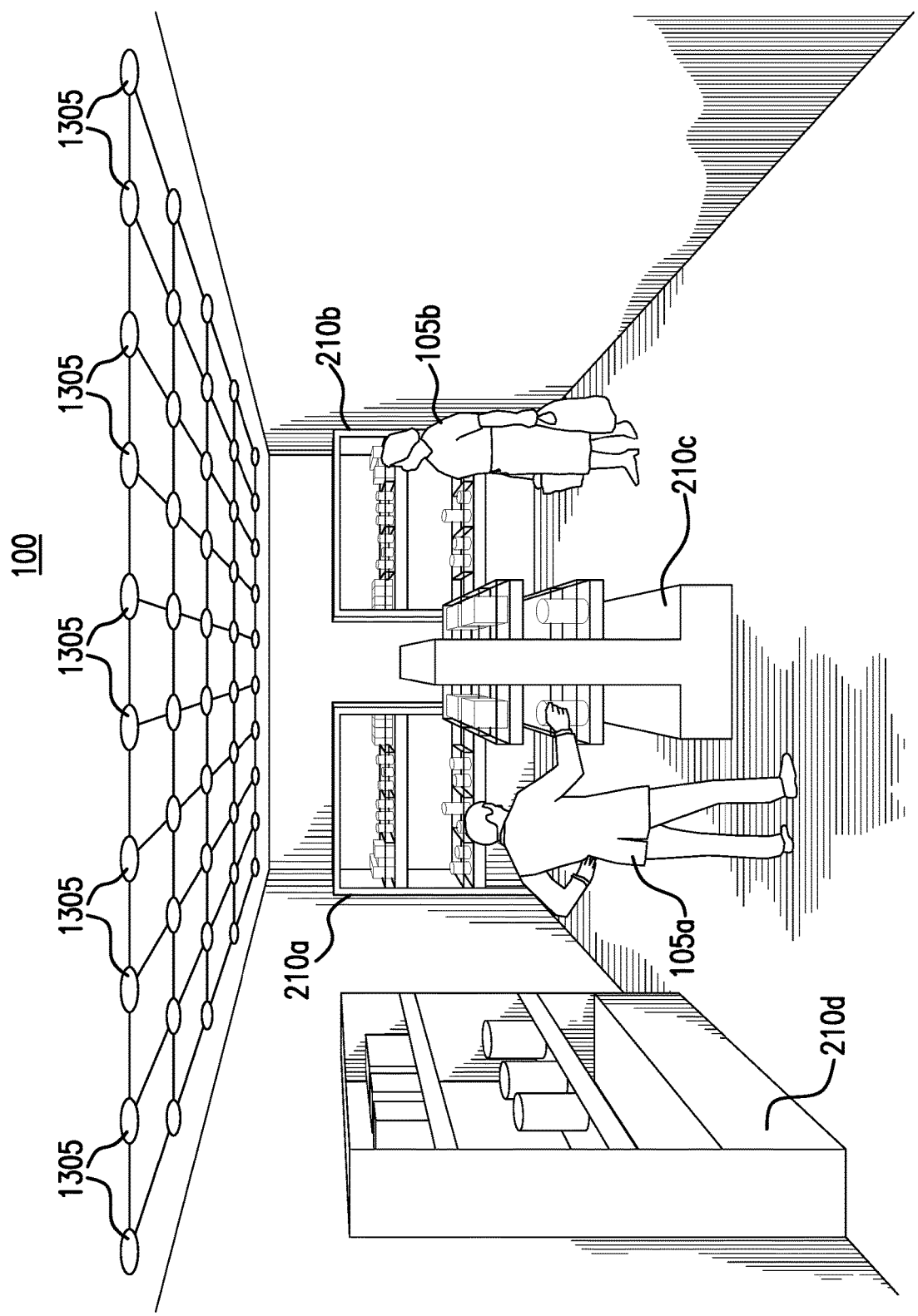
FIGS. 13A and 13B present examples of sensors that may be used to provide input to an algorithm configured to determine items selected by a customer during a shopping session in a physical store.

As seen in FIG. 13A, the interior of physical store 100 may include an array of cameras 1305 positioned on the ceiling of store 100. In certain embodiments, this array of cameras 1305 may include layout cameras 490 and/or rack cameras 495. In other embodiments, the array of cameras 1305 is separate from layout cameras 490 and rack cameras 495. Generally, the array of cameras 1305 produces videos of portions of the interior of physical store 100. These videos may include frames or images of customers 105 within the space. External system 485 processes these frames from array of cameras 1305 to detect customers 105 within the frames.

As illustrated in FIG. 13A, the array of cameras 1305 may include cameras 1305 arranged in a grid pattern across the ceiling of physical store 100. Although this disclosure shows the array of cameras 1305 including fifty cameras 1305, the array of cameras 1305 may include any suitable number of cameras 1305. Generally, cameras 1305 in the array of cameras 1305 are arranged to form a rectangular array. In the example of FIG. 13A, the array of cameras 1305 is a 5×10 array of cameras 1305 (e.g., five rows and ten columns of cameras 1305). The array of cameras 1305 may be arranged in an array of any suitable dimensions.

Each camera 1305 is communicatively coupled to external system 485 and communicates captured video to external system 485. Cameras 1305 are communicatively coupled to external system 485 in any suitable manner. For example, cameras 1305 may be hardwired to components of external system 485. As another example, cameras 1305 may wirelessly couple to external system 485 using any suitable wireless protocol (e.g., WiFi).

Cameras 1305 may be any suitable devices for capturing videos of the interior space of physical store 100. For example, cameras 1305 may be three-dimensional cameras that can capture two-dimensional video of the space (e.g., x-y plane) and also detect the heights of people and/or objects in the video. As another example, cameras 1305 may be two-dimensional cameras that capture two-dimensional videos of the space. The array of cameras 1305 may include a mixture of different types of cameras 1305.

Figure 13B:
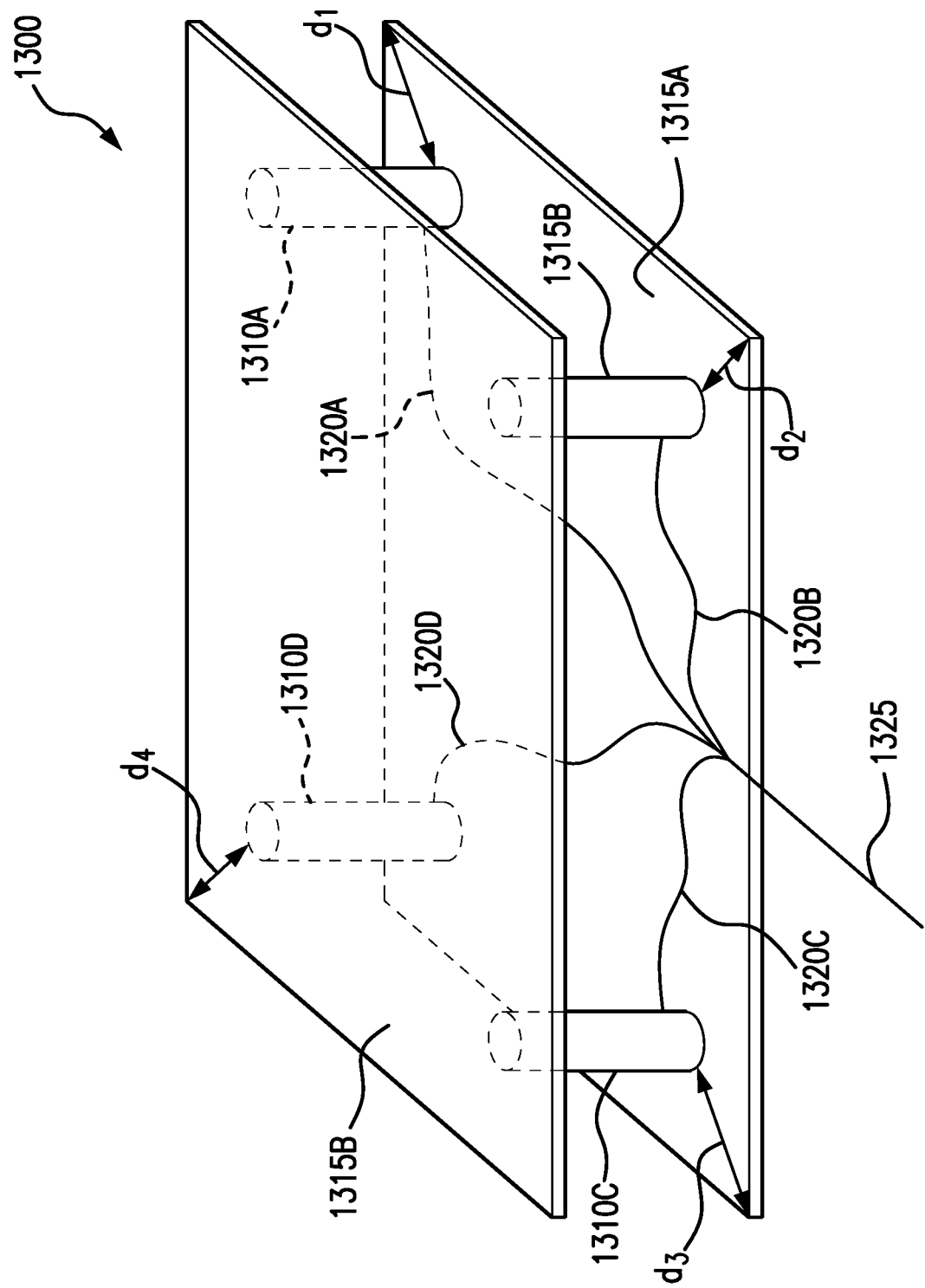

FIG. 13B presents an example weight sensor 1300 that may be coupled to a shelf 305 of a physical rack 210 of physical store 100 to detect the weight of items 315 positioned on the shelf 305. Weight sensor 1300 may then communicate this information to external system 485. External system 485 tracks the weights detected by weight sensors 1300 to determine if, and when, items 315 are removed from the physical rack 210.

As seen in FIG. 13B, weight sensor 1300 includes plates 1315*a* and 1315*b*, load cells 1310*a*, 1310*b*, 1310*c*, and 1310*d*, and wires 1320*a*, 1320*b*, 1320*c*, 1320*d*, and 1325. Generally, the components of weight sensor 1300 are assembled so that weight sensor 1300 can detect a weight of items 315 positioned above or near weight sensor 1300. Plates 1315 form surfaces that distribute the weight of items 315 across the surfaces.

Plates 1315 may be made of any suitable material, such as, for example, metal and/or plastic. Items 315 may be positioned above or near plates 1315 and the weight of these items 315 may be distributed across plates 1315.

Load cells 1310 are positioned between plates 1315*a* and 1315*b*. Load cells 1310 produce electrical signals based on the weight experienced by the load cells 1310. For example, load cells 1310 may be transducers that convert an input mechanical force (e.g., weight, tension, compression, pressure, or torque) into an output electrical signal (e.g., current or voltage). As the input force increase, the output electrical signal may incrase proportionally. Load cells 1310 may be any suitable type of load cell (e.g., hydraulic, pneumatic, and strain gauge). Although load cells 1310 are illustrated as being cylindrical in shape, they may be any suitable size and shape that is appropriate for the particular implementation contemplated.

The signals from load cells 1310 may be analyzed to determine an overall weight of items 315 positioned above or near weight sensor 1300. Load cells 1310 may be positioned such that the weight of items 315 positioned above or near weight sensor 1300 is evenly distributed to each load cell 1310. In the example of FIG. 13B, load cells 1310 are positioned substantially equidistant from corners of plates 1315*a* and 1315*b*. For example, load cell 1310*a* is positioned a distance d1 from a corner of plates 1315*a* and 1315*b*. Load cell 1310*b* is positioned a distance d2 from a corner of plates 1315*a* and 1315*b*. Load cell 1310*c* is positioned a distance d3 from a corner of plates 1315*a* and 1315*b*. Load cell 1310*d* is positioned a distance d4 from a corner of 1315*a* and 1315*b*. Distances d1, d2, d3 and d4 may be substantially equal to each other. This disclosure contemplates distances differing by 5 to 10 millimeters and still being considered substantially equal to each other. By positioning load cells 1310 substantially equal distances from corners of plates 1315*a* and 1315*b*, the weight of items positioned above or near weight sensor 1300 is evenly distributed across the load cells 1310. As a result, the total weight of items positioned above or near weight sensor 1300 can be determined by summing the weights experienced by the individual load cells 1310.

Load cells 1310 communicate electric signals that indicate a weight experienced by the load cells 1310. For example, the load cells 1310 may produce an electric current that varies depending on the weight or force experienced by the load cells 1310. Each load cell 1310 is coupled to a wire 1320 that carries the electric signal. In the example of FIG. 13B, load cell 1310a is coupled to wire 1320a; load cell 1310b is coupled to wire 1320b; load cell 1310c is coupled to wire 1320c; and load cell 1310d is coupled to wire 1320d. Wires 1320 are grouped together to form wire 1325 that extends away from weight sensor 1300. Wire 1325 carries the electric signals produced by load cells 1310 to a circuit board that communicates the signals to external system 485.

In certain embodiments, and as illustrated in FIG. 13C, multiple weight sensors 1300 may be coupled to a given physical shelf 305 of physical rack 210. For example, in the example illustrated in FIG. 13C, physical shelf 305 includes four weight sensors 1300. The locations of weight sensors 1300 in physical shelf 305 may define a set of zones of physical shelf 305. For example, first weight sensor 1300a may define a first zone 325a, second weight sensor 1300b may define a second zone 325b, third weight sensor 1300c may define a third zone 325c, and fourth weight sensor 1300d may define a fourth zone 325d. In certain embodiments, each zone 325 may be associated with a different physical item 315, such that each weight sensor 1300 is configured to detect weight changes associated with the removal of a specific item 315 from physical shelf 305. Virtual shelves 310 may similarly be divided in a set of zones 330a through 330d, with each virtual zone 330 associated with a given virtual item 320, to emulate zones 325a through 325d of physical shelves 305. In this manner, when a signal is received from a weight sensor 1300a, indicating the removal of a physical item 315a stored in first physical zone 325a of physical shelf 305, the signal may be used to identify virtual item 320a, stored in first virtual zone 330a, based on the correspondence between first physical zone 325a and first virtual zone 330a.

b. Comparison Between Virtual Shopping Cart and Algorithmic Shopping Cart

In certain embodiments, virtual store tool 405 may be used in conjunction with an algorithm 488 trained to track customers 105 within physical store 100 and to determine the physical items 315 selected by a customer 105 during a shopping session in physical store 100, based on inputs 498 received from sensors 498 located in physical store 100. As described above, in the discussion of FIGS. 13A through 13D, sensors 498 may include cameras 1305 and weight sensors 1300.

Algorithm 488 may be programmed to determine the items 315 selected by customers 105 in physical store 100 in any suitable manner. For example, algorithm 488 may process video frames, received by external system 485 from the array of cameras 1305, to determine coordinates for customers 105 detected in the frames. Algorithm 488 may then timestamp these coordinates based on when the frames were received. Based on the coordinates and the timestamps, algorithm 488 may determine the positions of customers 105 in physical store 100. Algorithm 488 may also process signals received by external system 485 from weight sensors 1300, to determine when items 315 were removed from physical shelves 305. Using the positions of customers 105 in physical store 100, and the determinations of when items 315 were removed from physical shelves 305, algorithm 488 may determine which customers 105 took which items 315.

Figure 14:
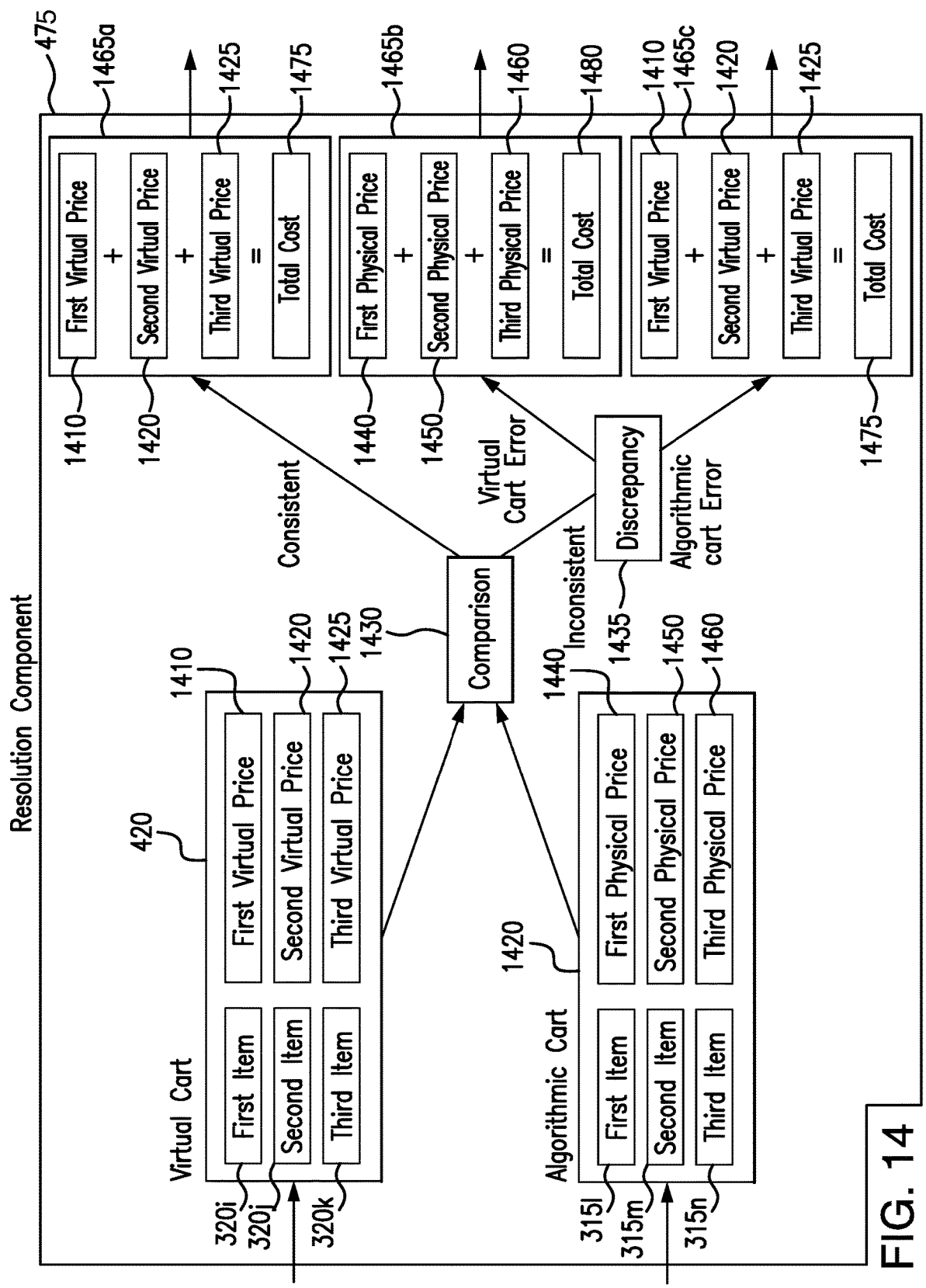
FIG. 14 illustrates a resolution component of the virtual store tool of the system illustrated in FIG. 4.
Figure 15:
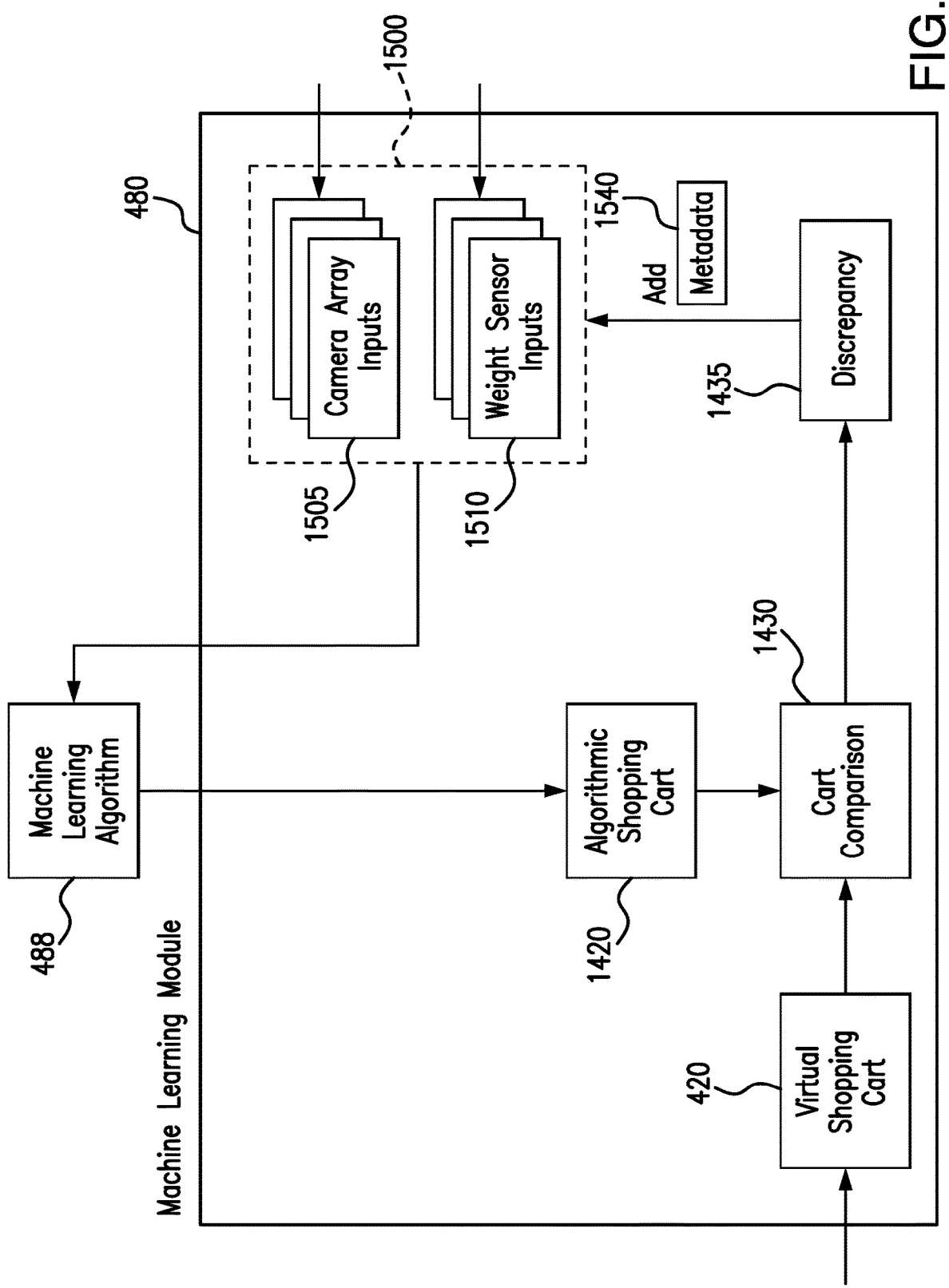
FIG. 15 illustrates a machine learning component of the virtual store tool of the system illustrated in FIG. 4.
Figure 16:
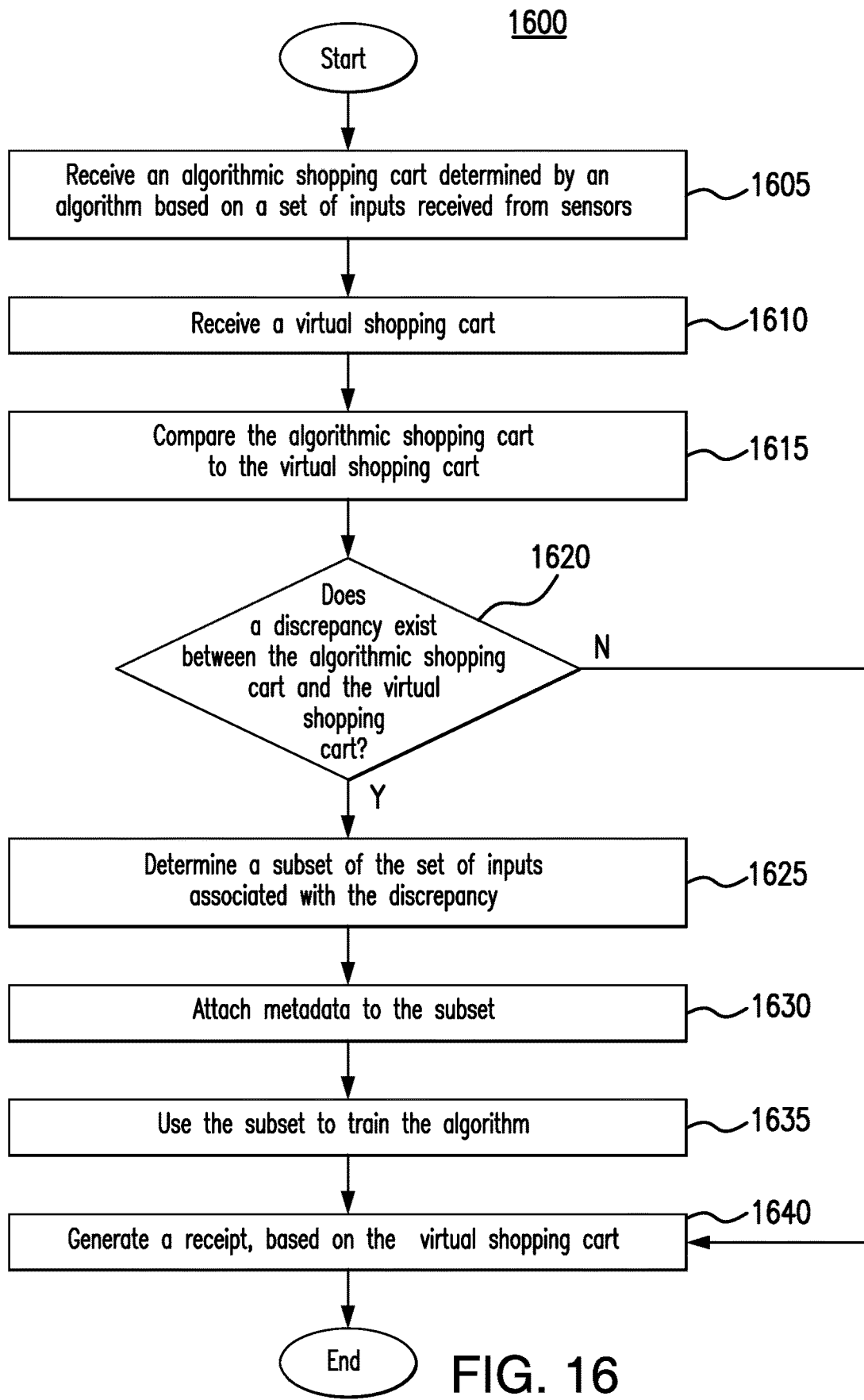
FIG. 16 presents a flowchart illustrating the manner by which the virtual store tool of the system illustrated in FIG. 4 may provide feedback to an algorithm configured to determine the items selected by a customer during a shopping session in a physical store.

As an example of the use of virtual store tool 105 in conjunction with algorithm 488, virtual store tool 405 may be used to resolve discrepancies between the physical items 315 determined by algorithm 488 to have been selected by customer 105 during a shopping session in physical store 100 and the virtual items 320 determined by virtual store tool 405 to have been selected by customer 105 during the shopping session. When discrepancies exist between the physical items 315 determined by algorithm 488 to have been selected by customer 105 and the virtual items 320 determined by virtual store tool 405 to have been selected by customer 105, the determination made by virtual store tool 405 may also be used to improve the future accuracy of algorithm 488. FIGS. 14 through 16 are used to describe these aspects of virtual store tool 405.

FIG. 14 illustrates resolution component 475 of virtual store tool 405. Resolution component 475 is configured to compare virtual shopping cart 420 to algorithmic shopping cart 1420. This disclosure contemplates that virtual store tool 405 may receive algorithmic shopping cart 1420 from external system 485. Algorithmic shopping cart 1420 may include physical items 315 determined by an algorithm 488 to have been selected by customer 105, based on inputs received from sensors 498 (including cameras 1305 and weight sensors 1300) located in physical store 100. For example, algorithmic shopping cart may include first physical item 315*l*, second physical item 315*m*, and third physical item 315*n*. Each of physical items 315*l* through 3135*n* is associated with a given purchase price. For example, first physical item 315*l* is associated with a first physical price 1440, second physical item 315*m* is associated with a second physical price 1450, and third physical item 315*n* is associated with a third physical price 1460. While illustrated in FIG. 14 as including three physical items 315, this disclosure contemplates that algorithmic shopping cart 1420 may include any number of physical items 315. Virtual shopping cart 420 includes first virtual item 320*i*, second virtual item 320*j*, and third virtual item 320*k*, each determined by virtual store tool 405 to have been selected by customer 105 during a shopping session in physical store 100. Each of virtual items 320*i* through 320*k* is associated with a given purchase price. For example, first virtual item 320*i* is associated with a first virtual price 1410, second virtual item 320*j* is associated with a second virtual price 1420, and third virtual item 320*k* is associated with a third virtual price 1425. While illustrated in FIG. 14 as including three virtual items 320, this disclosure contemplates that virtual shopping cart 420 may include any number of virtual items 320. Furthermore, virtual shopping cart 420 need not include the same number of items as algorithmic shopping cart 1420.

Resolution component 475 is configured to perform a comparison 1430 between the contents of virtual shopping cart 420 and the contents of algorithmic shopping cart 1420 to determine if any discrepancies 1435 exist between the two carts. Resolution component 475 may determine either that: (1) the two carts are consistent with one another; or (2) the two carts are inconsistent with one another. In certain embodiments, in response to determining that the two carts are inconsistent with one another, resolution component 475 may determine that (1) the two carts are inconsistent with one another because virtual cart 420 includes an error; or (2) the two carts are inconsistent with one another, because algorithmic cart 1420 includes an error.

Determining that the two carts are consistent with one another may include determining that first virtual item 320*i*, present in virtual shopping cart 420, is configured to emulate first physical item 315*l*, which is present in algorithmic shopping cart 1420, second virtual item 320*j*, present in virtual shopping cart 420, is configured to emulate second physical item 315*m*, which is present in algorithmic shopping cart 1420, and third virtual item 320*k*, present in virtual shopping cart 420, is configured to emulate third physical item 315*n*, which is present in algorithmic shopping cart 1420. On the other hand, determining that the two carts are inconsistent with one another may include: (1) determining that virtual shopping cart 420 includes more virtual items 320 than algorithmic shopping cart 1420 includes physical items 315; (2) determining that virtual shopping cart 420 includes fewer virtual items 320 than algorithmic shopping cart 1420 includes physical items 315; (3) determining that a virtual item 320, present in virtual shopping cart 420, is configured to emulate a physical item 315, which is not present in algorithmic shopping cart 1420; or (4) determining that no virtual item 320, present in virtual shopping cart 420, is configured to emulate a physical item 315, present in algorithmic shopping cart 1420.

This disclosure contemplates that in embodiments in which resolution component 475 may determine that the two carts are inconsistent with one another because one of the two carts includes an error, resolution component 475 may determine that one of the two carts includes an error in any suitable manner. As an example, in certain embodiments, resolution component 475 may always determine that algorithmic shopping cart 1420 includes an error any time a discrepancy exists between virtual shopping cart 420 and algorithmic shopping cart 1420. As another example, resolution component 475 may determine that one of the carts includes an error, based on the type of discrepancy 1435 that exists between virtual cart 420 and algorithmic cart 1420. For example, resolution component 475 may be configured to determine that virtual shopping cart 420 includes an error when the discrepancy 1435 between the two carts is a result of differing quantities of a particular item between the two carts. For instance, virtual cart 420 may include one instance of first virtual item 320*i*, configured to emulate first physical item 315*l*, while algorithmic shopping cart 1420 may include two instances of first physical item 315*l*. In such situations, it may be more likely that virtual shopping cart 420 includes an incorrect quantity of first virtual item 320*i*, than algorithmic shopping cart 1420 includes an incorrect quantity of first physical item 315*l*, as it may be difficult to tell from camera feed segments 415 and/or 425 that customer 105 selected more than one physical item 315*l* from a given physical shelf 305. On the other hand, the information received from weight sensors 1300 in physical store 100, may more accurately indicate that more than one physical item 315*l* was selected from physical shelf 305. For discrepancies 1435 that do not include differing quantities of a particular item between the two carts, resolution component 475 may be configured to determine that algorithmic shopping cart 1420 includes an error, as a default.

As another example, resolution component 475 may be configured to determine that either virtual shopping cart 420 or algorithmic shopping cart 1420 includes an error based on input received from user 120. For example, in response to determining that a discrepancy 1435 exists between virtual shopping cart 420 and algorithmic shopping cart 1420, resolution component 475 may send a message to device 115, advising user 120 of the discrepancy 1435. User 120 may then send a response to virtual store tool 405 indicating either that virtual shopping cart 420 includes an error, or that algorithmic shopping cart 1420 includes an error. User 120 may determine that one of virtual shopping cart 420 and algorithmic shopping cart 1420 include an error in any suitable manner. As an example, user 120 may review camera feed segments 415 and/or 425 to either confirm the contents of virtual shopping cart 420 or determine that virtual shopping cart 420 includes an error. For example, if the discrepancy includes an absence of a physical item 315 from algorithmic shopping cart 1420, where the corresponding virtual item 320 is present in virtual shopping cart 420, user 120 may review camera feed segments 415 and/or 425 to confirm that the camera feed segments capture customer 105 selecting the physical item 315 from a physical rack 210. As another example, if the discrepancy includes the presence of a physical item 315 in algorithmic shopping cart 1420, where the corresponding virtual item 320 is absent from virtual shopping cart 420, user 120 may review camera feed segments 415 and/or 425 to either (1) confirm that user 120 never observes customer 105 selecting the physical item 315 from a physical rack 210; or (2) confirm that while user 120 views customer 105 selecting the physical item 315 from a physical rack 210 in camera feed segments 415 and/or 425, user 120 subsequently views the customer 105 setting down the physical item 315 and leaving the physical store 100 with the item 315.

Resolution component 475 is also configured to generate a receipt 1465 for customer 105. In certain embodiments, resolution component 475 generates receipt 1465 based on the contents of virtual shopping cart 420. For example, resolution component 475 may generate receipt 1465 based on the contents of virtual shopping cart 420 before performing comparison 1430. In other embodiments, resolution component 475 may generate receipt 1465 based on comparison 1430. For example, if resolution component 475 determines that virtual shopping cart 420 is consistent with algorithmic shopping cart 1420, resolution component 475 may generate receipt 1465*a* for customer 105. Receipt 1465*a* may include the total cost 1475 of first virtual item 320*i*, second virtual item 320*j*, and third virtual item 320*k*, as determined from first virtual price 1410, second virtual price 1420, and third virtual price 1425. Here, since virtual cart 420 is consistent with algorithmic shopping cart 1420, determining the total cost 1475 of first virtual item 320*i*, second virtual item 320*j*, and third virtual item 320*k* is equivalent to determining the total cost of first physical item 315*l*, second physical item 315*m*, and third physical item 315*n*. As another example, if resolution component 475 determines that virtual shopping cart 420 includes an error, resolution component 475 may generate receipt 1465*b* for customer 105. Receipt 1465*b* may include the total cost 1480 of first physical item 315*l*, second physical item 315*m*, and third physical item 315*n*, as determined from first physical price 1440, second physical price 1450, and third physical price 1460. As a further example, if resolution component 475 determines that algorithmic shopping cart 1420 includes an error, resolution component 475 may generate receipt 1465*c* for customer 105. Receipt 1465*c* may include the total cost 1475 of first virtual item 320*i*, second virtual item 320*j*, and third virtual item 320*k*, as determined from first virtual price 1410, second virtual price 1420, and third virtual price 1425. Once resolution component 475 has generated a receipt 1465 for customer 105, resolution component 475 may charge customer 105, based on receipt 1465, and/or send receipt 1465 to device 125, belonging to customer 105.

Resolution component 475 may be a software module stored in memory 440 and executed by processor 435. An example of the operation of resolution component 475 is as follows: (1) receive virtual shopping cart 420 and algorithmic shopping cart 1420; (2) determine if the number of virtual items 320 in virtual shopping cart 420 is the same as the number of physical items 315 in algorithmic shopping cart 1420; (3) if the number of virtual items 320 in virtual shopping cart 420 is different from the number of physical items 315 in algorithmic shopping cart 1420, label the two carts as inconsistent; (4) if the number of virtual items 320 in virtual shopping cart 420 is the same as the number of physical items 315 in algorithmic shopping cart 1420, determine if virtual shopping cart 420 includes any virtual items 320 for which algorithmic shopping cart 1420 does not include a corresponding physical item 315; (5) if virtual shopping cart 420 includes any virtual items 320 for which algorithmic shopping cart 1420 does not include a corresponding physical item 315, label the two carts as inconsistent; (6) if virtual shopping cart 420 does not include any virtual items 320 for which algorithmic shopping 1420 does not include a corresponding physical item 315, label the two carts as consistent; (7) if the two carts are labelled as consistent generate receipt 1465a; (8) if the two carts are labelled as inconsistent, determine whether virtual cart 420 includes an error; (9) if virtual cart 420 includes an error, generate receipt 1465b; (10) if virtual cart 420 does not include an error, generate receipt 1465c.

c. Algorithm Feedback

In certain embodiments, virtual store tool 405 may be used in conjunction with algorithm 488, to improve the accuracy of the determinations made by algorithm 488. Specifically, machine learning module 480 may provide feedback to algorithm 488, based on a comparison of the contents of virtual shopping cart 420 to the contents of algorithmic shopping cart 1420. FIG. 15 illustrates the operation of machine learning module 480.

As illustrated in FIG. 15, in certain embodiments, machine learning module 480 receives algorithmic shopping cart 1420 and virtual shopping cart 420. Machine learning module 480 may then perform a comparison 1430 of the contents of virtual shopping cart 420 and the contents of algorithmic shopping cart 1420, to determine if a discrepancy 1435 exists between the two carts. In certain other embodiments, machine learning module 480 may receive an indication that a discrepancy 1435 exists between virtual shopping cart 420 and algorithmic shopping cart 1420 directly from resolution component 475.

Discrepancy 1435 may include any inconsistency between virtual shopping cart 420 and algorithmic shopping cart 1420. For example, discrepancy 1435 may include an absence of a physical item 315a from algorithmic shopping cart 1420, where the corresponding virtual item 320a is present in virtual shopping cart 420. Such a discrepancy may occur when a weight sensor 1300 coupled to a physical shelf 305 on which physical item 315a is placed, failed to detect the selection of the physical item 315a from physical shelf 305. As another example, discrepancy 1435 may include the presence of a physical item 315b in algorithmic shopping cart 1420, where the corresponding virtual item 320b is absent from virtual shopping cart 420. Such a discrepancy may arise from algorithm 488 failing to detect that a customer 105, who initially selected physical item 315b from a physical rack 210, put item 315b down and did not leave physical store 100 with the item 315b. As a further example, discrepancy 1435 may include an identification swap between a first customer 105a and a second customer 105b, such that a first item 315a selected by first customer 105a is absent from the algorithmic shopping cart 1420 assigned to first customer 105a, and present in an algorithmic shopping cart 1420 assigned to second customer 105b. Such an identification swap may occur in the customer tracking component of algorithm 488.

In response to determining that a discrepancy exists between algorithmic shopping cart 1420 and virtual shopping cart 420, machine learning module 480 may determine a subset 1500 of inputs received by sensors 498 (including cameras 1305 and weight sensors 1300) and associated with the discrepancy. As an example, machine learning module 480 may determine a timestamp range of camera feed segments 415 and/or 425 during which discrepancy 1435 occurred. For example, machine learning module 480 may determine that a virtual item 320a was added to virtual shopping cart 420, based on a portion of customer 105's shopping session captured between a first timestamp and a second timestamp of camera feed segments 415 and/or 425, but that a corresponding physical item 315a was not added to algorithmic shopping cart 1420. As a result, machine learning module 480 may determine a subset 1500 of inputs received from sensors 498 during the same time interval (i.e., the time interval occurring between the first timestamp and the second timestamp). Subset 1500 may include a subset 1505 of inputs received from cameras 1305 and/or a subset 1510 of inputs received from weight sensors 1300.

In response to identifying subset 1500, associated with discrepancy 1435, machine learning module 480 may attach metadata 1540 to subset 1500. This disclosure contemplates that metadata 1540 may include any information explaining and/or addressing discrepancy 1435. For example, attaching metadata 1540 to subset 1500 may include attaching a label to one or more frames received from cameras 1305 indicating that the frames illustrate customer 105a selecting item 315, rather than customer 105b selecting the item, as originally determined by algorithm 488. In response to attaching metadata 1540 to subset 1500, external system 485 may use subset 1500 to retrain algorithm 488. In certain embodiments, retraining algorithm 488 may result in an improved accuracy of algorithm 488.

Machine learning module 480 may be a software module stored in memory 440 and executed by processor 435. An example of the operation of machine learning module 480 is as follows: (1) receive algorithmic shopping cart 1420; (2) receive virtual shopping cart 420; (3) compare the contents of virtual shopping cart 420 to the contents of algorithmic shopping cart 1420; (4) determine that discrepancy 1435 exists between virtual shopping cart 420 and algorithmic shopping cart 1420; (5) determine a subset 1500 of inputs received from sensors 498 (including cameras 1305 and weight sensors 1300); (6) attach metadata 1540 to subset 1500, so that external system 485 may use subset 1500 to retrain algorithm 488.

FIG. 16 presents a flowchart illustrating the manner by which virtual store tool 405 may use virtual shopping cart 420 to provide feedback to algorithm 488. In step 1605, resolution component 475 receives an algorithmic shopping cart 1420. Algorithmic shopping cart 1420 includes a set of physical items 315, determined by algorithm 488 to have been selected by a customer 105 during a shopping session in physical store 100, based on inputs received from sensors 498 located in physical store 100. In step 1610, resolution component 475 receives a virtual shopping cart 420. Virtual shopping cart 420 includes a set of virtual items 320. In certain embodiments, virtual items 320 were determined by a user 120 to have been selected by customer 105 during a shopping session in physical store 100, based on camera feed segments 415 and/or 425 capturing the shopping session of customer 105 in physical store 100.

In step 1615, resolution component 475 compares the contents of algorithmic shopping cart 1420 to the contents of virtual shopping cart 420. In step 1620, resolution component 475 determines whether a discrepancy 1435 exists between algorithmic shopping cart 1420 and virtual shopping cart 420. If, in step 1620, resolution component 475 determines that a discrepancy 1435 does not exist between algorithmic shopping cart 1420 and virtual shopping cart 420, then, in step 1640, resolution component 475 generates a receipt 1465 for the shopping session, based on the contents of virtual shopping cart 420, and sends receipt 1465 to a device 125 of customer 105. If, in step 1620, resolution component 475 determines that a discrepancy 1435 exists between algorithmic shopping cart 1420 and virtual shopping cart 420, then, in step 1625, machine learning module 480 determines a subset 1500 of the set of inputs received from sensors 498 associated with the discrepancy. In step 1630, machine learning module 480 attaches metadata 1540 to subset 1500. Metadata 1540 may explain discrepancy 1435. In step 1635, external system 485 may use subset 1500 to retrain algorithm 488. Additionally, in step 1640, resolution component 475 generates a receipt 1465 for the shopping session, based on the contents of virtual shopping cart 420, and sends receipt 1465 to a device 125 of customer 105.

Modifications, additions, or omissions may be made to method 1600 depicted in FIG. 16. Method 1600 may include more, fewer, or other steps. For example, steps may be performed in parallel or in any suitable order. While discussed as virtual store tool 405 (or components thereof) performing the steps, any suitable component of system 400, such as device(s) 115 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. An apparatus comprising:
 a hardware processor configured to:
  receive an algorithmic shopping cart comprising a first set of items, the first set of items determined by an algorithm to have been selected by a first person during a shopping session in a physical store, based on a set of inputs received from sensors located within the physical store;
  receive a virtual shopping cart comprising a second set of items associated with the shopping session, wherein video of the shopping session was captured by a set of cameras located in the physical store, the video depicting the person selecting the second set of items;
  compare the algorithmic shopping cart to the virtual shopping cart;
  in response to comparing the algorithmic shopping cart to the virtual shopping cart:
   determine that a discrepancy exists between the algorithmic shopping cart and the virtual shopping cart; and
   determine a subset of the set of inputs associated with the discrepancy;
   attach metadata to the subset, the metadata explaining the discrepancy; and
   use the subset to train the algorithm.

2. The apparatus of claim 1, wherein the processor is further configured to:
 receive a second algorithmic shopping cart comprising a third set of items, the third set of items determined by the algorithm to have been selected by a second person during a second shopping session in the physical store, based on a second set of inputs received from the sensors located within the physical store;
 receive a second virtual shopping cart comprising a fourth set of items, the fourth set of items determined to have been selected by the person during the second shopping session in the physical store, based on video of the second shopping session;
 compare the second algorithmic shopping cart to the second virtual shopping cart; and
 in response to comparing the second algorithmic shopping cart to the second virtual shopping cart, determine that the second algorithmic shopping cart matches the second virtual shopping cart.

3. The apparatus of claim 1, wherein the discrepancy comprises an absence of a first item from the algorithmic shopping cart, wherein the first item is present in the virtual shopping cart.

4. The apparatus of claim 3, wherein the sensors failed to detect a selection of the first item.

5. The apparatus of claim 1, wherein the discrepancy comprises a presence of a first item in the algorithmic shopping cart, wherein the first item is absent from the virtual shopping cart.

6. The apparatus of claim 1, wherein the discrepancy comprises an identification swap between the first person and a second person, such that a first item selected by the first person is absent from the algorithmic shopping cart and present in a second algorithmic shopping cart associated with the second person.

7. The apparatus of claim 1, wherein the sensors comprise:
 an array of algorithmic cameras different from the set of cameras; and
 a set of weight sensors, wherein each item of the first set of items is coupled to a weight sensor of the set of weight sensors.

8. A method comprising:
 receiving an algorithmic shopping cart comprising a first set of items, the first set of items determined by an algorithm to have been selected by a first person during a shopping session in a physical store, based on a set of inputs received from sensors located within the physical store;
 receiving a virtual shopping cart comprising a second set of items associated with the shopping session, wherein video of the shopping session was captured by a set of cameras located in the physical store, the video depicting the person selecting the second set of items;
 comparing the algorithmic shopping cart to the virtual shopping cart;
 in response to comparing the algorithmic shopping cart to the virtual shopping cart:
  determining that a discrepancy exists between the algorithmic shopping cart and the virtual shopping cart; and
  determining a subset of the set of inputs associated with the discrepancy;
  attaching metadata to the subset, the metadata explaining the discrepancy; and
  using the subset to train the algorithm.

9. The method of claim 8, further comprising:
receiving a second algorithmic shopping cart comprising a third set of items, the third set of items determined by the algorithm to have been selected by a second person during a second shopping session in the physical store, based on a second set of inputs received from the sensors located within the physical store;
receiving a second virtual shopping cart comprising a fourth set of items, the fourth set of items determined to have been selected by the person during the second shopping session in the physical store, based on video of the second shopping session;
comparing the second algorithmic shopping cart to the second virtual shopping cart; and
in response to comparing the second algorithmic shopping cart to the second virtual shopping cart, determining that the second algorithmic shopping cart matches the second virtual shopping cart.

10. The method of claim 8, wherein the discrepancy comprises an absence of a first item from the algorithmic shopping cart, wherein the first item is present in the virtual shopping cart.

11. The method of claim 10, wherein the sensors failed to detect a selection of the first item.

12. The method of claim 8, wherein the discrepancy comprises a presence of a first item in the algorithmic shopping cart, wherein the first item is absent from the virtual shopping cart.

13. The method of claim 8, wherein the discrepancy comprises an identification swap between the first person and a second person, such that a first item selected by the first person is absent from the algorithmic shopping cart and present in a second algorithmic shopping cart associated with the second person.

14. The method of claim 8, wherein the sensors comprise:
an array of algorithmic cameras different from the set of cameras; and
a set of weight sensors, wherein each item of the first set of items is coupled to a weight sensor of the set of weight sensors.

15. A system comprising:
a set of sensors located within a physical store, the set of sensors comprising:
an array of algorithmic cameras; and
a set of weight sensors; and
a processor configured to:
receive an algorithmic shopping cart comprising a first set of items, the first set of items determined by an algorithm to have been selected by a first person during a shopping session in the physical store, based on a set of inputs received from the set of sensors;
receive a virtual shopping cart comprising a second set of items associated with the shopping session, wherein video of the shopping session was captured by a set of cameras located in the physical store, the set of cameras different from the array of algorithmic cameras, the video depicting the person selecting the second set of items;
compare the algorithmic shopping cart to the virtual shopping cart;
in response to comparing the algorithmic shopping cart to the virtual shopping cart:
determine that a discrepancy exists between the algorithmic shopping cart and the virtual shopping cart; and
determine a subset of the set of inputs associated with the discrepancy;
attach metadata to the subset, the metadata explaining the discrepancy; and
use the subset to train the algorithm.

16. The system of claim 15, wherein the processor is further configured to:
receive a second algorithmic shopping cart comprising a third set of items, the third set of items determined by the algorithm to have been selected by a second person during a second shopping session in the physical store, based on a second set of inputs received from the set of sensors;
receive a second virtual shopping cart comprising a fourth set of items, the fourth set of items determined to have been selected by the person during the second shopping session in the physical store, based on video of the second shopping session;
compare the second algorithmic shopping cart to the second virtual shopping cart; and
in response to comparing the second algorithmic shopping cart to the second virtual shopping cart, determine that the second algorithmic shopping cart matches the second virtual shopping cart.

17. The system of claim 15, wherein the discrepancy comprises an absence of a first item from the algorithmic shopping cart, wherein the first item is present in the virtual shopping cart.

18. The system of claim 17, wherein the set of sensors failed to detect a selection of the first item.

19. The system of claim 15, wherein the discrepancy comprises a presence of a first item in the algorithmic shopping cart, wherein the first item is absent from the virtual shopping cart.

20. The system of claim 15, wherein the discrepancy comprises an identification swap between the first person and a second person, such that a first item selected by the first person is absent from the algorithmic shopping cart and present in a second algorithmic shopping cart associated with the second person.

\* \* \* \* \*